United States Patent [19]

Becker et al.

[11] Patent Number: 5,616,650

[45] Date of Patent: Apr. 1, 1997

[54] METAL-NITROGEN POLYMER COMPOSITIONS COMPRISING ORGANIC ELECTROPHILES

[75] Inventors: Kurt J. Becker, Newark; James A. Jensen, Hockessin; Alexander Lukacs, III, Wilmington, all of Del.

[73] Assignee: Lanxide Technology Company, LP, Newark, Del.

[21] Appl. No.: 223,294

[22] Filed: Apr. 5, 1994

Related U.S. Application Data

[63] Continuation-in-part of Ser. No. 148,044, Nov. 5, 1993, abandoned.

[51] Int. Cl.$^6$ .................................................. C01F 8/42
[52] U.S. Cl. .................. 525/102; 525/327.3; 525/328.2; 525/328.6; 525/328.7; 525/329.4; 525/330.5; 525/337; 525/342; 525/370; 525/371; 525/420; 525/431; 525/437; 525/446; 525/452; 525/474; 525/476
[58] Field of Search .................................. 525/452, 102, 525/327.3, 328.2, 328.6, 328.7, 329.4, 330.5, 337, 342, 370, 371, 420, 431, 437, 446, 474, 476

[56] References Cited

U.S. PATENT DOCUMENTS

| | | | |
|---|---|---|---|
| 2,623,033 | 12/1952 | Snyder | 260/75 |
| 2,892,747 | 6/1959 | Dye | 154/43 |
| 3,239,489 | 3/1966 | Fink | 260/77.5 |
| 3,288,726 | 11/1966 | Wagner | 260/2 |
| 3,320,184 | 5/1967 | Fink | 260/2 |
| 3,446,774 | 5/1969 | Kotzsch et al. | 260/47 |
| 3,505,246 | 4/1970 | Ehrlich et al. | 260/2 |
| 3,853,567 | 12/1974 | Verbeek | 106/44 |
| 4,448,939 | 5/1984 | Fasolka et al. | 525/474 |
| 4,482,669 | 11/1984 | Seyferth et al. | 524/442 |
| 4,581,468 | 4/1986 | Paciorek et al. | 556/403 |
| 4,590,005 | 5/1986 | Shanzer et al. | 260/239.3 |
| 4,612,383 | 9/1986 | Laine et al. | 556/412 |
| 4,675,424 | 6/1987 | King, III et al. | 556/412 |
| 4,687,657 | 8/1987 | Clark et al. | 423/412 |
| 4,689,252 | 8/1987 | Lebrun et al. | 427/228 |
| 4,696,968 | 9/1987 | Tebbe | 524/610 |
| 4,707,556 | 11/1987 | Paciorek et al. | 556/403 |
| 4,722,988 | 2/1988 | Porte et al. | 528/28 |
| 4,764,489 | 8/1988 | Bolt | 501/96 |
| 4,774,312 | 9/1988 | Burns | 528/23 |
| 4,929,704 | 5/1990 | Schwark | 528/28 |
| 5,001,090 | 3/1991 | Schwark | 501/97 |
| 5,021,533 | 6/1991 | Schwark | 528/21 |
| 5,032,649 | 7/1991 | Schwark | 525/474 |
| 5,155,181 | 10/1992 | Schwark | 525/474 |
| 5,164,344 | 11/1992 | Zank | 501/90 |
| 5,229,468 | 7/1993 | Jensen | 525/389 |
| 5,276,105 | 1/1994 | Jensen | 525/389 |

FOREIGN PATENT DOCUMENTS

| | | |
|---|---|---|
| 379815 | 8/1990 | European Pat. Off. . |
| 379819 | 8/1990 | European Pat. Off. . |
| 0430080 | 6/1991 | European Pat. Off. . |
| 0442013 | 8/1991 | European Pat. Off. . |
| 453350 | 10/1991 | European Pat. Off. . |
| 0468066 | 1/1992 | European Pat. Off. . |
| 0480225 | 4/1992 | European Pat. Off. . |
| 544959 | 6/1993 | European Pat. Off. . |
| 3231931 | 3/1987 | Japan . |

OTHER PUBLICATIONS

J. M. Schwark, "Isocyanate–Modified Polysilazane Ceramic Precursors", from Polymer Preprints, 1993, 34(1), 294–5.
E. Muller and O. Bayer, "Methoden der Organischen Chemie", Georg Thieme Verlag Stuttgart, New York, 1980, Band XIII/5.
J. F. Klebe, J. B. Bush, Jr. and J. E. Lyons, "The Addition of Silylamines and Silazanes to Isocyanates", Contribution from the General Electric Research Laboratory, Schenectady, New York, 1964.
W. Fink, "Zur Reaktion von Isocyanat mit der Si–N–Bindung", Nov. 13, 1963.
W. Fink, "Zur Reaktion von Isocyanat mit cyclischen Silazanen", Jun. 5, 1963.
J. Schwark and M. J. Sullivan, "Isocyanate–Modified Polysilazanes: Conversion to Ceramic Materials", Materials Research Society Symposium, Proc. vol. 271, 1992.
"Inverse Organic–Inorganic Composite Materials, 2. Free-Radical Routes into Nonshrinking Sol–Gel Composites", Macromolecules, 1991, 24, 5481–5483.
A. Zhdanov, G. Kotrelev, V. Levin, N. Tebeneva, V. Kotrelev, V. Martirosov and S. Obolonkova, "Polycarbonate Silazasiloxanes" 1981, Vysokomol. soyed. A23: No. 11, 2478–2485.

(List continued on next page.)

Primary Examiner—Bernard Lipman

[57] ABSTRACT

The compositions of this invention comprise uncrosslinked reaction mixtures comprising (1) at least one organic monomer, oligomer or polymer comprising a multiplicity of organic, electrophilic substituents, and (2) at least one metal-containing polymer comprising a metal-nitrogen polymer.

Preferred compositions of this invention comprise reaction mixtures comprising (1) at least one organic monomer, oligomer or polymer comprising a multiplicity of organic, electrophilic substituents, and (2) at least one of: silicon-nitrogen polymers, aluminum-nitrogen polymers and boron-nitrogen and polymer combinations thereof comprising a multiplicity of sequentially bonded repeat units the compositions comprising the reaction products of the reaction mixtures, and the compositions obtained by crosslinking the reaction products of the reaction mixtures. The crosslinking may be effected through at least one of thermal-based, radiation-based free radical-based or ionic-based crosslinking mechanisms. Furthermore, the reaction mixtures, the composition comprising the reaction products and the crosslinked composition may further comprise at least one filler or reinforcement. The composition may be molded or shaped by various techniques into numerous useful articles. Furthermore, the compositions may be applied as coatings by various techniques onto numerous articles to enhance the articles usefulness.

35 Claims, 2 Drawing Sheets

OTHER PUBLICATIONS

R. T. Paine and C. K. Narula, "*Synthetic Routes to Boron Nitride*", American Chemical Society, 1990, 90, 73–91.

R. H. Cragg, M. F. Lappert and B. P. Tilley, "*Chloroboration and Allied Reactions of Unsaturated Compounds. Part III. Aminoboration and Alkoxyboration of Isocyanates and Isothiocyantes*", 1963.

H. Beyer, J. Dawson, H. Jenne and K. Niedenzu, "*Boron-Nitrogen Compounds. Part XI. The Reaction of Some Boron–Nitrogen Compounds with Organic Isocyanates*", 1963.

T. Hirabayaski, H. Imaeda, K. Itoh, S. Saki and Y. Ishii, "*Insertion Reactions of Diethylaluminum Derivatives I. Reaction of Diethylalauminum Ethanethiolate and Diethylaluminum Dimethylamide with Isocyanates or Isothiocyanates*", J. Organometal Chem., 19(1969)299–308.

R. Brotherton and H. Steinberg, "*Direct Preparation of Some Cyclic Boron–Nitrogen Compounds from Alkoxyboranes*", 1961.

METAL-NITROGEN POLYMER COMPOSITIONS COMPRISING ORGANIC ELECTROPHILES

CROSS REFERENCE TO RELATED APPLICATION

The present application is a continuation-in-part of U.S. patent application Ser. No. 08/148,044, filed Nov. 5, 1993, abandoned.

BACKGROUND OF THE INVENTION

Metal-containing polymers have been used extensively in the past to prepare ceramic objects due to the high ceramic "char" yields which result when such polymers are heated to temperatures approaching 1000° C. Such polymers have thus proven useful when used as ceramic powder binders, as precursors to ceramic coatings, as ceramic fiber precursors, and as powder carriers for molding applications. However, despite the high thermal stability of such polymers, and their ability to form ceramic compositions upon thermal decomposition, the mechanical strength of such polymers has limited their utility in applications which require, for example, mechanical strength at temperatures below which conversion to a ceramic occurs.

In contrast, while organic polymers demonstrate marginal high temperature performance, their strength and durability at temperatures below their decomposition temperature have resulted in widespread application where materials such as metals or wood had previously been used.

Block copolymers have been prepared from a variety of organic polymer systems. In addition, block copolymers have been prepared from a variety of inorganic polymer systems. For example, U.S. Pat. No. 5,229,468, entitled "Polymer Precursor for Silicon Carbide/Aluminum Nitride Ceramics" which issued in the name of Jensen on Jul. 20, 1993, discloses recent work relating to novel block copolymers which are ceramic precursors and which incorporate, alternately, a multiplicity of units comprising Al-N bonded segments with a multiplicity of units comprising Si-N bonded segments.

Such block copolymers, whether wholly organic in nature or wholly inorganic in nature, have been shown to exhibit certain desirable characteristics inherent in each of their component compositions.

Recently there has also been some effort in preparing mixed organic/inorganic polymer compositions by, for example, the hydrolysis of $Si(OR)_4$ compounds in which R is an unsaturated, polymerizable organic group such as vinyl or allyl, or an acrylate or methacrylate-based group. Efforts in preparing mixed organic/inorganic polymer compositions have been motivated by limitations which derive from the insolubility of many important engineering polymers within sol-gel solutions. Free-radical curing of such "sol-gel" processed monomers results in mixed systems demonstrating some of the useful properties of the organic components used in the synthesis of the monomers as well as some of the desirable properties of the inorganic components. Typically, such systems comprise semi-interpenetrating networks composed of linear organic polymers and a three-dimensional $SiO_2$ network. Representative of such an approach is work described by B. M. Novak and C. Davies in *Macromolecules*, 1991, 24, 5481–5483.

Other work (see, for example, U.S. Pat. No. 4,448,939, entitled "Polyurethanes Prepared Using Poly(Silyldiamines)"), which issued in the names of Fasolka et al., on May 15, 1984), is based on the reaction of —Si—NH—R— (silyl amine) groups with organic isocyanates. In this work, polyurethane compositions comprising the reaction product of an organic polyisocyanate and a poly(silyldiamine) are described. As shown later herein, these compositions differ from the concepts taught in the present invention.

Similar work by A. A. Zhdanov et. al. in *Polymer Science U.S.S.R.*, Vol. 23, No. 11, pp 2687–2696 (1981), describes the reaction of a nitrogen-hydrogen bond, present in the silyl amine end groups of linear polysilazasiloxanes, with carbonate moieties in mixed polycarbonate silazasiloxane compositions. Such silyl amine end groups are formed by the reaction of hydroxyl groups in the organic fraction of the composition with cyclosilazane rings, resulting in ring opening and concurrent formation of the reactive $Si-NH_2$ moiety.

U.S. Pat. No. 4,929,704 entitled "Isocyanate- and Isothiocyante-Modified Polysilazane Ceramic Precursors", which issued in the name of Schwark, on May 29, 1990; U.S. Pat. No. 5,001,090 entitled "Silicon Nitride Ceramics from Isocyanate- and Isothiocyante-Modified Polysilazanes", which issued in the name of Schwark, on Mar. 19, 1991; and U.S. Pat. No. 5,021,533 entitled "Crosslinkable Poly(thio)ureasilazane Composition Containing a Free Radical Generator", which issued in the name of Schwark, on Jun. 4, 1991, all disclose the preparation of partially crosslinked organic isocyanate-modified silazane polymers by the initial reaction of less than about 30 weight percent of an organic isocyanate with a polysilazane comprising Si-H bonds so as to effect reaction of the isocyanate with the silicon-nitrogen bond followed by a crosslinking reaction in which a by-product is hydrogen gas. Similarly, U.S. Pat. No. 5,032,649 entitled "Organic Amide-Modified Polysilazane Ceramic Precursors", which issued in the name of Schwark, on Jul. 16, 1991, and U.S. Pat. No. 5,155,181 entitled "(Thio)amide-Modified Silazane Polymer Composition Containing a Free Radical Generator", which issued in the name of Schwark, on Oct. 13, 1992, both disclose the preparation of organic amide-modified silazane polymers by the initial reaction of, for example, less than about 30 wt % of an organic amide with a polysilazane comprising Si-H bonds so as to effect reaction of the isocyanate with the silicon-nitrogen bond followed by a crosslinking reaction in which a by-product is hydrogen gas.

U.S. Pat. No. 3,239,489, entitled "Polyurea-silazanes and Process of Preparation", which issued in the names of Fink et al., on Mar. 8, 1966, describes the one-step preparation of linear as well as crosslinked polymers by the reaction of certain silazanes comprising no nitrogen to carbon bonds within the repeat units of the silazane with di- or poly-functional isocyanates. By reacting such compositions, both linear and crosslinked polymers can be prepared by reacting the di- or poly-functional isocyanates with the N-H bond of the silazane.

To date, no art has disclosed or recognized the importance of: (1) the synthesis of uncrosslinked, but crosslinkable inorganic/organic hybrid polymers or ceramers by the reaction of at least one organic electrophile with at least one metal-nitrogen polymer (e.g., polysilazane, polyalazane, polyborazine, poly(silazane/alazane), etc.); (2) suitable crosslink mechanisms for such polymers in a second processing step; or (3) the crosslinked compositions obtained therefrom. For other silicon-nitrogen based polymers, as well as metal-nitrogen polymers in general, for example, aluminum-nitrogen polymers, boron-nitrogen polymers, and copolymers and terpolymers prepared from, for example, aluminum-nitrogen/boron-nitrogen copolymers, and silicon-nitrogen/boron-nitrogen copolymers, no systems are known.

Furthermore, the utility of such inorganic/organic hybrid polymers or ceramers in applications not involving a pyrolysis conversion to a ceramic material has never been contemplated.

The art is replete with examples of organic polymers utilized for many different traditional applications. However, a need exists to expand the use of polymers or polymer-like materials into some non-traditional areas.

For example, much effort has been focused on enhancing the elevated temperature properties of organic polymers to permit such polymers to function effectively in various high temperature environments. However, the elevated temperature performance of organic polymers is limited by the tendency of organic polymers to degrade and/or decompose into unacceptable or undesirable elements.

Moreover, certain uses of organic polymers are not practical because such polymers typically lack flame retardant properties and in some instances even function as fuel to sustain combustion. Accordingly, the use of combustible polymers for many applications may not be acceptable or permissible.

Further, many organic polymers exhibit unacceptable degradation when exposed to ultraviolet ("UV") radiation. The inherent susceptibility of such polymers to UV radiation is caused by the bonds in the polymer breaking because UV radiation possesses energy levels corresponding to some of the bond energies within the polymers. The correspondence of the bond energies to UV radiation causes organic polymers to degrade via, for example, a bond scission mechanism. Efforts to reduce the susceptibility of organic polymers to UV radiation has included, for example, the incorporation of expensive ingredients that attempt to absorb harmful UV radiation. The cost for incorporating these ingredients can be prohibitive.

Further, many organic polymers have been excluded from certain applications where the polymers lack adhesive properties, even though certain other properties of the polymers may be desirable. Some of the applications which require polymers to exhibit certain desirable adhesive properties include those applications where a polymer is placed as a coating upon a substrate material. If the polymer lacks adhesive properties, the polymer coating may flake or spall from the substrate material. Additionally, in certain situations it may be desirable to form a composite material from a polymer and another reinforcing material. In this case, it is desirable for the polymer to bond or adhere to the reinforcing phase in order to form a desirable polymer matrix composite material.

Accordingly, for these and other reasons, organic polymers have been relegated to applications which do not expose the polymers to their weakness. Thus, the inherent weaknesses exhibited by polymers has kept polymers from realizing even broader applications.

The art also contains certain examples of inorganic polymers, with an emphasis in the art being placed on certain preceramic polymers. These inorganic polymers have been developed primarily with an emphasis on their char or conversion yield. Specifically, a high char yield has been a primary goal of this type of polymer because the conversion of polymer to ceramic needed to be maximized. This emphasis on optimum conversion has resulted in the use of these preceramic polymers as precursors to ceramic. Additionally, any practical use of the preceramic polymers as polymers, per se, has been discouraged because of their relatively poor mechanical properties exhibited by preceramic polymers. Moreover, some preceramic polymers require stringent storage conditions. For example, some inorganic preceramic polymers require refrigeration to suppress reactions that would otherwise occur spontaneously at room temperature or even below room temperature. Further, processing of some inorganic preceramic polymers is complicated by their viscous character. In turn, this viscous character typically requires expensive pressure processing equipment. Accordingly, due to the aforementioned considerations, the use of perceramic polymers for anything other than precursors to ceramic materials has not been considered and/or has been impractical.

The present invention capitalizes on foresight and the understanding of the limitations exhibited by wholly organic or wholly inorganic polymers. To this end, the present invention recognizes the inherent limitations exhibited by each class of organic and inorganic polymers. However, it has been unexpectedly discovered that certain synergistic effects can be realized by combining organic and inorganic polymers in a novel manner to achieve a new class of materials—hybrid polymers or ceramers.

Accordingly, the present invention satisfies a long felt need by overcoming the above-discussed limitations associated with wholly organic polymers by combining synergistically organic polymers and inorganic polymers. Specifically, the present invention results in, among other things, polymers which have elevated temperature applicability; polymers which adhere to various surfaces, especially to inorganic surfaces, heretofore uncharacteristic of organic polymers (e.g., not only do the hybrid polymers or ceramers provide excellent matrices for reinforced composites, but the hybrid polymers or ceramers facilitate the joining of any type and/or number of materials to allow the combination of materials heretofore considered difficult, if not impossible, to join); polymers which exhibit superior UV radiation resistance; and polymers which exhibit flame retardant characteristics.

Further, the present invention satisfies a long felt need for materials possessing characteristics of inorganic polymers combined with simple processing. The present invention satisfies this need by providing hybrid polymers or ceramers from mixtures including, for example, low viscosity liquids that are inexpensively processed into the most complex of shapes and then transformed into solids. For these and many unstated reasons, the novel compositions of the invention, and materials derived therefrom, satisfy a long felt need for a new class of materials applicable in ways that transcend traditional notions applicable to either wholly organic and/or wholly inorganic polymers.

SUMMARY OF THE INVENTION

Briefly, the present invention relates to novel mixtures and the novel compositions derived from the mixtures. The novel mixtures comprise at least one organic electrophile and at least one metal-containing polymer. The at least one organic electrophile comprises at least one monomer, oligomer or polymer, and more particularly, the at least one organic monomer, oligomer or polymer comprising a plurality of organic, electrophilic constituents. The metal-containing polymer comprises at least one monomer, oligomer or polymer, and more particularly, at least one metal-nitrogen polymer comprising at least one monomer, oligomer or polymer, where the metal comprises at least one metal comprising IUPAC (International Union of Pure and Applied Chemistry) Groups 1 through 12 metals, the lanthanide series metals, and metals and metalloids of IUPAC Groups 13 and 14, including boron. For the purposes of the present invention the term metal-containing polymer is intended to included, for example, aluminum, silicon, and boron containing polymers.

The novel compositions of the present invention are derived from the novel mixtures and comprise hybrid polymer or ceramer compositions. The compositions may be uncrosslinked, partially crosslinked, substantially crosslinked or substantially completely crosslinked.

Moreover, the novel compositions may further comprise at least one filler or reinforcement. The filler-containing compositions are derived from novel mixtures of the present invention that are induced to at least partially embed or surround at least one filler or reinforcement. As with the unfilled or unreinforced compositions, the at least partially filled or reinforced hybrid polymer or ceramer compositions of the present invention may be uncrosslinked, partially crosslinked, substantially crosslinked or substantially completely crosslinked.

The present invention further relates to novel mixtures and the novel, unfilled or filled, compositions derived from the mixtures. The mixtures comprise (1) at least one organic electrophile comprising at least one organic monomer, oligomer, or polymer comprising a plurality of organic, electrophilic substituents, and (2) at least one metal-nitrogen monomer, oligomer or polymer. Moreover, the novel, unfilled or filled, hybrid polymer or ceramer compositions may be uncrosslinked, partially crosslinked, substantially crosslinked or substantially completely crosslinked.

In a preferred embodiment of the present invention, novel mixtures comprise, and novel compositions are derived from, (1) at least one organic electrophile comprising at least one monomer, oligomer or polymer comprising a plurality of organic, electrophilic substituents and (2) at least one metal-containing polymer comprising at least one metal-nitrogen polymer comprising at least one metal of IUPAC Groups 1 through 12 metals, the lanthanide series metals and metals and metalloids of IUPAC Groups 13 and 14, including boron. Preferably, the at least one metal of the at least one metal-nitrogen polymer comprises at least one of IUPAC Group 2 through 4 metals, the lanthanide series metals, and metals and metalloids of IUPAC Groups 13 and 14, including boron. More preferably, the at least one metal of the at least one metal-nitrogen polymer comprises at least one of the metal and metalloids of IUPAC Groups 13 and 14, including boron. The novel hybrid polymer or ceramer compositions derived from novel mixtures may be unfilled or filled and/or may be uncrosslinked, partially crosslinked, substantially crosslinked or substantially completely crosslinked.

In an even more preferred embodiment of the present invention, novel mixtures comprise and novel compositions are derived from, reaction mixtures comprising (1) at least one organic electrophile comprising at least one organic monomer, oligomer, or polymer comprising a plurality of organic, electrophilic substituents, and (2) at least one metal-containing polymer comprising at least one of: (i) at least one metal-nitrogen polymer comprising at least one of silicon-nitrogen polymers, aluminum-nitrogen polymers, and boron-nitrogen polymers comprising a plurality of sequentially bonded repeat units of the form (a), (b), (c), and (d), recited below:

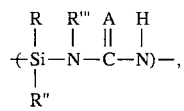 (a)

 (b)

 (c)

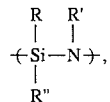 (d)

respectively, where R, R', R", and R'''=hydrogen, alkyl, alkenyl, alkynyl or aryl and A=O or S; (ii) mixtures of two or more metal-nitrogen polymers comprising two or more of the structural units (a), (b), (c), and (d); (iii) metal-crosslinked metal-nitrogen polymers comprising one or more of the structural units (a), (b), (c), and (d); and (iv) metal-nitrogen copolymers comprising two or more of the structural units (a), (b), (c), and (d). These reaction mixtures react to form novel, uncrosslinked hybrid polymer or ceramer compositions which incorporate at least one organic electrophile comprising the at least one organic monomer, oligomer, or polymer into the structure of the one or more metal-containing polymers and which, in a subsequent step, may be crosslinked. In a further preferred embodiment, an uncrosslinked liquid hybrid polymer or ceramer reaction product of the at least one organic electrophile and the one or more metal-containing polymers comprises a liquid which may be cured to a rigid solid by crosslinking after processing the liquid into a desired shape. The cure may be accomplished by effecting crosslinking by providing an energy input using at least one activation means comprising, for example, thermal activation or radiation induced activation, to effect crosslinking through an ionic or radical-based crosslinking mechanism.

In a further preferred embodiment, the hybrid polymer or ceramer reaction products comprise sites of organounsaturation such as alkenyl or alkynyl groups. Thus, when R=alkenyl or alkynyl groups, these reaction product compositions may then be crosslinked by supplying an energy input in the form of, for example, thermal energy or radiation, such as ultraviolet radiation, microwave radiation or electron beam radiation, to crosslink, to a desirable extent, the hybrid polymer or ceramer compositions. In this case, crosslinking occurs by activating alkenyl-based or alkynyl-based polymerization of the alkenyl or alkynyl groups within these compositions. When the reaction product comprises a liquid, such crosslinking provides a mechanism for curing the liquid to a rigid solid, if desired, after processing the liquid into a desired shape.

The at least one organic electrophile comprising organic monomers, oligomers, or polymers comprising a plurality of electrophilic substituents suitable for the practice of this invention may be defined as organic monomers, oligomers or polymers which contain a plurality of one or more reactive groups which may attack the electron density of the metal-nitrogen bond (e.g., Si-N bonds, Al-N bonds, B-N bonds, etc.) of the metal-containing polymer, resulting in the breaking of these bonds and, subsequently, the formation of new bonds. Alternatively, when R'=H, the at least one organic electrophile comprising organic monomers, oligomers, or polymers may preferentially, but not exclusively, react at the N-H bonds of the metal-containing polymer.

Either mechanism provides for the incorporation of the at least one organic electrophile comprising at least one organic monomer, oligomer or polymer into the structure of the metal-containing polymers. In a preferred embodiment of the invention, such organic electrophiles comprise liquids to increase the probability for reaction of the at least one organic electrophile comprising at least one organic monomer, oligomer or polymer with the one or more metal-containing polymers.

Typical examples of electrophilic groups which are suitable electrophilic substituents for the multifunctional electrophile include groups containing, for example, the following bonding schemes:

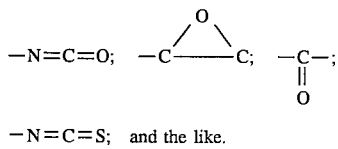

$-N=C=S$; and the like.

Typical examples of the at least one organic electrophile comprising organic monomers, oligomers or polymers suitable for the practice of this invention include, for example, multifunctional organic isocyanates, multifunctional compounds comprising amide linkages such as polyamides, multifunctional compounds comprising imide linkages such as polyimides, multifunctional epoxides, multifunctional compounds comprising ester linkages, such as polyacrylates, polycarbonates, polyvinylacetates, or polyesters, or multifunctional esters such as dimethyl adipate, quinones (which can undergo sequential 1,4 addition reactions) and multifunctional organic acids such as polyacrylic acid.

While a wide variety of such hybrid polymers or ceramers are possible, in a preferred embodiment of the present invention those derived from metal-nitrogen polymers, for example, silicon-nitrogen polymers, aluminum-nitrogen polymers, or boron-nitrogen polymers comprising a plurality of sequentially bonded repeat units of the form (a), (b), (c), and (d), recited below:

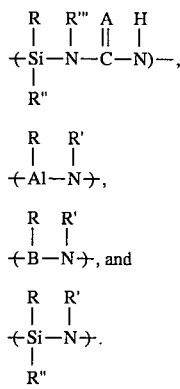

where R, R', R", and R'''=hydrogen, alkyl, alkenyl, alkynyl or aryl and A=O or S, have demonstrated remarkable high temperature as well as ambient temperature performance characteristics. In a preferred embodiment of the present invention, liquid metal-containing polymers containing the units (a), (b), (c), and (d) above and wherein R=alkenyl or alkynyl are particularly advantageous, due to their tendency to generate liquid reaction products with the organic electrophiles and their ability to then generate rigid, crosslinked structures through metal-alkenyl or metal-alkynyl group crosslinking after the reaction product has been shaped by a forming process such as suitable molding technologies. Alternatively, in another preferred embodiment of the present invention, hybrid polymer or ceramer compositions may be heated to temperatures at which thermally-induced condensation crosslinking occurs (for example, in polyureasilazanes comprising Si-H bonds condensation crosslinking may occur with the evolution of hydrogen gas) or by providing to the hybrid polymers or ceramers groups which enable chemical crosslinking through an ionic mechanism.

Such hybrid polymers or ceramers may be prepared by reacting metal-containing polymers with at least one organic electrophile comprising at least one organic monomer, oligomer, or polymer comprising a plurality of organic, electrophilic substituents to prepare an uncrosslinked composition which may then be crosslinked in a subsequent processing step. In a preferred embodiment, the at least one organic electrophile comprising at least one organic monomer, oligomer, or polymer comprising a multiplicity of organic, electrophilic substituents comprises a liquid.

Furthermore, in a preferred embodiment of the present invention, the reaction product of the at least one organic electrophile with a metal-containing polymer comprises a liquid which may be cured to a rigid solid, if desired, after processing the liquid into a desired shape. The curing may be accomplished by providing an energy input using at least one activation means comprising thermal activation or radiation induced activation to effect crosslinking through an ionic or radical crosslinking mechanism. In a further preferred embodiment, it is especially advantageous when the reaction product of the at least one organic electrophile and the at least one metal-containing polymer comprises sites of organounsaturation such as alkenyl or alkynyl groups. In a subsequent step, alkenyl-based or alkynyl-based crosslinking in the reaction product may be effected by providing an energy input in the form of, for example, heat or irradiation which may be used to provide the mechanism for curing the liquid reaction product to a rigid solid after processing the liquid into a desired shape. More preferred compositions wherein R=alkenyl and more preferably wherein the alkenyl group comprises vinyl may additionally comprise a free radical initiator, such as, for example, a peroxide or azo compound which may promote alkenyl crosslinking in the reaction product at relatively low temperatures. In another preferred embodiment, compositions wherein R=alkenyl and more preferably wherein the alkenyl group comprises allyl may additionally comprise a UV initiator or sensitizer which promotes crosslinking upon UV irradiation. Suitable metal-containing polymers may also include: at least one mixture of two or more metal-nitrogen polymers comprising two or more of the structural units (a), (b), (c), and (d); at least one metal-crosslinked metal-nitrogen polymer comprising one or more of the structural units (a), (b), (c), and (d); and at least one metal-nitrogen copolymer comprising two or more of the structural units (a), (b), (c), and (d).

Representative of metal-containing polymers comprising the repeat units (a) comprise those polymers disclosed in, for example, U.S. Pat. No. 4,929,704 entitled "Isocyanate- and Isothiocyante-Modified Polysilazane Ceramic Precursors", which issued in the name of Schwark, on May 29, 1990; U.S. Pat. No. 5,001,090 entitled "Silicon Nitride Ceramics from Isocyanate- and Isothiocyante-Modified Polysilazanes" which issued in the name of Schwark, on Mar. 19, 1991; and U.S. Pat. No. 5,021,533 entitled "Crosslinkable Poly(thio)ureasilazane Composition Containing a Free Radical Generator", which issued in the name of Schwark, on Jun. 4, 1991; and polymers described in references contained in these U.S. Patents. The entire disclosures of these U.S. Patents are specifically incorporated herein by reference.

Representative of metal-containing polymers comprising the repeat units (b) comprise those polymers described in, for example, U.S. Pat. No. 3,505,246 entitled "Nitrogen Aluminum Hydride Polymers and Methods of Making the Same", which issued in the names of Ehrlich et al., on Apr. 7, 1970; U.S. Pat. No. 4,687,657 entitled "Fabrication of SiC-AlN Alloy", which issued in the names of Clark et al., on Aug. 18, 1987; U.S. Pat. No. 4,696,968 entitled "Melt-Formable Organoaluminum Polymer", which issued in the name of Tebbe, on Sep. 29, 1987, and U.S. Pat. No. 5,276,105, entitled "Polymer Precursors for Aluminum Nitride", which issued in the name of Jensen, on Jan. 4, 1994; and polymers described in references contained in these U.S. Patents. The entire disclosures of these U.S. Patents are specifically incorporated herein by reference.

Representative of metal-containing polymers comprising the repeat units (c) comprise those polymers described in, for example, U.S. Pat. No. 4,707,556 entitled "Boron Nitride Polymeric Precursors", which issued in the names of Paciorek et al., on Nov. 17, 1987; U.S. Pat. No. 4,581,468 entitled "Boron Nitride Preceramic Polymers", which issued in the names of Paciorek et al., on Apr. 8, 1986; U.S. Pat. No. 3,288,726 entitled "B-N Linked Borazane Derivatives and Their Preparation", which issued in the name of Wagner, on Nov. 29, 1966; and in the article by R. T. Paine and C. K. Narula, Chem. Rev., 90 (1990) 73–91 and polymers described in references contained therein. The entire disclosures of these U.S. Patents and the article are specifically incorporated herein by reference.

Representative of metal-containing polymers comprising the repeat units (d) comprise those polymers described, for example, in U.S. Pat. No. 4,482,669 entitled "Preceramic Organosilazane Polymers", which issued in the names of Seyferth et al., on Nov. 13, 1984; U.S. Pat. No. 4,774,312 entitled "Polydisilacyclobutasilazanes", which issued in the name of Burns, on Sep. 27, 1988; U.S. Pat. No. 4,689,252 entitled "Polysilazane Composition which can Crosslink in the Presence of a Metal Compound Catalyzing a Hydrosilylation Reaction", which issued in the names of Lebrun et al., on Aug. 25, 1987; U.S. Pat. No. 4,612,383 entitled "Method of Producing Polysilazanes", which issued in the names of Laine et al., on Sep. 16, 1986; U.S. Pat. No. 4,675,424 entitled "Method of Making Polysilazanes", which issued in the names of King, III, et al., on Jun. 23, 1987; U.S. Pat. No. 4,722,988 entitled "Organopolysilazane Composition Containing Free Radical Generators and Capable of Being Crosslinked by an Energy Input", which issued in the names of Porte et al., on Feb. 2, 1988; U.S. Pat. No. 5,155,181 entitled "(Thio)amide-Modified Silazane Polymer Composition Containing a Free Radical Generator", which issued in the name of Schwark, on Oct. 13, 1992; U.S. Pat. No. 5,032,649 entitled "Organic Amide-Modified Polysilazane Ceramic Precursors", which issued in the name of Schwark, on Jul. 16, 1991; U.S. Pat. No. 4,929,704 entitled "Isocyanate- and Isothiocyante-Modified Polysilazane Ceramic Precursors", which issued in the name of Schwark, on May 29, 1990; U.S. Pat. No. 5,001,090 entitled "Silicon Nitride Ceramics from Isocyanate- and Isothiocyante-Modified Polysilazanes", which issued in the name of Schwark, on Mar. 19, 1991; U.S. Pat. No. 5,021,533 entitled "Crosslinkable Poly(thio)ureasilazane Composition Containing a Free Radical Generator", which issued in the name of Schwark, on Jun. 4, 1991; U.S. Pat. No. 3,853,567 entitled "Production of Shaped Articles of Homogeneous Mixtures of Silicon Carbide and Nitride", which issued in the name of Verbeck, on Dec. 10, 1974, and polymers described in references contained therein. The entire disclosures of these U.S. Patents are specifically incorporated herein by reference.

Representative of metal-containing polymer mixtures of polymers comprising the structural units (b) and (c) comprise those polymers described, for example, in U.S. Pat. No. 4,764,489 entitled "Preparation of Mixed Boron and Aluminum Nitrides", which issued in the name of Bolt, on Aug. 16, 1988, and polymers described in references contained therein. The entire disclosure of U.S. Pat. No. 4,764,489 is specifically incorporated herein by reference.

Representative of polymer mixtures of metal-containing polymers comprising the structural units (b) and (d) comprise those polymers disclosed in, for example, U.S. Pat. No. 5,229,468, entitled "Polymer Precursor for Silicon Carbide/Aluminum Nitride Ceramics", which issued in name of Jensen, on Jul. 20, 1993, and polymers described in references contained therein. The entire disclosure of U.S. Pat. No. 5,229,468 is specifically incorporated herein by reference.

Representative of polymer mixtures of metal-containing polymers comprising the structural units (c) and (d) comprise those polymers described, for example, in U.S. Pat. No. 5,164,344 entitled "Borosilazanes as Binders for the Preparation of Sintered Silicon Carbide Monoliths", which issued in the name of Zank, on Nov. 17, 1992, and polymers described in references contained therein. The entire disclosures of U.S. Pat. No. 5,164,344 is specifically incorporated herein by reference.

Important applications include the use as coatings or molding of these polymeric materials, with or without the inclusion of fillers or reinforcements to achieve hybrid polymer or ceramer coatings on substrate materials or molded the unfilled or filled polymers shaped into a desired object. Such polymeric materials are, in themselves, desirable because they possess a variety of characteristics otherwise unobtainable using conventional materials. Often such objects may be heat-treated to temperatures below their pyrolysis temperatures (e.g. to temperatures within the range of about 25° C. to about 500° C.) to achieve a desirable crosslink density without conversion to a ceramic material. Such processing is often desirable when a coating or molded object comprising such hybrid polymer or ceramer materials is exposed to temperatures within this range during its use. While the metal-containing polymers suitable for the practice of this invention may comprise any metal, in a preferred embodiment of the present invention compositions comprise metal-nitrogen polymers containing, for example, the metals silicon, aluminum, boron and combinations thereof. Crosslinking may be effected by providing an energy input using various activation means including, for example, thermal activation or radiation induced activation to effect crosslinking through an ionic or radical-based mechanism.

It has been unexpectedly discovered that crosslinked, covalently-bonded copolymers comprising: (1) organic segments derived from organic electrophiles, and (2) inorganic fractions derived from segments of metal-nitrogen polymers, demonstrate various desirable synergistic combinations of properties. For example, these copolymers exhibit the high mechanical strengths of their wholly organic counterparts at ambient temperature, as well as the extended high temperature performance of their wholly inorganic counterparts. Such combinations of properties overcome many of the limitations encountered in wholly organic or wholly inorganic polymers.

Moreover, it has also been discovered that such crosslinked, covalently-bonded hybrid copolymers or ceramers exhibit certain desirable characteristics (such as, for example, extended thermal stability and high thermal char relative to their wholly organic counterparts) when used in high temperature applications or applications where char-forming behavior is important. With regard to char formation, it is well known that char-forming materials such as phosphates are used as additives to organic polymers as flame retardants. The hybrid polymer or ceramer compositions of the present invention which exhibit high char yields are thus flame retardant compositions.

Moreover, it has also been unexpectedly discovered that covalently-bonded hybrid polymers or ceramers exhibit certain desirable characteristics (such as, for example, weatherability or UV light resistance relative to their wholly organic counterparts) when used in outdoor applications as, for example, molded objects or coatings.

Moreover, it has also been unexpectedly discovered that the covalently bonded hybrid polymers or ceramers exhibit certain desirable characteristics (such as, for example, adhesion to, for example, metals, organic polymers, inorganic polymers, ceramics, metal matrix composites, polymer matrix composites, ceramic matrix composites, natural materials, etc., relative to their wholly organic or wholly inorganic counterparts) when used in, for example, the joining of similar or dissimilar materials or the formation of filled or reinforced hybrid or ceramer matrix composites.

Moreover, it has also been unexpectedly discovered that certain covalently-bonded hybrid polymers or ceramers exhibit certain desirable characteristics (such as, for example, superior non-frictional properties or non-stick properties relative to their wholly organic counterparts) when used in, for example, cookware applications or room temperature or high temperature mechanical equipment or chemical processing equipment.

Moreover, it has also been unexpectedly discovered that certain of the covalently bonded hybrid polymers or ceramers exhibit certain desirable characteristics (such as, for example, wear resistance or abrasion resistance relative to their wholly organic counterparts) when used as coatings at room temperature and elevated temperatures.

Moreover, it has also been unexpectedly discovered that certain of the covalently bonded hybrid polymers or ceramers exhibit certain desirable characteristics (such as, for example, transparency and dimensional stability relative to their wholly organic counterparts) when used at, for example, elevated temperatures as transparent objects.

It is expected that any number of combinations of properties of the hybrid polymers or ceramers may be tailored to exhibit more desirable room temperature and/or high temperature characteristics relative to their wholly organic and/or wholly inorganic parts. These characteristics include, for example, transparency and/or rigidity or stiffness and/or abrasion resistance and/or weatherability or UV light resistance and/or permeability and/or water repellency and/or fatigue resistance and/or creep resistance and/or frictional properties and/or wear resistance and/or flame resistance and/or temperature resistance and/or electrical insulating properties (e.g., dielectric properties) and/or low moisture absorption (e.g., water, steam, etc.) and/or coefficient of thermal expansion and/or thermal conductivity and/or radiation resistance and/or dimensional stability and/or dimensional tolerance stability and/or adhesion and/or dissipation factor and/or corrosion resistance and/or erosion resistance, etc.

The unexpected superior properties of the polymers of the present invention, that is, the hybrid polymers or ceramers of the present invention result from the synergism of the organic and inorganic components disclosed above herein.

Definitions

"Copolymer", as used herein, means a polymer made from two or more monomers, oligomers or polymers corresponding to different repeat units, where the different repeat units are incorporated in the same polymeric molecule or chain. Copolymers include random copolymers, di-block copolymers, multiblock copolymers, alternating copolymers, graft copolymers, organic copolymers, inorganic copolymers, hybrid copolymers (e.g., both organic and inorganic backbone copolymers), organic graft copolymers, inorganic graft copolymers, hybrid graft copolymers (e.g., both organic and inorganic grafts on the same copolymer), terpolymers, etc.

"Organic Electrophile", as used herein, means at least one organic monomer, oligomer or polymer comprising a plurality of electrophilic substituents wherein each of the at least one organic monomer, oligomer or polymer contains a plurality of one or more electrophilic, reactive groups which may attack the electron density of a metal-containing polymer and in a preferred embodiment a metal-nitrogen bond (e.g., Si-N bonds, Al-N bonds, B-N bonds, etc.) of the metal-containing polymer resulting in the breaking of these bonds and, subsequently, the formation of new bonds. Alternatively, when the metal-containing polymer comprises a metal-nitrogen polymers comprising side groups comprising hydrogen bonded to nitrogen, the at least one electrophilic organic comprising organic monomer, oligomer or polymer may preferentially react at the N-H bonds of the metal-containing polymer. Examples of electrophilic groups which are suitable electrophilic substituents for the multifunctional electrophile include groups containing, for example, the following bonding schemes:

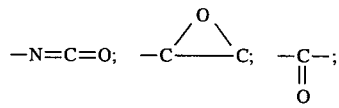

$-N=C=S$; and the like.

Examples of organic electrophiles comprising organic monomers, oligomers or polymers suitable for the practice of the present invention include, for example, multifunctional organic isocyanates, multifunctional compounds comprising amide linkages (such as polyamides), multifunctional compounds comprising imide linkages (such as polyimides), multifunctional epoxides, multifunctional compounds comprising ester linkages (such as polyacrylates, polycarbonates, polyvinyl acetates, polyesters, etc.), or multifunctional esters (such as dimethyladipate), quinones (which undergo sequential 1,4 addition reactions) and multifunctional organic acids such as polyacrylic acid.

"Filler" or "Reinforcement", as used herein, is intended to include either single constituents or mixtures of constituents which are either chemically reactive and/or which are substantially unaffected by and/or of limited solubility in the polymer matrix and may be single or multiple phase. Fillers may be provided in a wide variety of forms and sizes, such as powders, flakes, platelets, microspheres (both hollow and solid), whiskers, bubbles, etc., and may be either dense or porous. Filler may also include ceramic fillers, such as alumina or silicon carbide or boron carbide and zirconium oxide, as continuous fibers, yarns or tows, chopped fibers, particulates, whiskers, bubbles, spheres, fiber mats, three-dimensionally woven structures, or the like, mixtures thereof, and coated fillers such as ceramic coated fillers such as carbon fibers coated with alumina or silicon carbide. Fillers may also include metal fillers, such as fibers, chopped fibers, particulates, whiskers, bubbles, spheres, fiber mats, woven three-dimensional structures, or the like, mixtures thereof and metal-coated fillers such as organic or inorganic fibers coated with metal, IUPAC Groups 1 through 12 metals, the lanthanide series metals and metals and metalloids of IUPAC Groups 13 and 14, including boron and alloys and/or combinations thereof. Furthermore, fillers may also include plastic or polymer fillers, such as olefinics, vinylics, styrenics, acrylonitrilics, acrylics, cellulosics, polyamides, polyesters, polyacarbonates, sulfone polymers, imide polymers, ether-oxide polymers, ketone polymers, fibropolymers and combinations thereof as fibers, chopped fibers, particulates, whiskers, bubbles, spheres, fiber mats, three-dimensionally woven structures, or the like, mixtures thereof and coated plastic or organic fillers such as nylon fibers coated with a metal and the like. Furthermore, fillers or reinforcement in a particulate class may include, but are not limited to, minerals (e.g., calcium carbonate, silica, kaolin, talc, alumina trihydrate, feldspar, baryte, calcium sulfate, etc.), solid or hollow glass spheres, metal oxides (e.g., oxides and mixed oxides of metals of IUPAC Groups 1 through 12, the lanthanide series metals, metals and metalloids of IUPAC Groups 13 and 14, including boron, etc.), metal carbides (e.g., carbides and mixed carbides of metals of IUPAC Groups 1 through 12, the lanthanide series metals, metals and metalloids of IUPAC Groups 13 and 14, including boron, etc), metal borides (e.g., boride and mixed borides of metals of IUPAC Groups 1 through 12, the lanthanide series metals, metals and metalloids of IUPAC Groups 13 and 14, etc.), metal nitrides (e.g., nitride and mixed nitrides of metals of IUPAC Groups 1 through 12, the lanthanide series metals, metals and metalloids of IUPAC Groups 13 and 14, including boron, etc.), carbon black, and the like, as particulates. Fillers or reinforcements in a fiber class include glass fibers, carbon or graphite fibers, metal fibers, asbestos, whiskers, polymeric fibers (e.g., polyamides, polyesters, alaphatic polyamides, polyethyleneterathalates, aramides, aromatic polyamides, polyetherketone, polyethylene, etc.) and ceramic fibers (e.g., NICALON™ silicon carbide, etc.). Fillers or reinforcements primarily in the disc or platey class include, for example, mica, glass flakes, alumina flakes, aluminum, etc.

"Hybrid Polymer" or "Ceramer", as used herein, means an oligomer, polymer, copolymer or polymer alloy which is comprised of a plurality of metal-containing segments and a plurality of organic segments. The hybrid polymer or ceramer may be at least one of copolymeric or polymer alloy. Hybrid polymers or ceramers may include random copolymers, di-block copolymers, multiblock copolymers, alternating copolymers, graft copolymers, terpolymers, etc.

"Metal-Containing Polymer", as used herein, means a metal-containing monomer, oligomer or polymer. In a preferred embodiment, the metal-containing monomer, oligomer or polymer comprises a metal-nitrogen polymer. Metal, when used in combination with metal-containing and in particular with metal-nitrogen polymer means a metal from IUPAC (International Union of Pure and Applied Chemistry) Groups 1 through 12, the lanthanide series metals and metals and metalloids from IUPAC Groups 13 and 14, including boron. Preferred metals comprise metals from IUPAC Groups 2 through 4, the lanthanide series metals, and metals and metalloids from IUPAC Groups 13 and 14, including boron. More preferred metals comprise metals from metals and metalloids from IUPAC Groups 13 and 14, including boron. Even more preferred metals comprise silicon, aluminum and boron.

"Metal Matrix Composite" or "MMC", as used herein, means a material comprising two or three-dimensionally interconnected alloy or matrix metal which has embedded at least one reinforcing phase. The matrix metal may include various alloying elements to provide specifically desired mechanical and/or physical properties in the resulting composite.

"Metal-Nitrogen Polymer", as used herein, means monomers, oligomers or polymers comprising repeat units wherein metal atoms are bonded to at least one nitrogen atom. In a preferred embodiment, the metal atoms are bonded to at least two nitrogen atoms. Metal-nitrogen polymers include metal-nitrogen monomers, oligomers or polymers, wherein the metal comprises a metal from IUPAC (International Union of Pure and Applied Chemistry) Groups 1 through 12, the lanthanide series metals, metals and metalloids from IUPAC Groups 13 and 14, including boron. Preferred metals comprise metals from IUPAC Groups 2 through 4, the lanthanide series metals, and the metals and metalloids of IUPAC Groups 13 and 14, including boron. More preferred metals comprise metals from metals and metalloids from IUPAC Groups 13 and 14, including boron. Even more preferred metals comprise silicon, aluminum and boron. Even more preferred, metal-nitrogen polymers include silicon-nitrogen polymers, aluminum-nitrogen polymers, boron-nitrogen polymers, mixtures of two or more metal-nitrogen polymers, metal-crosslinked metal-nitrogen polymers and metal-nitrogen copolymers. The metal-nitrogen polymers can be in the form of at least one of cyclic oligomers, cage compounds, ring base polymers, linear polymers, etc.

"Mixture" or "Reaction Mixture", as used herein, means the physical combination of at least organic one monomer, oligomer or polymer and at least one metal-containing monomer, oligomer or polymer.

"Monomer", as used herein, means a molecule or chemical compound comprising one repeat unit with an inherent capability of forming chemical bonds with the same and/or other monomers oligomers or polymers in such a manner that oligomeric and/or polymeric molecules or macromolecules are formed. Monomers include molecules or chemical compounds which are wholly organic, wholly inorganic or hybrid (i.e., organic and inorganic).

"Oligomer", as used herein, means a molecule or chemical compound which comprises several repeat units, generally from about 2 to about 10 repeat units. Oligomers have an inherent capability of forming chemical bonds with the same and/or other monomers and/or oligomers and/or polymers in such a manner that oligomeric and/or polymeric molecules or macromolecules are formed including molecules or chemical compounds which are wholly organic, wholly inorganic, or hybrid (i.e., organic and inorganic).

"A Plurality or Multiplicity of Electrophilic Substituents", as used herein, means at least two reactive groups within the same monomer, oligomer or polymer which cause metal-nitrogen bond (e.g., the S-N bond in a silicon-nitrogen co-reactant polymer) or nitrogen-hydrogen bond (N-H bond) scission within a metal-nitrogen co-reactant polymer. Examples of electrophilic groups which are suitable electrophilic substituents for the multifunctional electrophile include groups containing, for example, the following bonding schemes:

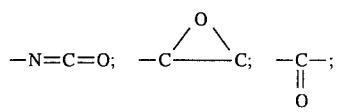

$-N=C=S;$ and the like.

"Polymer", as used herein, means a molecule or compound which comprises a large number of repeat units, generally greater than about 10 repeat units. Polymer includes thermosetting polymers, thermoplastic polymers, elastomers, amorphous polymers, crystalline polymers, semicrystalline polymers, homopolymers, heteropolymers, copolymers, polymer alloys, linear or unbranched polymers, branched polymers such as macromolecules comprising long branching, short branching or mixed long and short branching, cyclic polymers, crosslinkable polymers, crosslinked polymers, polymeric network polymers, interpenetrating polymeric networks, combinations thereof, etc. Additionally, polymers include wholly organic, wholly inorganic and hybrid (i.e., organic and inorganic) chemical macromolecules.

"Preform" or "Permeable Preform", as used herein, means a porous mass of at least one filler or reinforcement which is manufactured with at least one surface boundary which essentially defines a boundary for infiltrating matrix materials, such mass retaining sufficient shape integrity and green strength to provide dimensional fidelity prior to being infiltrated by the matrix. The mass should be sufficiently porous to accommodate infiltration of the matrix thereinto. A preform typically comprises a bounded array or arrangement of filler or reinforcement, either homogeneous or heterogeneous, and may be comprised of any suitable material (e.g., mineral and/or ceramic and/or polymer and/or metal and/or composite particulates, powders, fibers, whiskers, etc.), and any combination thereof). A preform may exist either singularly or as an assemblage.

"Ceramic Matrix Composite" or "CMC" or "Ceramic Composite Body", as used herein, means a material comprising a two- or three-dimensionally interconnected ceramic which has embedded at least one reinforcement phase, and may further include a metal phase embedded therein; possibly in a two- or three-dimensionally interconnected network.

"Polymer Matrix Composite" or "PMC", as used herein, means a material comprising a two-or three-dimensionally interconnected matrix polymer which has embedded at least one filler or at least one preform of at least one filler. The matrix polymer may include various polymers to provide specifically desired chemical, mechanical and physical properties in the resulting composite.

DETAILED DESCRIPTION OF THE INVENTION

Figure 1:
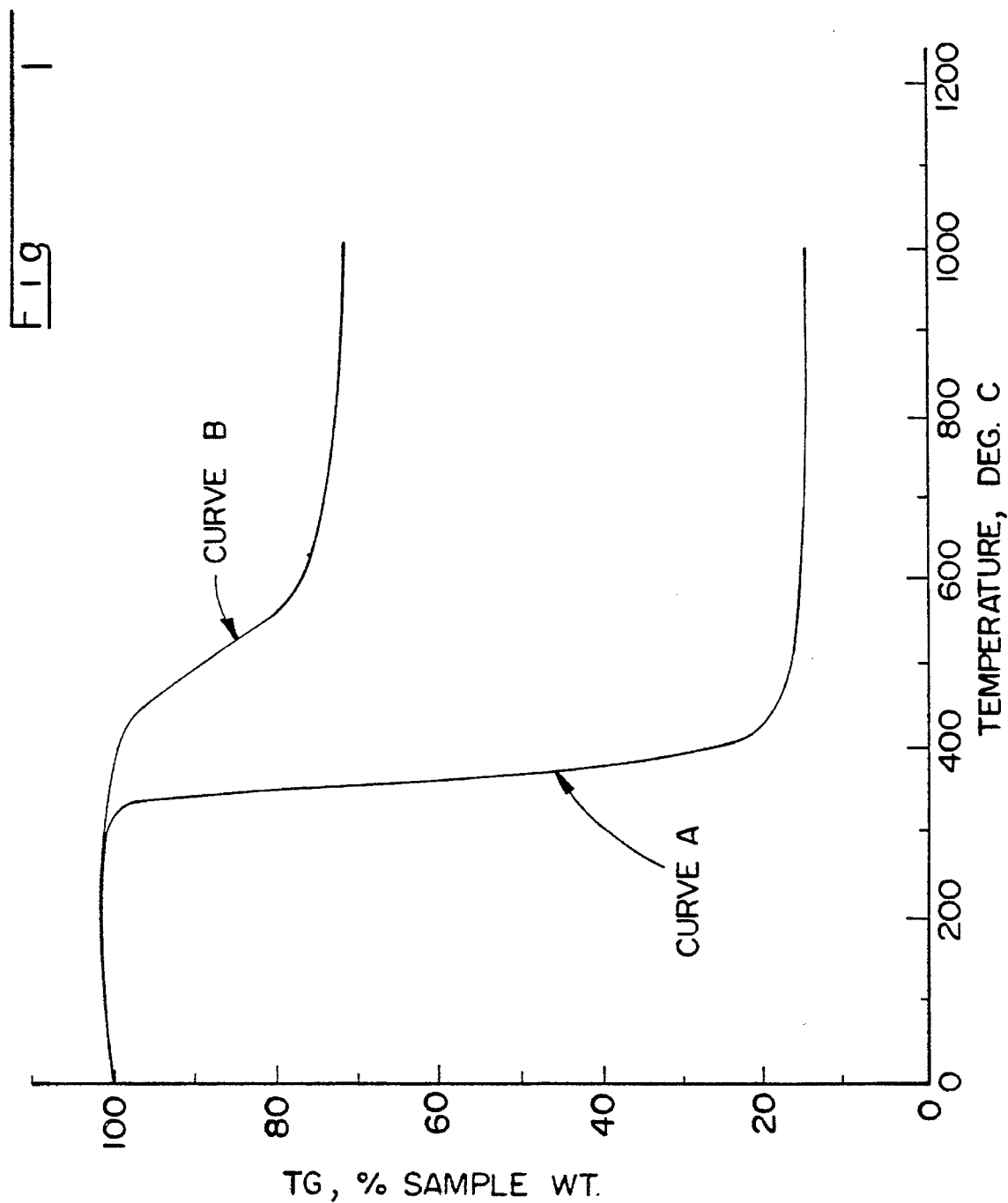
FIG. 1 represents a comparison of weight retained (TG, % Sample Wt.) as a function of temperature for a wholly organic epoxy resin composition (Curve A) and a hybrid or ceramer epoxy resin (about 50 wt %) composition (Curve B) comprising a silicon-nitrogen polymer coreactant (about 50 wt %) when the samples are heated to about 1000° C. in a nitrogen atmosphere at about 5° C. per minute (Thermal Gravimetric Analysis technique).

Briefly, the present invention relates to novel mixtures and the novel compositions derived from the mixtures. The novel mixtures comprise at least one organic electrophile and at least one metal-containing polymer. The at least one organic electrophile comprises at least one monomer, oligomer or polymer, and more particularly, the at least one organic monomer, oligomer or polymer comprising a plurality of organic, electrophilic constituents. The metal-containing polymer comprises at least one monomer, oligomer or polymer, and more particularly, at least one metal-nitrogen polymer comprising at least one monomer, oligomer or polymer, wherein the metal comprises at least one metal comprising IUPAC (International Union of Pure and Applied Chemistry) Groups 1 through 12 metals, the lanthanide series metals, and metals and metalloids of IUPAC Groups 13 and 14, including boron.

The novel compositions of the present invention are derived from the novel mixtures and comprise hybrid polymer or ceramer compositions. The compositions may be uncrosslinked, partially crosslinked, substantially crosslinked or substantially completely crosslinked.

Moreover, the novel compositions may further comprise at least one filler or reinforcement. The filler-containing compositions are derived from novel mixtures of the present invention that are induced to at least partially embed or surround at least one filler or reinforcement. As with the unfilled or unreinforced compositions, the at least partially filled or reinforced hybrid polymer or ceramer compositions of the present invention may be uncrosslinked, partially crosslinked, substantially crosslinked or substantially completely crosslinked.

Particularly, the present invention relates to novel mixtures and the novel, unfilled or filled, compositions derived from the mixtures. The mixtures comprise (1) at least one organic electrophile comprising at least one organic monomer, oligomer, or polymer comprising a plurality of organic, electrophilic substituents, and (2) at least one metal-nitrogen monomer, oligomer or polymer. Moreover, the novel, unfilled or filled, hybrid polymer or ceramer composition may be uncrosslinked, partially crosslinked, substantially crosslinked or substantially completely crosslinked.

In a preferred embodiment of the present invention, novel mixtures comprise, and novel compositions are derived from, (1) at least one organic, electrophile comprising at least one monomer, oligomer or polymer comprising a plurality of organic, electrophilic substituents and (2) at least one metal-containing polymer comprising at least one metal-nitrogen polymer comprising at least one metal of IUPAC Groups 1 through 12 metals, the lanthanide series metals and metals and metalloids of IUPAC Groups 13 and 14, including boron. Preferably, the at least one metal of the at least one metal-nitrogen polymer comprise at least one of IUPAC Group 2 through 4 metals, the lanthanide series metals, and metals and metalloids of IUPAC Groups 13 and 14, including boron. More preferably, the at least one metal of the at least one metal-nitrogen polymer comprises at least one of the metal and metalloids of IUPAC Groups 13 and 14, including boron. For the purposes of the present invention the term metal-containing polymer is intended to included, for example, aluminum, silicon, and boron containing polymers. The novel hybrid polymer or ceramer compositions derived from novel mixtures may be unfilled or filled and/or may be uncrosslinked, partially crosslinked, substantially crosslinked or substantially completely crosslinked.

In an even more preferred embodiment of the present invention, novel mixtures comprise, and novel compositions are derived from, reaction mixtures comprising (1) at least one organic electrophile comprising at least one organic monomer, oligomer or polymer comprising a plurality of organic, electrophilic substituents, and (2) at least one metal-containing polymer comprising, for example, at least one of: (i) at least one metal-nitrogen polymer selected from the group consisting of silicon-nitrogen polymers, aluminum-nitrogen polymers and boron-nitrogen polymers comprising a multiplicity of sequentially bonded repeat units of the form (a), (b), (c), and (d), recited below:

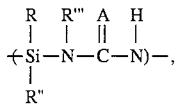   (a)

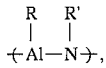   (b)

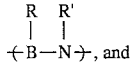   (c)

   (d)

respectively, where R, R', R", and R'"32 hydrogen, alkyl, alkenyl, alkynyl or aryl groups and A=O or S; (ii) at least one mixture of two or more metal-nitrogen polymers comprising two or more of the structural units (a), (b), (c), and (d); (iii) at least one metal-nitrogen metal-crosslinked polymers comprising one or more of the structural units (a), (b), (c), and (d); and (iv) at least one copolymer comprising two or more of the structural units (a), (b), (c), and (d). These reaction mixtures may be induced to react to form novel, uncrosslinked hybrid polymer or ceramer compositions which incorporate the at least one organic electrophile comprising at least one organic monomer, oligomer, or polymer into the structure of the one or more metal-containing polymers and which, in a subsequent step, may be crosslinked. In a preferred embodiment, the reaction product of the at least one organic electrophile comprising at least one organic monomer, oligomer or polymer and the one or more metal-containing polymers may be a liquid which may be cured to a rigid solid by crosslinking after processing the liquid into a desired shape. The cure may be effected by providing crosslinking using an energy input using at least one activation means comprising, for example, thermal activation or radiation-induced activation to effect crosslinking through an ionic or radical-based crosslinking mechanism.

In a further preferred embodiment, the reaction product comprises sites of organounsaturation such as alkenyl or alkynyl groups. Thus, when R=alkenyl or alkynyl, these compositions may be crosslinked by supplying an energy input in the form of, for example, thermal energy or radiation, such as ultraviolet radiation, microwave radiation or electron beam radiation, to crosslink, to a desirable extent, the hybrid polymer or ceramer compositions. In this case, crosslinking occurs by activating alkenyl-based or alkynyl-based polymerization of the alkenyl or alkynyl groups within these compositions. When the reaction product comprises a liquid, such crosslinking provides a mechanism for curing to a rigid solid, if desired, after processing the liquid into a desired shape.

In another preferred embodiment of the present invention, the compositions comprise reaction mixtures comprising (1) at least one organic electrophile comprising at least one organic monomer, oligomer or polymer comprising a plurality of organic, electrophilic substituents, and (2) at least one metal-containing polymer comprising at least one of: (i) at least one metal-nitrogen polymer selected from the group consisting of silicon-nitrogen polymers, aluminum-nitrogen polymers, and boron-nitrogen polymers comprising a multiplicity of sequentially bonded repeat units of the form (a), (b), (c), and (d), recited below:

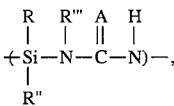   (a)

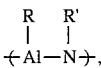   (b)

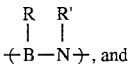   (c)

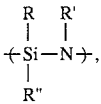   (d)

respectively, where R, R', R", and R'"=hydrogen, alkyl, alkenyl, alkynyl or aryl and A=O or S; (ii) at least one mixture of two or more metal-nitrogen polymers comprising two or more of the structural units (a), (b), (c), and (d); (iii) at least one metal-crosslinked metal-nitrogen polymer comprising one or more of the structural units (a), (b), (c), and (d); and (iv) at least one metal-nitrogen copolymer comprising two or more of the structural units (a), (b), (c), and (d), which, subsequent to reaction to form novel hybrid polymer or ceramer compositions, may be crosslinked to obtain high performance materials. In a preferred embodiment of the present invention, mixtures comprise either liquid metal-containing polymer, liquid organic electrophiles, or both liquid metal-containing polymers and liquid organic electrophiles. In a further preferred embodiment of the present invention, mixtures further comprise compositions wherein R=alkenyl or alkynyl, more preferably wherein the at least one metal-containing polymer (e.g., the at least one metal-nitrogen polymer, the at least one metal-crosslinked metal-nitrogen polymer, the at least one metal-nitrogen copolymer, etc.) may be present, for example, at greater than about 10 wt % of the combined weight of the at least one metal-containing polymer and the at least one organic electrophile and comprises the repeat units (a), wherein R=vinyl, and even more preferably wherein the at least one metal-containing polymer (e.g., the at least one metal-nitrogen polymer, at least one metal-crosslinked metal-nitrogen polymer, or at least one metal-nitrogen copolymer, etc.) comprises the repeat units (a), wherein R=vinyl, and R'=hydrogen.

In another preferred embodiment of the present invention, compositions may further comprise crosslinkable compositions comprising the uncrosslinked reaction products of a reaction mixture comprising (1) at least one organic electrophile comprising at least one organic monomer, oligomer or polymer comprising a plurality of organic, electrophilic substituents, and (2) at least one metal-containing polymer comprising at least one of: (i) at least one metal-nitrogen polymer selected from the group consisting of silicon-nitrogen polymers, aluminum-nitrogen polymers, and boron-nitrogen polymers comprising a plurality of sequentially bonded repeat units selected, for example, from the form (a), (b), (c), and (d), recited below:

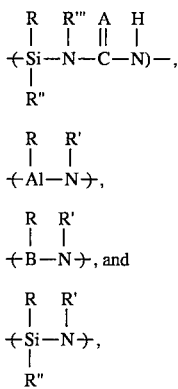

respectively, where R, R', R", and R'''=hydrogen, alkyl, alkenyl, alkynyl or aryl and A=O or S; (ii) at least one mixture of two or more metal-nitrogen polymers comprising two or more of the structural units (a), (b), (c), and (d); (iii) at least one metal-crosslinked metal-nitrogen polymer comprising one or more of the structural units (a), (b), (c), and (d); and (iv) at least one metal-nitrogen copolymer comprising two or more of the structural units (a), (b), (c), and (d), which may be crosslinked to a high performance material in a subsequent processing step. In a preferred embodiment, reacted compositions comprise compositions which comprise liquids. In a preferred embodiment of the present invention, compositions further comprise sites of organounsaturation such as alkenyl or alkynyl groups. In a preferred embodiment of the present invention, compositions further comprise a reaction product wherein R=alkenyl, more preferably wherein the at least one metal-containing polymer (e.g., the at least one metal-nitrogen polymer, the at least one metal-crosslinked metal-nitrogen polymer, the at least one metal-nitrogen copolymer, etc.) is present at greater than about 10 wt % of the combined weight of metal-nitrogen polymer and the at least one organic electrophile and comprises the repeat units (a), wherein R=vinyl, and even more preferably wherein the at least one metal-containing polymer (e.g., the at least one metal-nitrogen polymer, the at least one metal-crosslinked metal-nitrogen polymer, the at least one metal-nitrogen copolymer, etc.) comprises the repeat units (a) wherein R=vinyl, and R'=hydrogen.

In another preferred embodiment of the present invention, compositions may further comprise the crosslinked product of an uncrosslinked reaction product of a reaction mixture comprising (1) at least one organic electrophile comprising at least one organic monomer, oligomer, or polymer comprising a plurality of organic, electrophilic substituents, and (2) at least one metal-containing polymer comprising at least one of: (i) at least one metal-nitrogen polymer selected from the group consisting of silicon-nitrogen polymers, aluminum-nitrogen polymers, and boron-nitrogen polymers comprising a plurality of sequentially bonded repeat units of the form (a), (b), (c), and (d), recited below:

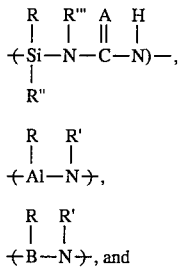

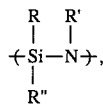

respectively, where R, R', R" and R'''=hydrogen, alkyl, alkenyl, alkynyl or aryl and A=O or S; (ii) at least one mixture of two or more polymers comprising two or more of the structural units (a), (b), (c), and (d); (iii) at least one metal-crosslinked metal-nitrogen polymer comprising one or more of the structural units (a), (b), (c), and (d); and (iv) at least one metal-nitrogen copolymer comprising two or more of the structural units (a), (b), (c), and (d).

In a preferred embodiment of the present invention when R or R'=alkenyl or alkynyl, these compositions may be crosslinked by supplying an energy input in the form of, for example, thermal energy or radiation, such as ultraviolet radiation, microwave radiation or electron beam radiation. The energy input may crosslink the hybrid polymer or ceramer compositions by activating alkenyl-based or alkynyl-based polymerization of the alkenyl or alkynyl groups within these compositions. This crosslinking effect is believed to be most advantageous when the crosslinkable reaction product comprises a liquid, and it is desired to shape-stabilize the composition by crosslinking the shaped liquid to a rigid solid. In a preferred embodiment of the present invention, compositions thus may further comprise a reaction product wherein R=alkenyl, more preferably wherein the at least one metal-containing polymer (e.g., the at least one metal-nitrogen polymer, the at least one metal-crosslinked polymer, the at least one metal-nitrogen) copolymer, etc., is present at greater than about 10 weight percent of the combined weight of metal-nitrogen polymer and organic electrophile and comprises the repeat units (a), wherein R=vinyl, and even more preferably wherein the at least one metal-containing polymer (e.g., at least one metal-nitrogen polymer, at least one metal-crosslinked metal-nitrogen polymer, or at least one metal-nitrogen copolymer, etc.) comprises the repeat units (a), wherein R=vinyl, and R'=hydrogen. In a preferred embodiment, R or R' may also comprise a group such as an epoxy or acrylate-based group which may provide for ionic crosslinking of the reacted hybrid polymer or ceramer composition. When Si-H bonds and vinyl groups are present in the uncrosslinked reacted composition, a hydrosilylation mechanism, for example, may be used to crosslink the reacted composition. Alternatively, the thermal decomposition characteristics of the metal-containing polymer backbone may be used to generate the crosslinked structure once the reaction product of the metal-containing polymer with the at least one organic electrophile is obtained. Such mechanisms may be used when these polymers are used as preceramic polymers (e.g., without combining them with the at least one organic electrophiles) and conversion to ceramic materials may occur by thermolytic crosslinking.

Although not required, it is desirable for the at least one metal-containing polymer to comprise an amount of at least about 10 wt % or more of the total composition based on the combined weight of metal-nitrogen polymer and organic electrophile. Preferably, the at least one metal-containing polymer comprises between about 10 weight percent and 90 weight percent, and more preferably, at between about 15 weight percent and about 65 weight percent.

The at least one organic electrophile comprising the organic monomers, oligomers, or polymers comprising a plurality of electrophilic substituents suitable for the practice of this invention is defined as organic monomers, oligomers or polymers which contain a plurality of one or more reactive groups which may attack the electron density of a metal-nitrogen bond (e.g., Si-N, Al-N, B-N bonds, etc.) of a metal-containing polymer, resulting in the breaking of these bonds and, subsequently, the formation of new bonds. Alternatively, when R'=H, the at least one organic electrophile comprising organic monomers, oligomers, or polymers may preferentially react at N-H bonds of the at least one metal-containing polymer. Either mechanism provides for the incorporation of the at least one organic electrophile comprising at least one organic monomer, oligomer, or polymer into the structure of the at least one metal-containing polymer. In a preferred embodiment, the at least one organic electrophile comprises a liquid thus increasing the probability for reaction of the at least one organic electrophile comprising at least one organic monomer, oligomer or polymer with the at least one metal-containing polymer comprising one or more metal-nitrogen polymers.

Typical examples of electrophilic groups which are suitable electrophilic substituents for the multifunctional organic electrophile include groups containing, for example, the following bonding schemes:

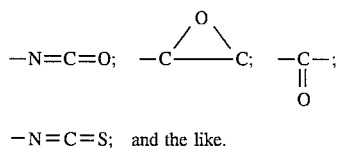

$-N=C=S$; and the like.

Typical organic monomers, oligomers, or polymers suitable for the practice of this invention include, for example, multifunctional organic isocyanates, multifunctional compounds comprising amide linkages such as polyamides, multifunctional compounds comprising imide linkages such as polyimides multifunctional epoxies, multifunctional compounds comprising ester linkages, such as polyacrylates, polycarbonates, polyvinylacetates, or polyesters, multifunctional esters such as dimethyl adipate, diallyl phthalate, and diethylene glycol bisallyl carbonate, and multifunctional organic acids such as polyacrylic acid.

Since in a preferred embodiment of the invention compositions comprise metal-containing polymers which contain Si-N bonds, it is informative to describe the reactions of typical monomeric electrophiles with such metal-containing polymers.

Monofunctional isocyanates are known to react with silicon-nitrogen polymers by inserting into the Si-N bond of the polymers as shown in Equation 1:

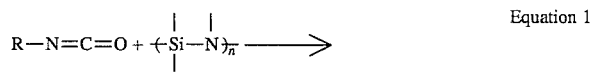

Equation 1

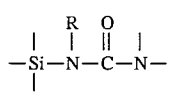

Such reactivity is disclosed in U.S. Pat. No. 4,929,704 entitled "Isocyanate- and Isothiocynate-Modified Polysilazane Ceramic Precursors", which issued in the name of Schwark, on May 29, 1990; U.S. Pat. No. 5,001,090 entitled "Silicon Nitride Ceramics from Isocyanate- and Isothiocyante-Modified Polysilazanes", which issued in the name of Schwark, on Mar. 19, 1991; and U.S. Pat. No. 5,021,533 entitled "Crosslinkable Poly(thio)ureasilazane Composition Containing a Free Radical Generator", which issued in the name of Schwark, on Jun. 4, 1991. This mode of reactivity is distinctly different from that observed by Fink et al. in U.S. Pat. No. 3,239,489, for example, wherein a polysilazane containing, as an enabling feature, a N-H bond reacts with an isocyanate group exclusively at the N-H bond to give the following bonding scheme:

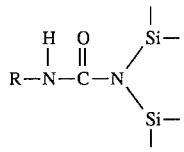

In the present invention, polysilazanes comprising no N-H bonds are suitable since reaction of the isocyanate occurs at the Si-N bond. Moreover, it has been discovered that reactivity at Si-N bonds in such systems can be promoted by choosing polysilazanes which comprise sterically undemanding substituents on the silicon atom; especially preferred are, therefore, polysilazanes comprising hydrogen substituents on the silicon atom. Polysilazanes comprising Si-H bonds are not employed by Fink et al. Indeed, Fink et al. excludes all polysilazanes comprising mobile hydrogen atoms. Schwark, in U.S. Pat. No. 4,929,704, has disclosed that hydrogen atoms bonded to silicon in polysilazanes, when employed in such systems, are mobile hydrogen atoms.

Monofunctional amides, imides and esters (which comprise the electrophilic C=O moiety) are also known to react with silicon-nitrogen polymers. While not wishing to be bound by any particular theory or explanation, it is believed that the reaction proceeds by insertion of the C=O bond of amide, imide or ester into the Si-N bond of the polymer as shown in Equation 2 for a monofunctional amide or ester:

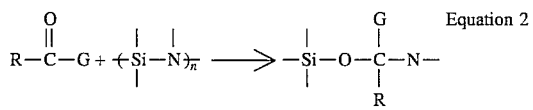

Equation 2 where R is an organic radical or hydrogen and where $G=NR^1R^2$ or $OR^3$, and $R^1$, $R^2$ and $R^3$ are independently selected from at least one of organic radicals or hydrogen.

Such reactivity is disclosed in U.S. Pat. No. 5,032,649 entitled "Organic Amide-Modified Polysilazane Ceramic Precursors", which issued in the name of Schwark, on Jul. 16, 1991; and U.S. Pat. No. 5,155,181 entitled "(Thio)amide-Modified Silazane Polymer Composition Containing a Free Radical Generator", which issued in the name of Schwark, on Oct. 13, 1992.

Thus, in the case of the reaction of a silicon-nitrogen polymer with an organic isocyanate, a simple addition of the electrophilic N=C bond across the Si-N bond is believed to occur. Similarly, when a silicon-nitrogen polymer reacts with an organic amide, imide or ester, reaction is believed to occur by insertion of the electrophile C=O bond across the Si-N bond.

In both cases an Si-N bond is broken and in both cases new silicon-heteroatom bonds form which comprise a silicon atom from the silicon-nitrogen polymer and a nitrogen or oxygen atom originating in the monofunctional, organic monomer containing the electrophilic substituent.

On the other hand, when silicon-nitrogen polymers comprising nitrogen-hydrogen bonds react with monofunctional organic epoxides reaction may occur at the N-H bond of the silicon polymer as illustrated by Equation 3:

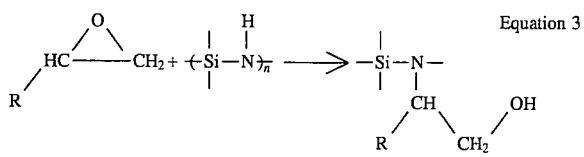

Equation 3 as well as at the Si-N bond of the silicon nitrogen polymer as illustrated by Equation 4.

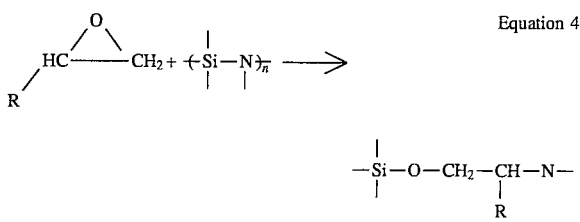

Equation 4

Again, the reaction with a monofunctional organic epoxide would appear to be a simple addition reaction wherein new bonds are formed which incorporate the organic reactant into the silicon-nitrogen polymer structure. The results of infrared studies of the reaction of multifunctional epoxides and polysilazanes over time have shown that the reaction mode depicted in Equation 4 may be predominant. Subsequent crosslinking reactions within the co-reacted compositions shown in Equations 1 through 4 are believed to then occur.

Similar reactivity has been observed for boron-nitrogen polymers as, for example, documented in the reaction of a borazine with monofunctional isocyanates reported by, for example, Cragg, R. H., and M. F. Lappert, J. Chem. Soc. (London) 1964, 2108 or Beyer, H., J. W. Dawson, H. Jenne and K. Niedenzu, J. Chem. Soc. (London), 1964, 2115 and illustrated by Equation 5:

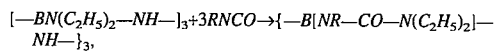

Equation 5 or the reaction of a dialkyl aluminum amine with monofunctional isocyanates (reported by, for example, T. Hirabayashi, H. Imaeda, K. Itoh, S. Sakai and Y. Ishii, J. Organometal. Chem., 19 (1969) 299) and illustrated by Equation 6:

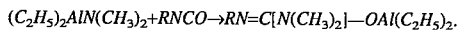

Equation 6

The organic, electrophilic compositions suitable for the practice of the present invention, however, are typically not monofunctional. These compositions comprise at least one organic electrophile comprising at least one organic monomer, oligomer, or polymer comprising a plurality of electrophilic substituents. For the purposes of this invention, the term monomer is defined as a chemical compound which comprises only one repeat unit, the term oligomer is defined as a chemical compound which comprises a few repeat units (generally from about 2 to about 10), and the term polymer is defined as a compound which comprises a large number of repeat units (generally greater than about 10). A multiplicity of electrophilic substituents is defined as at least two reactive groups within the same organic monomer, oligomer, or polymer which cause metal-nitrogen bond (e.g., the Si-N bond in a silicon-nitrogen coreactant polymer) or nitrogen-hydrogen bond (N-H bond) scission within a metal-nitrogen coreactant polymer. While not essential for the purposes of this invention, it may be desirable that the at least one organic electrophile comprising at least one organic monomer, oligomer, or polymer comprise about 10 wt % or more of the combined weight of the at least one organic electrophile and the at least one metal-containing polymer (e.g., the metal-nitrogen polymer). Preferably, the at least one organic monomer, oligomer, or polymer comprises about 30 wt % or more, even more preferably between about 35 weight percent and about 85 weight percent, and even more preferably, between about 40 weight percent and about 70 weight percent.

Suitable monomeric, oligomeric, or polymeric organic isocyanates which may be used according to this invention include, but are not limited to, aliphatic, cycloaliphatic, araliphatic, aromatic, and heterocyclic polyisocyanates and mixtures thereof. Suitable polyisocyanates which may be used in the process of this invention include, but are not limited to, for example, p,p'-diphenylmethane diisocyanate, phenylene diisocyanate, chlorophenylene diisocyanate, tolylene diisocyanate, m-xylylene diisocyanate, benzidine diisocyanate, naphthylene diisocyanate, tetramethylene diisocyanate, pentamethylene diisocyanate, hexamethylene diisocyanate, decamethylene diisocyanate, and thiodipropyl diisocyanate. Other polyisocyanates, polyisothiocyanates and their derivatives may be equally employed. Fatty diisocyanates may be equally employed. Another group of suitable polyisocyanates are so-called modified polyisocyanates, i.e., polyisocyanates containing carbodiimide groups, allophanate groups, isocyanurate groups, urea groups, amide groups, imide groups, or biuret groups. Polyisocyanates suitable for modification in this way include, for example, aliphatic, cycloaliphatic, araliphatic, aromatic and heterocyclic polyisocyanates. It is generally preferred to use commercially readily available polyisocyanates, e.g. tolylene-2, 4- and -2,6-diisocyanate and any mixtures of these isomers, polyphenyl-polymethylene-isocyanates obtained by aniline-formaldehyde condensation, followed by phosgenation, and polyisocyanates which contain carbodiimide groups, urethane groups, allophanate groups, isocyanurate groups, urea groups, imide groups or biuret groups.

The reaction of a metal-nitrogen polymer with the above-mentioned multifunctional isocyanate monomers, oligomers, or polymers may proceed with or without a catalyst. Preferred catalysts comprise, for example, organic tin compounds. The organic tin compounds preferably comprise tin salts of carboxylic acids such as tin acetate, tin octoate, tin ethyl hexoate and tin laurate and the dialkyl tin salts of carboxylic acid such as dibutyl tin diacetate, dibutyl tin dilaurate, dibutyl tin maleate or dioctyl tin diacetate.

Bases which contain nitrogen such as tetraalkyl ammonium hydroxides, alkali metal hydroxides such as sodium hydroxide, alkali metal phenolates such as sodium phenolate or alkali metal alcoholates such as sodium methylate may also be used as a catalyst. Hexahydrotriazines are also suitable catalysts.

Silaamines with carbon-silicon bonds may also be used as catalysts, such as those silaamines described in German Patent No. 1,229,290, for example, 2,2,4-trimethyl-2-silamorpholine or 1,3-diethylaminomethyl-tetramethyldisiloxane. The disclosure of German Patent No. 1,220,290 is incorporated herein by reference.

Other catalysts may include tertiary amines such as triethylamine, tributylamine, triethylenediamine, N-methylmorpholine, N-ethyl-morpholine, N-cocomorpholine, N,N, N',N'-tetramethylethylenediamine, 1,4-diaza-bicyclo-(2,2, 2)-octane, N-methyl-N'-dimethylaminoethyl piperazine, N,N-benzylamine, bis-(N,N-diethylaminoethyl)-adipate, N,N-diethyl benzylamine, pentamethyl diethylenetriamine, N,N-dimethyl cyclohexylamine, N,N,N',N'-tetramethyl-1,3-butanediamine, N,N-dimethyl-beta-phenyl ethylamine, 1,2-dimethyl imidazole, 2-methyl imidazole, hexahydrotriazine derivatives, triethanolamine, triisopropanolamine, N-methyldiethanolamine, N-ethyl-diethanolamine, N,N-dimethylethanolamine, and tertiary amine reaction products with alkylene oxides such as propylene oxide and/or ethylene oxide.

Other examples of catalysts which may be used according to the invention and details of the catalysts may be found in Kunststoff-Handbuch, Volume VII, published by Vieweg and Hochtlen, Carl-HanserVerlag, Munich 1966, e.g., on pages 96 to 102.

The catalyst may generally be used in a quantity of between about 0.001% and about 10% by weight, based on the quantity of isocyanate, and may be added simultaneously with the other components.

Suitable monomeric, oligomeric, and polymeric esters which may be used according to this invention include, but are not limited to, for example, difunctional esters such as dimethyl adipate, diethyl succinate, and dimethyl glutarate as well as the polyesters of aromatic dibasic acids and alkylene glycols. The polyesters also may be derived from, for example, a mixture of aromatic dicarboxylic acids, and one or more diols. Examples of symmetrical aromatic dicarboxylic acids include terephthalic acid, dibenzoic acid, ethylene bis-p-oxybenzoic acid, tetramethylene bis-p-oxybenzoic acid, and 2,6-naphthalic acid. Other aromatic dicarboxylic acids which can be used in conjunction with the symmetrical dicarboxylic acid include, for example, o-phthalic acid, isophthalic acid, etc.

Representative glycols which may be reacted with the dibasic acids to form the desired polyesters include, for example, ethylene glycol, 1,2and 1,3-propanediol, 1,4-butanediol, neopentyl glycol, 1,6-hexanediol, polyethylene glycol, etc.

Also useful in the present invention are polyesters prepared from, for example, acyclic dicarboxylic acids and glycols such as those described above. Specific examples of the acyclic dicarboxylic acids suitable to prepare the polyesters useful in the practice of this invention include adipic acid, pimelic acid, suberic acid, azelaic acid, oxy-dibutyric acid, sebacic acid, 5-oxa-1,10-decanedioic acid, 4-n-propyl suberic acid, dodecane dioic acid, tridecane dioic acid, etc.

Particularly useful combinations of aromatic and aliphatic dicarboxylic acids used in the preparation of copolyesters useful in the present invention include: terephthalic acid, azelaic acid and pentamethyleneglycol; terephthalic acid, isophthalic acid and adipic acid; terephthalic acid, isophthalic acid, adipic acid and sebacic acid; terephthalic acid, isophthalic acid, adipic acid and ethylene glycol; etc. Copolyesters of such mixtures may be prepared directly from the above-identified dicarboxylic acids, or the copolyesters may be prepared from the lower alkyl esters of said dicarboxylic acids such as dimethyl terephthalate, dimethyl isophthalate, dimethyl sebacate, dimethyl adipate, etc. Procedures for preparing copolyesters useful in combination with the metal-containing polymers in this invention are described in, for example, U.S. Pat. No. 2,623,033 entitled "Elastic Copolyesters and Process", which issued in the name of Snyder, on Dec. 30, 1952, and U.S. Pat. No. 2,892,747 entitled "New Linear Copolyesters, Products Containing Same and Process Therefor", which issued in the name of Dye, on Jun. 30, 1959. The entire disclosures of both of these patents are specifically incorporated herein by reference, including their disclosure of linear copolyesters derived at least in part from symmetrical aromatic dicarboxylic acids.

Suitable polyester amides and polyamides include, but are not limited to, for example, predominantly linear condensates obtained from, for example, polyvalent saturated and unsaturated carboxy acids or their anhydrides and polyvalent saturated and unsaturated amino alcohols, diamine, polyamines and mixtures thereof.

Suitable polyimides include, but are not limited to, for example, predominantly linear condensates obtained from the reaction of, for example, a multifunctional acid and/or acid anhydride and a difunctional aromatic amine. The multifunctional acid and/or acid anhydride may feature the characteristic groups comprising, for example, trimellitic acid/anhydride (TMA), pyromellitic dianhydride (PMA), benzophenone tetracarboxylic anhydride (BPA), maleic anhydride (MA), etc. The difunctional aromatic amine may feature the characteristic groups comprising, for example, 4,4' diamino diphenyl methane (MDA), 4,4' diamino diphenyl ether (PEA), m-phenylene diamine (MPA), benzidine or p-phenylene diamine (PPA), and, sometimes, aromatic diisocyanates, for example, 4,4' diisocyanato diphenyl methane (MDI). Some examples of suitable polyimides include, for example, low molecular weight bismalemides, bisnadimides, etc.

The monomeric, oligomeric, or polymeric carboxylic acid may be aliphatic, cycloaliphatic, aromatic and/or heterocyclic and may be substituted, for example, with halogen atoms and may be unsaturated; examples include compounds made from derivatives of: succinic acid, adipic acid, sebacic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acids such as oleic acid, optionally mixed with monomeric fatty acids, and dimethylterephthalate.

Suitable monomeric, oligomeric, or polymeric organic epoxides which may be used according to the present invention may be of the ether or ester types, although the ether type epoxy resins are preferred. Examples of ester-type epoxy resins include polyglycidyl esters obtainable by reaction of a compound containing two or more carboxylic acid groups per molecule with epichlorohydrin or glycerol dichlorohydrin in the presence of an alkali. Such polyglycidyl esters may be derived from aliphatic polycarboxylic acids, e.g. succinic acid, glutaric acid, adipic acid, pimelic acid, suberic acid, azelaic acid, sebacic acid, or dimerized or trimerized linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Ether-type epoxy resins may be obtained by reaction of a compound containing at least two free alcoholic hydroxyl and/or phenolic hydroxyl groups per molecule with an epihalohydrin under alkaline conditions, or in the alternative, in the presence of an acidic catalyst with subsequent treatment with an alkali. The products of such reactions instead of being single simple compounds are generally complex mixtures of glycidyl polyethers. These ethers may be made from acyclic alcohols such as ethylene glycol, diethylene glycol, and higher poly(oxyethylene) glycols, propane-1,2-diol and poly(oxypropylene)glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and polyepichlorohydrins; from cycloaliphatic alcohols such as resorcinol, quinitol, bis(4-hydroxycyclohexyl)methane, and 2,2-bis(4-hydroxycyclohexyl)propane, and from alcohols having aromatic nuclei, such as N,N-bis(2-hydroxyethyl)aniline and p,p'-bis(2-hydroxyethylamino)diphenylmethane. Alternatively, they may be made from mononuclear phenols, such as resorcinol and hydroquinone, and from polynuclear phenols, such as bis(4-hydroxyphenyl)methane (otherwise known as Bisphenol "F"), 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, (otherwise known as Bisphenol "A"), 2,2-bis(3,5-dibromo-4-hydroxyphenyl)propane, and novolacs formed from aldehydes such as formaldehyde, acetaldehyde, chloral, and furfuraldehyde, with phenol itself, and phenol substituted in the ring by chlorine atoms or by alkyl groups such as 4-chlorophenol, 2-methylphenol, and 4-tert-butylphenol.

The epoxy resins may have either a mixed aliphatic-aromatic or an exclusively non-benzenoid (i.e., aliphatic or cycloaliphatic) molecular structure. The mixed aliphatic-aromatic epoxy resins generally may be prepared by the well-known reaction of a bis-(hydroxy-aromatic)alkane or a tetrakis-(hydroxy-aromatic)alkane with a halogen-substituted aliphatic epoxide in the presence of a base such as, for example, sodium hydroxide or potassium hydroxide.

In one preferred embodiment, the epoxy resins comprise diglycidyl ethers of bisphenols, especially Bisphenol "A". These diglycidyl ethers may be made by reacting epichlorohydrin with Bisphenol "A" in the presence of an alkaline catalyst. By controlling the operating conditions and varying the ratio of epichlorohydrin to Bisphenol "A", products of different molecular weight can be made.

Other usable epoxy resins include the diglycidyl ethers of other bisphenol compounds such as bisphenol B, F, G, and H.

Another class of epoxy resins useful in the present invention comprise the epoxidized novolacs, particularly the epoxy cresol and epoxy phenol novolacs. These may be produced by reacting a novolac resin, usually formed by the reaction of orthocresol or phenol and formaldehyde with epichlorohydrin.

Epoxy resins derived from non-benzenoid materials such as aliphatic or cycloaliphatic hydroxy-containing compounds also may be utilized in the present invention. Epoxy resins having non-benzenoid molecular structures generally are referred to in the art as being aliphatic epoxy resins or cycloaliphatic epoxy resins. Cycloaliphatics may be produced by the peracetic epoxidation of cyclic olefins and by the condensation of an acid such as tetrahydrophthalic with epichlorohydrin, followed by dehydrohalogenation. The aliphatic epoxy resins may be prepared by reacting hydroxy-containing aliphatic and cycloaliphatic compounds such as aliphatic diols and triols. For example, ethylene glycol or glycerol may be reacted with a halogen-substituted aliphatic epoxide such as epichlorohydrin to form liquid epoxy resins characterized by viscosities which are lower than epoxy resins derived from aromatic hydroxy compounds. When cured, such aliphatic epoxy resins may not be as brittle as the aromatic epoxy resins, and in many instances, exhibit elastomeric properties.

The reaction of a metal-containing polymer comprising a metal-nitrogen polymer with the above-mentioned epoxide-substituted monomers, oligomers, or polymers may proceed with or without a catalyst. Representative examples of such catalysts include, for example, Lewis Acids such as $BF_3$ and its complexes; alcohols, such as methanol, ethylene glycol, glycerol, and thiethanolamine; phenols, such as phenol, Bisphenol "A", resorcinol, m-nitrophenol, 2,4-dinitrophenol, 2-chlorophenol, 2,4,5,-trichlorophenol, 2,4,5,6-tetrachlorophenol, pentachlorophenol, p-chlororesorcinol, p-chlorophenol, and p-bromophenol; carboxylic acids, such as benzoic acid, salicylic acid, and lactic acid; and tertiary amines.

When such multifunctional organic monomers, oligomers, or polymers are reacted with metal-containing polymers of the type described above, compositions containing organic segments are believed to occur. When the total fraction of the at least one organic electrophile comprising the at least one multifunctional organic monomer, oligomer, or polymer used in the reaction mixture is high, reaction products exhibiting a combination of the desirable properties characteristic of typical organic polymers as well as the desirable properties characteristic of the at least one metal-containing polymer are obtained. For example, while polysilazanes have favorable thermal stability, they are often not very strong materials. By co-reacting, for example, a polysilazane and an organic diepoxide, however, a composition having, for example, good strength as well as good thermal stability may be obtained. Inorganic fillers which are not very compatible with typical organic polymer resins, surprisingly, have also been found to be compatible with the newly discovered hybrid polymer or ceramer compositions.

The reaction to form the hybrid polymers or ceramers may be accomplished with or without solvent, as a suspension or as an emulsion. Typically, and in a preferred embodiment of this invention, the reaction may be performed using liquid components and without any solvent. When a solvent is used, the solvent is typically non-reactive to the components being reacted. Typical solvents suitable for the practice of this invention include non-protic, organic solvents such as hydrocarbon and ether solvents. Representative of such solvents are toluene, xylene, benzene, hexane, heptane, tetrahydrofuran, and diethyl ether, although this list is meant to be representative and not limiting.

While many metal-containing polymers may be suitable for such modification, a particularly preferred embodiment of the present invention rests on the surprising behavior and properties obtained by reacting alkenyl-substituted silicon-nitrogen polymers with a large fraction of an at least one organic electrophile comprising at least one organic monomer, oligomer, or polymer comprising a plurality of electrophilic substituents, and then introducing further crosslinking into the reaction product so obtained by inducing alkenyl crosslinking by supplying an energy input, or by hydrosilylation. Preferred silicon-nitrogen polymers suitable for the practice of this invention thus comprise liquid metal-nitrogen polymers having the repeat units:

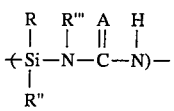  (a)

or

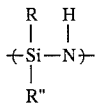

In each of (a) and (d) above, R=alkenyl and R'=H (as shown) and R", R''' and A are defined as above.

Such silicon-nitrogen polymers may be, for example, a polysilazane, polyureasilazane, or poly(thio)ureasilazane, although polysilazanes and polyureasilazanes are preferred. While this list is representative of the types of silicon-nitrogen polymers which may be used in the practice of this invention, however, the list is not meant to be exhaustive. The silicon-nitrogen polymers suitable for the practice of this invention may include cyclic oligomers and ring-based and linear polymers. Low molecular weight, liquid silicon-nitrogen polymers are preferred, since the co-reactant organic monomers, oligomers, or polymers used in the present invention may often be miscible with, or soluble in liquid silicon-nitrogen polymers and the resulting mixture may be processed without the use of a solvent vehicle. Preferably, the silicon-nitrogen polymers used have a number average molecular weight ($M_n$) of less than about 5,000 and, more preferably, less than 2,000. Narrow molecular weight distributions ($M_w/M_n$<about 3.0) are preferred. Typically, it is preferable to include such polymers at greater than about 10 wt % of the combined weight of the composition comprising the at least one metal-containing polymer and the at least one organic electrophile.

Representative, low molecular weight, liquid silicon-nitrogen polymers comprising silyl vinyl groups have been shown in the past to convert rapidly to rigid, solid materials through vinyl crosslinking reactions. Such crosslinking may occur rapidly (e.g., <1 minute) at modest temperature (e.g., <150° C.) using free radical generator additives. Such crosslinking is taught in, for example, U.S. Pat. No. 4,929,704 entitled "Isocyanate- and Isothiocyante-Modified Polysilazane Ceramic Precursors", which issued in the name of Schwark, on May 29, 1990; U.S. Pat. No. 5,001,090 entitled "Silicon Nitride Ceramics from Isocyanate- and Isothiocyante-Modified Polysilazanes", which issued in the name of Schwark, on Mar. 19, 1991; U.S. Pat. No. 5,021,533 entitled "Crosslinkable Poly(thio)ureasilazane Composition Containing a Free Radical Generator", which issued in the name of Schwark, on Jun. 4, 1991; U.S. Pat. No. 5,032,649 entitled "Organic Amide-Modified Polysilazane Ceramic Precursors", which issued in the name of Schwark, on Jul. 16, 1991; and U.S. Pat. No. 5,155,181 entitled "(Thio)amide-Modified Silazane Polymer Composition Containing a Free Radical Generator", which issued in the name of Schwark, on Oct. 13, 1992; U.S. Pat. No. 5,155,181 entitled "(Thio)amide-Modified Silazane Polymer Composition Containing a Free Radical Generator", which issued in the name of Schwark, on Oct. 13, 1992; and U.S. Pat. No. 4,722,988 entitled "Organopolysilazane Composition Containing Free Radical Generators and Capable of Being Crosslinked by an Energy Input", which issued in the names of Porte et al., on Feb. 2, 1988. Hydrosilylation crosslinking mechanisms have also been demonstrated using added metal catalysts such as chloroplatinic acid. Such crosslinking is taught in, for example, U.S. Pat. No. 4,689,252 entitled "Polysilazane Composition which can Crosslink in the Presence of a Metal Compound Catalyzing a Hydrosilylation Reaction", which issued in the names of Lebrun et al., on Aug. 25, 1987.

Suitable free radical generators may include, but are not limited to, organic and inorganic peroxides, alkali metal persulfates, ammonium persulfate, redox systems, aliphatic azo compounds, organic and inorganic peroxides with organic and inorganic metal compounds. Suitable peroxide initiators include, but are not limited to, hydrogen peroxide and acyl or aryl peroxides such as p-menthane hydroperoxide, ethyl ketone peroxide, benzoyl peroxide, tert-butyl peroxybenzoate, acetyl benzyl peroxide, p-chlorobenzoyl peroxide, alkoxy benzoyl peroxide, lauroyl peroxide, dicaproyl peroxide, crotonyl peroxide, di-tert-alkyl peroxide, di-tertbutyl diphosphate peroxide, peracetic acid, cyclohexyl hydroperoxide, and dicumyl peroxide. Suitable persulfates include ammonium persulfate, potassium persulfate and sodium persulfate. Any suitable commonly known redox systems known to those who are skilled in the art may be used. Other initiator systems may be used such as peroxides with metal compounds as activators such as ethyl ketone peroxide with cobalt naphthenate, potassium persulfate with ferric sulfate or cupric sulfate and benzoyl peroxide with a tertiary amine activator such as N,N-dimethyl aniline.

The specific alkenyl-substituted compositions, which are a particularly preferred embodiment of the present invention, generally comprise the reaction product of an at least one organic electrophile comprising at least one organic monomer, oligomer, or polymer comprising a plurality of electrophilic substituents and a silicon-nitrogen polymer comprising the repeat units recited below:

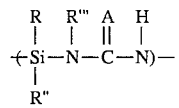

or

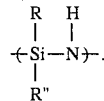

In each of (a) and (d) above, R=alkenyl, R'=H (as shown), and R", R''', and A are defined as above, are thus characterized in their ability to crosslink further through the silyl alkenyl groups, for example, by an energy input, or free radical mechanisms, or by a hydrosilylation mechanism. More preferred are reaction products which convert from a liquid to a rubbery or rigid solid upon vinyl crosslinking. Even more preferred are compositions which convert from a low viscosity liquid (e.g., <5,000 cp) to a rubbery or rigid solid upon vinyl crosslinking. The energy input may be provided by supplying radiation, for example, in the form of ultraviolet (UV) radiation, electron beam radiation, laser or gamma radiation, or thermal energy to the composition. In a preferred embodiment of the present invention, such polymers comprise at least about 10 weight percent of the combined weight of at least one the metal-containing polymer and the at least one organic electrophile.

It has also been unexpectedly discovered that by selecting a multifunctional organic electrophile of the appropriate activity, the heat generated from the reaction of the at least one organic electrophile with a silicon-nitrogen polymer comprising R=vinyl to form an uncrosslinked hybrid polymer or ceramer may cause spontaneous crosslinking of the vinyl groups within the co-reacted composition. A very hard, rigid object may thus be obtained in a matter of several minutes merely by admixing, for example, a liquid diisocyanate and a low molecular weight, liquid, vinyl-substituted polysilazane or polyureasilazane at about room temperature. Self-initiated crosslinking may be especially effective when a free radical generator, such as, for example, a peroxide or an azo compound is added to the reaction mixture, so that the heat generated in the reaction of the organic electrophile with the silicon-nitrogen polymer initiates decomposition of the free radical generator to provide a high concentration of free radicals. Free radical addition may promote rapid vinyl crosslinking at relatively low temperatures in a very short period of time (e.g., <5 minutes). In the absence of a large heat of reaction, radiation or thermal energy from an external source may be provided. Such thermal energy may be provided by, for example, simple convective heating or by induction, or by irradiation using a radiation source such as an electron beam or a microwave.

The uncrosslinked compositions of the present invention may be useful as curable coatings, infiltrants for porous bodies, or as low viscosity molding compositions suitable for injection molding, reaction injection molding (RIM), or pour molding of three dimensional objects, or for use in a variety of alternative forming techniques such as pulltrusion, extrusion, blow-molding, resin transfer molding, prepreging, casting, compression molding, etc.

One particularly useful molding technique discussed above comprises reaction injection molding, commonly called "RIM". Reaction injection molding comprises a method for rapid production of complex plastic parts directly from relatively low viscosity monomers or oligomers. These liquids are combined by impingement mixing just as they enter a mold for defining at least a portion of the complex plastic parts. Mold pressures are typically very low. Solid polymer forms by crosslinking as a result of impingement mixing and complex parts may often be demolded in less than about one minute. In the present invention, RIM may be accomplished using an at least two stream process in which at least one stream contains at least one organic electrophile, for example, an isocyanate, and at least a second stream contains at least one metal-containing polymer, such as, for example, a polyureasilazane.

Another useful molding technique comprises extrusion. Extrusion comprises a process for continuously shaping a fluid polymer through at least one orifice of an extrusion die and subsequently solidifying the polymer into a product extrudate of substantially constant cross section. Extrusion products include, for example, filaments of circular cross-section, profiles of irregular cross section, axisymmetric tubes and pipes, flat products such as films or sheets, etc. Mixtures of hybrid polymers or ceramers, fillers, additives, etc. may be prepared by extrusion according to the methods of the present invention.

An additional useful molding technique comprises casting. Casting includes any of a number of related processing methods, generally involving the polymerization of a liquid resin such that at least one surface of the resin is shaped to correspond to the shape of at least one surface of a product and the resin and product are subjected, typically, to minimal stresses (e.g., atmospheric pressure, gravity flow, slow chemical reaction, moderate temperature, etc.) during processing. Casting includes cases where inserts (inclusions) and/or fillers or reinforcements are at least partially and/or substantially completely surrounded by a polymeric matrix (for example, encapsulation, embedment, potting, etc.), to assure positioning, thermal or electrical insulation, environmental protection, and the like. In the present invention at least one organic electrophile such as, for example, an epoxy may be mixed in a vessel with at least one metal-containing polymer and cast by pouring into, for example, an open mold.

Another useful molding technique comprises compression molding. Compression molding includes pressing or squeezing at least one deformable material between at least two pieces of a heated mold, thereby transforming the material into at least one solid product under the effect of the elevated mold temperature. Compression molding temperatures may range from about 140° C. to about 220° C.; mold pressures may vary from about 500 pounds per square (psi) to about 10,000 psi; curing times may vary from minutes to hours. Transfer molding is related to compression molding in that a softened temperature-activated thermosetting polymer may be transferred through at least one narrow gate into at least one closed cavity of a heated mold and then cured to a solid state.

Another molding technique comprises injection molding. Injection molding relates to a process which involves the rapid pressure filling of at least one mold cavity with a fluid material, followed by the solidification of the fluid material into a product. In the present invention, for example, at least one mixture of at least one liquid metal-containing polymer such as, for example, a polyureasilazane and at least one organic monomer, oligomer or polymer comprising a plurality of organic, electrophilic constituents, for example, an isocyanate, may be injected under pressure into at least one cavity of a closed mold. The polymer cures to a rigid solid in the at least one cavity of the closed mold.

The compositions, for example, molded articles and coatings, of the present invention may be unfilled or filled with at least one filler or reinforcement. The at least one filler comprises either isotropic or anisotropic materials. Average particle diameters of filler or reinforcements used in the formation of compositions of the present invention can be as small as about 0.03 micron or less to about 1500 microns or more. The specific size or size distribution used is a function of the purpose of the filler or reinforcement. For example, when the filler or reinforcement is used to pigment the composition, submicron filler may be appropriate; however, when the filler or reinforcement is used to enhance the strength of the composition, fillers having average particle diameters of about one micron or less to about 500 microns or more may be appropriate. The amount of filler or reinforcement used to form the compositions may be any that may be required to achieve the properties desired in the compositions. These amounts may be as little as about 0.5 weight percent or less to about 99.5 weight percent or more. Preferred amounts may range from about 10 weight percent to about 90 weight percent. More preferred amounts may range from about 20 weight percent to about 85 weight percent. Even more preferred amounts may range from about 25 weight percent to about 75 weight percent. Thus, fillers includes either single constituents or mixtures of constituents which are either chemically reactive or which are substantially non-reactive with and/or of limited solubility in the hybrid polymers or ceramer matrix materials such as, for example, particulate, whiskers, platelets, or even continuous fiber, etc. Continuous fiber fillers may be incorporated as uniaxial arrays, non-woven form, or woven form, although any means or geometry of fiber incorporation applies. For instance, stacked, woven fiber laminates may be formed by impregnating woven fiber mat with at least one composition of the present invention, stacking, and subsequently curing. Infiltration of liquid compositions of the present invention into three-dimensional woven preforms may also possible. Fibrous fillers include chopped and/or continuous metals, glass, carbon or graphite, polymer (e.g., aramid) and ceramic fibers (although this list is meant to be non-limiting). The fiber reinforcements may be in the form of yarn, woven yarn, fabric, roving, woven roving, continuous strand mat, chopped strand mat, woven roving/chopped strand mat combination and the like. The at least one fiber or reinforcement may be introduced in the manner of bier preforms, fiber prepregs, bulk molding or sheet molding compounds which result from the mixing of chopped fibers with the resin system, hand lay-up, spray-up, filament winding which involves the mechanical wrapping of resin-impregnated continuous filaments over a mandrel, pulltrusion, mechanical and manual fiber placement, and resin transfer molding (also called resin injection molding) which involves the placement of a well-bound fiber mat into a cavity of a mold followed by introduction of a low-viscosity thermosetting resin into the cavity under moderate pressure. For example, an embodiment of the present invention involves the hand lay-up of several plies of woven glass mat in a mold cavity followed by the casting of a liquid organic electrophile/metal-containing polymer reaction mixture onto the fiber mats so that the liquid mixture permeates the pores in the fiber mat. The liquid polymer cures to a solid in the mold resulting in a strong, rigid fiber-reinforced polymer matrix.

These various molding processes may be modified within certain process limitations depending upon the physical state, solid, or liquid, of the monomer, oligomer, or polymer molding reagents and the above examples are intended only as illustrations and not as limiting conditions.

Molded objects prepared by the present invention are useful in sporting goods applications such as golf clubs, tennis racquets, skate wheels, watercraft bodies, housing, and propellers, snowmobile bodies, sail boards and the like; automotive applications such as fenders, hoods, and body panels; aerospace applications such as radomes, structural composites; industrial uses such as wear parts in mining, coal, or ore handling such as pump and chute liners.

The compositions of the present invention may also be used as surface modifiers for compatibilizing inorganic/organic interfaces in composite materials, or as binders for polymer, mineral, ceramic or metal filler for fabricating either monoliths or composite materials. The uncrosslinked compositions may be either unfilled or filled with either an organic or an inorganic filler. Such fillers may be particulates, platelets, or fibers in either chopped or continuous form.

The uncrosslinked compositions may also be used as coatings, adhesives, or the feedstock for spinning fibers. Coatings of the uncrosslinked compositions of the present invention may be applied to a substrate by any of a number of methods, including, for example, dipping, brushing, spraying, and spin coating. Utility of these hybrid or ceramer compositions as coatings includes metal corrosion protection for salt water and other salt environment conditions such as those encountered in marine or automobile component use; for corrosive environments in industrial applications such as in pump and engine components, pipelines, and tanks; for aerospace applications such as structural composites and radome, for electrical insulation such as on wiring, for waterproofing of surfaces such as fabric, concrete, and masonry, and for mechanical protection of optical surfaces, wear surfaces, indoor flooring, and the like.

An artisan of ordinary skill in the art would understand that there are innumerable uses for hybrid polymers or ceramers of the present invention. Presented below is a non-inclusive list demonstrating some of these innumerable uses. The list demonstrates that tailoring the properties of the hybrid polymers or ceramers of the present invention results in engineerable material systems, and as such should be used as a guide. By no means should the list be construed as limiting, rather, the list is suggestive of the innumerable uses of the novel hybrid polymers or ceramers of the instant invention.

When the properties of the hybrid polymer or ceramer are tailored to include, for example, transparency, rigidity or stiffness, toughness or impact resistance, abrasion resistance, weatherability or UV light resistance and/or chemical resistance, the hybrid polymers or ceramers of the present invention would be ideally suited for use as, for example, clear or colored transparent or translucent bodies including, for example, hard contact lenses, automotive lenses (e.g., headlights, taillights, etc.), safety and/or security glazing, skylights, illuminated signs, optical fibers, optical fiber coatings, windshields (e.g., automotive, construction equipment, motorcycles, etc.), guards (e.g., industrial machining equipment, commercial appliances, consumer appliances, etc.), mirrorized sheets, double extrusion panels (e.g., solar energy applications, etc.), etc. Additionally, coatings possessing the above listed properties may be used as, for example, floor waxes, emulsion or latex paints with increased temperature resistance without reducing transparency (e.g., baseball bats, fence posts, timbers, fence rails, decking, marine plywood, etc.). Additionally, the hybrid polymers or ceramers of the present invention may be applied as cements (e.g., glues, contact adhesives, etc.) possessing properties for combining chemically and/or microstructurally and/or structurally similar, or dissimilar materials including, for example, metals, minerals, ceramics (e.g., dental adhesives, ceramic paper, etc.), plastics or polymers, natural materials (e.g., to form plywood, particle board, etc.), metal matrix composites, ceramic matrix composites, plastic or polymer matrix composites and combinations thereof.

Moreover, when the properties of the hybrid polymers or ceramers of the present invention are tailored to produce network polymers that form, for example, gels having good oxygen permeability uses may include, for example, soft contact lenses, materials for gel chromatography, membranes, and the like.

Moreover, polymer alloys (polyalloys) or blends of the hybrid polymers or ceramers of the present invention may be used as, for example, rigid pipes or fittings for the construction industry, thermoformed liners (e.g., for refrigerator doors), small boat hulls, telephone machine housings, business machine housings (e.g., typewriters, facsimile machines, printers, monitors, computers, etc.), etc.

Moreover, when the properties of the hybrid polymer or ceramer of the present invention are tailored to include, for example, toughness or impact resistance, water repellency, good surface appearance, oil resistance, fat resistance, grease resistance and optical clarity, uses may include, for example, photographic films, transparency sheets, blister packaging, outdoor signs, metallized decorative parts, film packaging for the food industry (e.g., boil-in or bake-in bags or pouches, etc.), etc.

Moreover, when the properties of the hybrid polymers or ceramers of the present invention are tailored to include, for example, fatigue resistance, creep resistance, toughness or impact resistance, excellent frictional or self-lubrication properties, wear resistance, abrasion resistance, chemical resistance, weatherability or UV light resistance, and flame resistance, any of a number of uses exist. For example, a hybrid polymer or ceramer of the present invention possessing good mechanical and frictional or self-lubricating properties may be used, for example, as slides, guides or gear trains in mechanical or chemical processing equipment, bearings, valves, impellors, propellors, housings (e.g., for portable appliances including circular saws, power drills, sanders, miter saws and the like). When the properties of the hybrid polymers or ceramers include hydrocarbon resistance, uses may include, for example, tanks for gas or chemicals exhibiting activity similar to gas, automotive tubing or lines, etc.

Moreover, when the properties of the hybrid polymers or ceramers of the instant invention are tailored to include, for example, good resistance to oxygen permeation, as well as resistance to oils and greases, uses may include, for example, film packaging for food (e.g., dairy products, meat products, etc.). Since the properties of the hybrid polymers or ceramers of the present invention include temperature resistance, the film packaging for food may be used as, for example, boil-in or bake-in bags or pouches.

When the properties of the hybrid polymer or ceramer of the present invention are tailored to include, for example, temperature resistance, flame resistance and electrical insulation properties, uses might include, for example, paper-like sheet as electrical insulation (e.g., for transformers, electrical motors, generators, alternators, etc.). Furthermore, temperature resistant, flame resistant hybrid polymers or ceramers may be used as, for example, protective fabric or clothing (e.g., gloves, jackets, leggings, aprons, head gear, etc.), conveyor belts, textile fibers as tire cords, ropes, cables, coating fabric for inflatable structures, etc.

When the hybrid polymers or ceramers of the present invention are used as matrices in filler reinforced composite materials, uses may include, for example, ballistic protection (e.g., vests, jackets, helmets, armor plates, composite armor systems, etc.), sporting equipment (e.g., skis, tennis rackets, fishing rods, ski boots, roller skate boots, in-line skate boots, hockey skate boots, hockey skate blade supports, etc.), high performance marine structures (e.g., boat hulls, boat masts, etc.), high performance aerospace applications (e.g., satellite superstructures, solar panel supports, satellite armor, etc.). Furthermore, since the hybrid polymers or ceramers of the present invention exhibit heat resistance or reduced flammability, uses may include, for example, applications such as brake linings (e.g., automotive, aerospace, industrial, etc.), gaskets (e.g., automotive, chemical processing, etc.), packing, etc.

When the properties of the hybrid polymers or ceramers of the present invention are formed as film or sheets which may be biaxially oriented, uses may include, for example, photographic film, x-ray film, magnetic tapes, electrical insulation, drafting sheets, food packaging bags (e.g., boil-in bags, retort pouches, etc.), etc.

When the properties of the hybrid polymers or ceramers of the present invention are tailored to include, for example, friction resistance, wear resistance, electrical insulation properties, low water absorption, low thermal expansion and chemical resistance, uses may include, for example, electrical connectors, electrical fuse boxes, electrical coil bobbins, motor housings, brush holders, distributor caps, ignition coil caps, automotive body panels, exterior mirror housings, power tool housings, cookware handles, pump or meter housings, rotors, valves, motion-transmitting gears, windshield wiper frames, etc.

When the properties of the hybrid polymers or ceramers of the present invention are tailored to include, for example, heat resistance, steam resistance, radiation resistance, weatherability or UV light resistance, and fire resistance, uses may include, for example, high performance outdoor transparent parts, microwave cookware, electrical or electronic parts, etc.

When the properties of the hybrid polymers or ceramers of the present invention are tailored to include, for example, toughness or impact resistance, creep resistance, dimensional stability, low moisture absorbance, self-extinguishing characteristics, non-flammability, chemical resistance, weatherability or UV light radiation resistance, uses may include any of a number of applications. When the properties are tailored to further include transparency, the uses may include, for example, safety glazing for public places, windshield guards, street lighting globes, automotive lenses, mirrorized sheets, double extrusions for solar energy applications, etc. When the properties are tailored to further include non-toxicity and general biocompatibility, the uses may include, for example, housewares and food industries (e.g., returnable milk bottles, returnable water bottles, beer pitchers, microwave oven wear, medical applications, etc.). Since the properties of the hybrid polymers or ceramers of the present invention may be tailored for toughness or impact resistance and high temperature resistance, uses may include, for example, power tool housings, portable appliance housings, propellors, automotive applications, etc.

When the properties of the hybrid polymers or ceramers of the present invention are tailored to include tolerance stability, dimension stability, toughness or impact resistance and electrical insulating properties, uses may include, for example, camera bodies, modular phone connectors, compacitor films, ski slalom poles, drafting films, outboard motor propellors, vacuum cleaner motor housings, electrical transformer bobbins, flat cable terminals, consumer and commercial appliance switches and terminal plates, column packing for the chemical processing industry, fiber optic couplers, microchip carriers, faceshields, helmets and windshields for motorcycles, sunglasses, shrouded plugs and sockets in electrical applications, etc.

When the properties of the hybrid polymers or ceramers of the present invention are tailored to include, for example, temperature resistant, stiffness, chemical resistance to ionizing radiation, fire resistance, creep resistance, low friction, wear resistance, electrical insulating properties, uses may include, for example, unlubricated bearings, bushings, thrust washers, piston rings, gears, ball-bearing cages or retainers, valve seats, gaskets, compressor vanes, turbine vanes, etc.

When the properties of the hybrid polymers or ceramers of the present invention are tailored to include, for example, temperature resistance and adhesion, uses may include, for example, binders (e.g., sandpaper, diamond tipped tooling, abrasive wheels, etc.), matrices for composites (e.g., carbon-carbon composites, organic filled, ceramic filled, metal filled, etc.), high temperature filled or unfilled coatings (e.g., for exhaust systems, boiler equipment, engines, flues, etc.), etc. Furthermore, when the properties are tailored to include a non-stick attribute, uses may include, for example, non-stick cooking utensils (e.g., frying pans, pots, spatulas, etc.), mold release coatings, etc.

When the properties of the hybrid polymers or ceramers of the present invention are tailored to include, for example, high temperature electrical resistance, uses may include, for example, wire or cable insulation and/or coatings, solder resistant printed circuit boards, encapsulation or potting compounds for integrated circuits, filters, temperature and flame resistant fabrics, etc.

When the properties of the hybrid polymers or ceramers of the present invention are tailored to include, for example, a low dissipation factor, and high dielectric strength, uses might include, for example, microwave applications, and the like.

When the hybrid polymers or ceramers of the present invention are used as matrices and their properties are tailored to include, for example, good adhesion to the filler, high corrosion resistance and chemical resistance, uses may include, for example, chemical processing equipment (e.g., piping, tanks, coatings, etc.), automotive (e.g., body panels, engine components, wheels, etc.), etc.

When the properties of the hybrid polymers or ceramers of the present invention are tailored to include, for example, thermal stability and chemical or corrosion resistance, uses may include, for example, bodies in tough marine environments, protective coatings (e.g., industrial, architectural such as stone preservatives and build facia preservative, marine, etc.), linings (e.g., piping, tanks, drums and cans, etc.), etc.

When the properties of the hybrid polymers or ceramers of the present invention are tailored to include, for example, low loss factor and low dielectric constant uses may include application requiring transparency to radar such as, for example, radomes, aircraft leading edges, etc. Furthermore, when the hybrid polymers or ceramers possessing the above tailored properties are used in combination with, for example, material such as filler having high loss factors, uses may include low observables or stealth, shielding, and the like.

When the properties of the hybrid polymers or ceramers of the present invention are tailored to include, for example, electrical or electronic compatibility, uses may include, for example, encapsulation or potting materials for small components, laminated printed circuit boards, integrated circuits, large outdoor insulators, etc.

Figure 2:
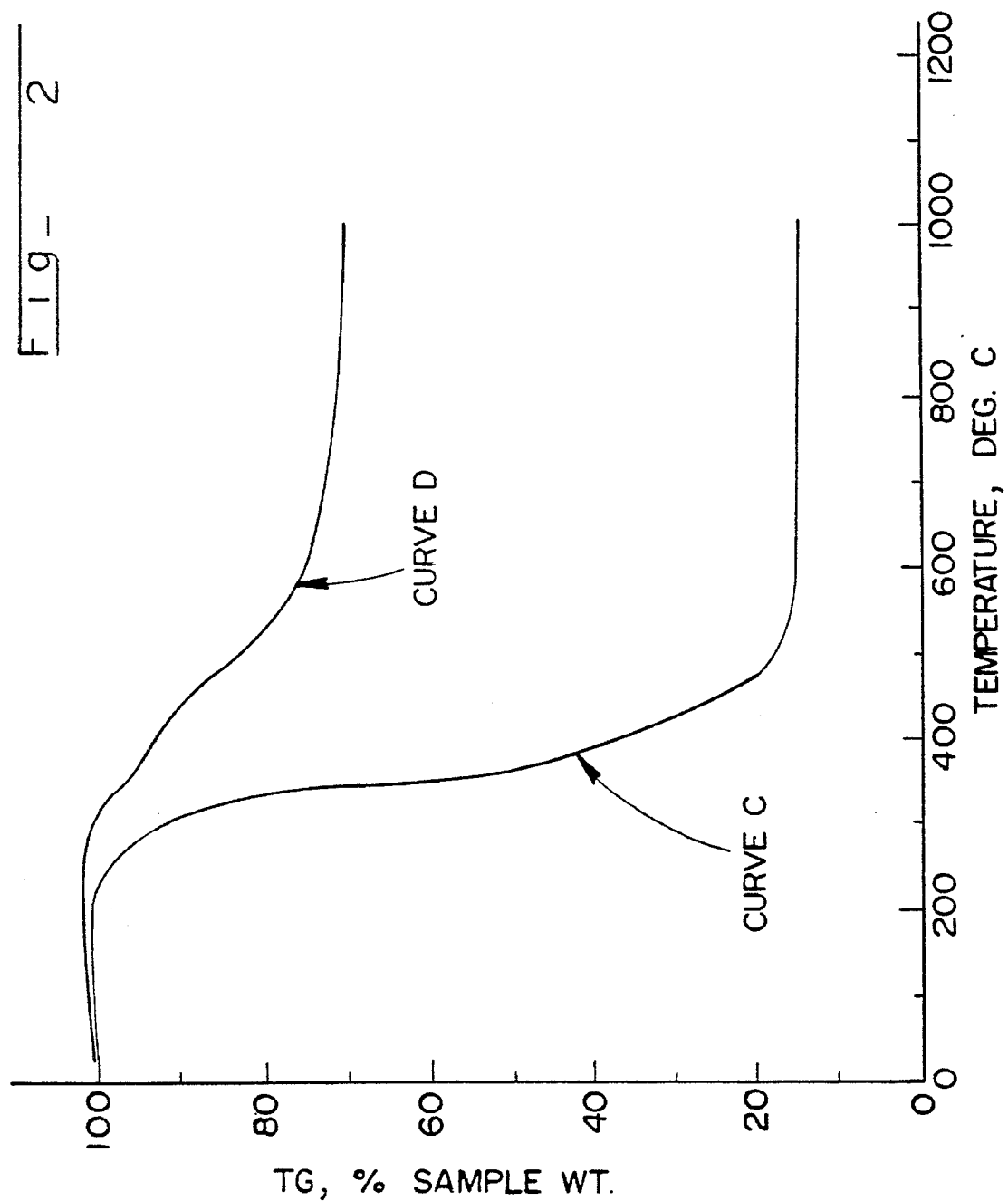
FIG. 2 represents a comparison of weight retained (TG, % Sample Wt) as a function of temperature for a wholly organic urethane resin composition (Curve C) and a hybrid or ceramer urethane resin (about 80 wt %) composition (Curve D) comprising a silicon-nitrogen polymer correctant (about 20 wt %) when the samples are heated to about 1000° C in a nitrogen atmosphere of about 5° C. per minute.

Since the properties of hybrid polymer or ceramers of the present invention inherently possess high temperature resistance, use requiring high temperature stability may be benefited from their uses. Some desirable characteristics include extended thermal stability and high thermal char yield relative to their wholly organic counterparts. For example, the thermal characteristics of a standard Bisphenol "A" epoxy formulation (Curve A of FIG. 1) comprising an amine hardener are compared to a polyureasilazane-hardened Bisphenol "A" epoxy resin (Curve B of FIG. 1) are shown in FIG. 1 to demonstrate the marked improvement in both the onset of thermal degradation as well as the improved char yields obtained for a Bisphenol "A" epoxy resin when a poly(methylvinyl)ureasilazane (Polymer A of Examples) is used as the hardener and the composition is thermally crosslinked through free radical-induced vinyl group crosslinking and further thermally-induced condensation crosslinking by elimination of hydrogen gas evolved from Si-H groups in the poly(methylvinyl)ureasilazane. The effect is seen to be synergistic; that is, the char yield obtained in the polyureasilazane-hardened system is higher than expected using a simple rule of mixtures. In the system represented in FIG. 1, about 50 wt % of the poly(methylvinyl)ureasilazane is used to harden about 50 wt % of the diglycidyl ether of Bisphenol "A". Typically, the poly(methylvinyl)ureasilazane used demonstrates about a 72 wt % char yield under the conditions shown, while the conventional amine-hardened digylcidyl ether of Bisphenol "A" has a char yield of about 14 wt % under the same conditions. Using a simple rule of mixtures, the calculated char yield would thus be approximately 43 wt %. As can be seen from FIG. 1, the actual char yield exceeds 70 wt %. FIG. 2 demonstrates the improved thermal behavior of a system comprising of a thermally crosslinked poly(methylvinyl)ureasilazane-hardened polyisocyanate. In this example, the polyisocyanate used is prepared from the oligomerization of methylene diphenyldiisocyanate. Again, the onset of thermal degradation is observed at a higher temperature than a conventional polyol-hardened polyisocyanate, and the improved char yield is observed to exceed that expected from using a simple rule of mixtures. In this example, a mixture of 80 wt % polyisocyanate is cured with 20 wt % of poly(methylvinyl)ureasilazane (Polymer A of Examples).

Other examples of use of the hybrid polymers or ceramers as matrices in composite materials may include, for example, sandfilled industrial flooring, pressure pipes, pressure tanks, motor casings, aerospace structural components, etc.

Since the properties of hybrid polymer or ceramer of the present invention may range from, for example, soft rubber to engineering plastics, uses may include, for example, pump liners, pump impellors, gears, sprocket wheels, bushings, shock mounts, O-rings, seals, gaskets, solid tires, wheel covers, roller coverings in the printing industry, sporting boots (e.g., skiing, hockey, roller blade, etc.), conveyor belts, chute liners, etc.

Since the hybrid polymers or ceramers of the present invention may be formed into, for example, artificial or synthetic fiber, uses may include, for example, garment, sports wear, surgical hoses, etc.

Since hybrid polymers or ceramers of the present invention may be used as filled or unfilled coatings or combinations of filled and unfilled coatings, uses may include, for example, finishes, paints, lacquers, varnishes, outer coatings (e.g., effected in fluidized beds), corrosion protection (e.g., metals or alloys), electrical insulation, waterproofing (e.g., in fabrics and concretes), mechanical protection (e.g., optical surfaces ), etc.

Moreover, when the properties of the hybrid polymers or ceramers of the present invention are tailored to include, for example, adhesion ranging from flexible to rigid adhesion, uses may include, for example, sealant such as caulking compound, moisture membranes such as barrier films, flexible tank liners, roofing membranes, etc.

As has been demonstrated by the above list, the novel hybrid polymers or ceramers of the present invention have unlimited utility as filled or unfilled articles, composite articles, coating, adhesives, etc. Uses for the hybrid polymers or ceramers of the present invention should not be limited by the above recitation, but to the contrary, the above recitation provides a basis for expanding the innumerated uses to a limitless number of, for example, equivalent uses.

The entire subject matter of each of the documents cited in the "Detailed Description of the Invention" is specifically incorporated herein by reference.

Various demonstrations of the present invention are included in the Examples immediately following. However, these Examples should be considered as being illustrative and should not be construed as limiting the scope of the invention as defined in the appended claims.

EXAMPLE 1

The present Example demonstrates, among other things, the preparation of a polysilazane: $[(CH_3SiHNH)_{0.8}(CH_3Si(CH=CH_2)NH)_{0.2}]_x$. An about 5 liter, three-necked flask was equipped with an overhead mechanical stirrer, a dry ice/acetone condenser (about −78° C.), an ammonia or nitrogen inlet tube and a thermometer to form an apparatus. The interior of the apparatus was sparged with nitrogen. The apparatus was then charged with hexane (about 1760 milliliters (ml), dried over Type 4A molecular sieves), methyldichlorosilane (about 209 ml, about 230.9 g, about 2.0 mol) and vinylmethyldichlorosilane (about 64 ml, about 69.6 g., about 0.5 mol). Ammonia was added to the apparatus at a rate of about 3.5 liters per minute (about 9.37 mol) for about one hour. During the ammonia addition, the temperature of the contents of the apparatus rose from about 25° C. to about 69° C. After about one hour, the ammonia flow was stopped and the reaction mixture was allowed to cool to about room temperature. The reaction mixture was filtered on a glass-fritted funnel to remove any precipitated ammonium chloride. The hexane was removed from the filtrate under reduced pressure of about 2 millimeter (mm) mercury (Hg) (0.079 inch Hg) to give a product, polysilazane $[(CH_3SiHNH)_{0.8}(CH_2=CHSiCH_3NH)_{0.2}]_x$, as a clear oil (about 150.8 gram (g), about 2.34 mol, about 94% yield) having a viscosity of about 43 centipoise (cp) at about 25° C., and a molecular weight of about 560 g/mol.

EXAMPLE 2

The present Example demonstrates, among other things, the preparation of a polyureasilazane. A methylvinylpolyureasilazane was prepared substantially by the method of U.S. Pat. No. 4,929,704. That is, an about 100 milliliter (ml) one-necked flask equipped with a stir bar and a septum was sparged with nitrogen and charged with about 10.0 g of the polysilazane, $[(CH_3SiHNH)_{0.8}(CH_3Si(CH=CH_2)NH)_{0.2}]_x$, prepared substantially as described in Example 1 and about 0.2 wt % phenyl isocyanate. The flask was placed in an oil bath on a stirrer/hot plate and the septum was replaced with a water condenser capped with a septum. A nitrogen inlet and oil bubbler outlet were placed in the septum. The reaction mixture was then heated to about 110° C. under a nitrogen atmosphere for about 17 hours. Evolution of hydrogen gas was observed. After cooling to about room temperature, the viscosity of the liquid polyureasilazane product measured about 300 centipoise.

EXAMPLE 3

The present Example demonstrates, among other things, the preparation of a polyalazane: $\{[(CH_3CH_2)NAl(C_4H_9)]_y[(CH_3CH_2)NAl(C_4H_7)]_z\}n$. A polyalazane was prepared substantially by the method of U.S. Pat. No. 5,276,105. That is, about 250 ml round bottom flask was fitted with a pressure-equalized dropping addition funnel and purged with nitrogen. Acetonitrile (about 50 ml, about 946 millimole (mmol)) was added to the flask. The funnel was charged with diisobutylaluminum hydride (about 100 ml, about 1.0M in toluene, about 100 mmol) and the flask was cooled to about 0° C. The diisobutylaluminum hydride was added dropwise over a period of about thirty minutes and stirred while maintaining a temperature of about 0° C. for about an additional hour. The flask was warmed to about room temperature and the solution was stirred approximately overnight. The solvent was removed under a vacuum, leaving about 18 g of the yellow, liquid aluminum imine, $[CH_3C(H)=N-Al(i-C_4H_9)_2]_2$.

A polyalazane was prepared by heating the about 5.0 g of aluminum imine at about 180° C. to about 200° C. for about 8 hours. Isobutene and isobutane evolved during the polymerization. The yield of polymer was about 3.5 g. The viscosity of the liquid polymer was about 52,000 centipoise at about 30° C. measured using a Brookfield cone and plate viscometer.

EXAMPLE 4

The present Example demonstrates, among other things, the preparation of a polyborazine. A polyborazine was prepared substantially by the method of R. J. Brotherton and H. Steinberg, *J. Org. Chem.*, Vol 26, 4632 (1961). The borazine was prepared by heating a mixture of about 40.09 g (about 0.213 mole) of triisopropoxyborane and about 23.05 g (about 0.213 mole) of o-phenylenediamine for about 18 hours in about 100 ml of refluxing xylene. The reaction mixture temperature rose as isopropyl alcohol was removed by slow fractional distillation. After cooling to about room temperature, the residual crude solid product was separated by filtration and recrystallized from acetone to give about 6.19 g of 5H, 12H, 19H-tris[1,3,2-benzodiazaborolo]borazine.

EXAMPLE 5

The present Example demonstrates, among other things, the preparation of a silicon-nitrogen/aluminum-nitrogen, block copolymer. A block copolymer was prepared substantially by the method of U.S. Pat. No. 5,229,468. That is, the block copolymer was prepared by combining about 15 grams of the polysilazane, $[(CH_3SiHNH)_{0.8}(CH_3Si(CH=CH_2)NH)_{0.2}]_x$, prepared substantially as described in Example 1, and about 5 grams of the polyalazane, $\{[(CH_3CH_2)NAl(C_4H_7)(C_4H_9)]_y[(CH_3CH_2)NAl(C_4H_7)]_z\}n$, prepared substantially as described in Example 3, and heating under nitrogen to about 110° C. for about 5 hours. Isobutane was formed as a by-product of the reaction. The resulting poly(silazane/alazane) block copolymer comprised an orange liquid.

The following designations are used for the metal-nitrogen polymers in the remaining examples:

Polymer A—Poly(methylvinyl)silazane (made substantially according to the method of Example 1)

Polymer B—Poly(methylvinyl)ureasilazane (made substantially according to the method of Example 2, CERASET® SN preceramic polymer, Lanxide Corp., Newark, Del.)

Polymer C—Hexamethylcyclotrisilazane (Huls Petrach Systems, Bristol, Pa.)

Polymer D—Polyalazane (made substantially according to the method of Example 3)

Polymer E—Polyborazine (made substantially according to the method of Example 4)

Polymer F—Poly(silazane/alazane) block copolymer (made substantially according to the method of Example 5)

Examples 6–17. The present Examples demonstrate, among other things, the formation of reacted compositions made from mixtures comprising a p,p'-diphenylmethane diisocyanate—based resin (an aromatic diisocyanate) and a metal-nitrogen polymer. Table I sets forth for Examples 6–17 (Ex.) the metal-nitrogen polymer (Inorganic Polymer), the time to cure (Time), the various component ratios of (Isocyanate Level in wt %) Part "A" of a urethane casting resin (Smooth-On™ C-1506 Rigid Urethane Casting Resin; Smooth-On, Inc., 1000 Valley Road, Gillette, N.J.) at about the specified temperatures (Temp.). Table I also sets forth the form (Form) of the cured reacted composition. The mixtures summarized in Table I initially reacted to form viscous liquid compositions before curing to the composition having the described form.

TABLE I

Compositions Made From Mixtures Comprising Isocyanate and a Metal-Nitrogen Polymer

| Inorganic Polymer | | Isocyanate Level | Temp. (°C.) | Time | Form | | Isocyanate Level | Temp. (°C.) | Time | Form |
|---|---|---|---|---|---|---|---|---|---|---|
| Polymer A | Ex 6: | 75 wt % | 25 | 10 min | Solid | Ex 7: | 50 wt % | 100 | 20 min | Solid |
| Polymer B | Ex 8: | 75 wt % | 25 | 5 min | Solid | Ex 9: | 50 wt % | 100 | 20 min | Solid |
| Polymer C | Ex 10: | 75 wt % | 25 | 5 min | Solid | Ex 11: | 50 wt % | 25 | 15 min | Solid |
| Polymer D | Ex 12: | 75 wt % | 120 | 1 hr | Gel | Ex 13: | 50 wt % | 120 | 1 hr | Solid |
| Polymer E | Ex 14: | 75 wt % | 250 | 1 hr | Solid | Ex 15: | 50 wt % | 250 | 1 hr | Solid |
| Polymer F | Ex 16: | 75 wt % | 25 | 1 hr | Gel | Ex 17: | 50 wt % | 25 | 1 hr | Solid |

EXAMPLES 18–29

The present Examples demonstrate, among other things, the formation of liquid compositions made from mixtures comprising hexamethylene diisocyanate (an aliphatic diisocyanate) and a metal-nitrogen polymer. Table II sets forth for Examples 18–29 the metal-nitrogen polymer (Inorganic Polymer), the time to cure (Time), the various component ratios (Isocyanate Level in wt %) of hexamethylene diisocyanate (Cat. No. D12,470-2, Aldrich Chemical Company, Inc., Milwaukee, Wis.) at about the specified temperatures (Temp.). Table II also sets forth the form of the cured reacted composition. The mixtures summarized in Table II initially reacted to form viscous liquid compositions before curing to the composition having the described form.

EXAMPLE 31

The present Example demonstrates, among other things, the formation of a composition from a mixture comprising an isocyanate and polyureasilazane further comprising an azo compound as free radical initiator. A mixture comprising about 1.0 wt % azoisobutyronitrile (AIBN) (Stk. No. 36307, ALFA®AESAR®, Johnson Matthey, Ward Hill, Mass.) based on the combined weight of the metal-nitrogen polymer and the diisocyanate was added to a mixture made substantially according to the method of Example 9. The liquid mixture cured to a rigid, solid composition after at about 100° C. for about 5 minutes.

TABLE II

Compositions Made From Mixtures Comprising Isocyanates and a Metal-Nitrogen Polymer

| Inorganic Polymer | | Isocyanate Level | Temp. (°C.) | Time | Form | | Isocyanate Level | Temp. (°C.) | Time | Form |
|---|---|---|---|---|---|---|---|---|---|---|
| Polymer A | Ex 18: | 75 wt % | 100<br>100 | 2 hr<br>3 hr | Liquid<br>Rubber | Ex 19: | 50 wt % | 100 | 25 min | Solid |
| Polymer B | Ex 20: | 75 wt % | 100<br>100 | 30 min<br>1 hr | Liquid<br>Rubber | Ex 21: | 50 wt % | 100 | 15 min | Solid |
| Polymer C | Ex 22: | 75 wt % | 100<br>100 | 2 hr<br>3 hr | Liquid<br>Gel | Ex 23: | 50 wt % | 25 | 20 min | Rubber |
| Polymer D | Ex 24: | 75 wt % | 100 | 1 hr | Solid | Ex 25: | 50 wt % | 120 | 10 min | Solid |
| Polymer E | Ex 26: | 75 wt % | 250 | 12 hr | No Cure | Ex 27: | 50 wt % | 250 | 12 hr | No Cure |
| Polymer F | Ex 28: | 75 wt % | 120 | 1 hr | Solid | Ex 29: | 50 wt % | 120 | 15 min | Solid |

EXAMPLE 30

The present Example demonstrates, among other things, the formation of a composition from a mixture comprising isocyanate and polyureasilazane composition comprising a peroxide free radical initiator. An about 1.0 wt % DI-CUP® R dicumyl peroxide (Hercules Inc., Wilmington, Del.) based on the combined weight of metal-nitrogen polymer and the diisocyanate was added to a composition made substantially according to the method of Example 8. The liquid mixture first reacted to form a viscous liquid composition, and cured to a solid composition after at about 100° C. for about 3 minutes.

EXAMPLES 32–35

The present Examples demonstrate, among other things, the formation of liquid compositions from mixtures comprising hexamethylene diisocyanate (aliphatic diisocyanates) and a metal-nitrogen polymer further comprising phthalic acid (PA) (Cat. No. 40,291-5, Aldrich Chemical Company, Inc., Milwaukee, Wis.) as the isocyanate cure catalyst. Table III sets forth for Examples 32–35 the metal-nitrogen polymer (Inorganic Polymer), the time (Time) to cure at various component ratios (wt %) at about room temperature and the form (Form) of the resulting compositions.

TABLE III

Liquid Compositions Made From Mixtures Comprising Diisocyanates and a Metal-Nitrogen Polymer

| Inorganic Polymer | Diisocyanate (wt %) Level: | 75 wt % | | | | 50 wt % | | |
|---|---|---|---|---|---|---|---|---|
| | | Temp. (°C.) | Time | Form | | Temp. (°C.) | Time | Form |
| Polymer A: | with 10 wt % Phthalic Acid | | | | | | | |
| | Ex 32: | 100 | 2 min | Solid | Ex 33: | 80 | 30 min | Solid |
| | | 80 | 1 hr | Solid | | | | |
| Polymer B: | with 10 wt % Phthalic Acid | | | | | | | |
| | Ex 34: | 100 | 2 min | Solid | Ex 35: | 80 | 30 min | Solid |
| | | 80 | 1 hr | Solid | | | | |

EXAMPLE 36

The present Example demonstrates, among other things, the formation of a composition from a mixture comprising a polyureasilazane and a diisocyanate. An uncured, liquid mixture was prepared in an open vessel by mixing about 350 grams of an isocyanate component used in Example 8 and about 87 grams of Polymer B (in which about 0.5 wt % DI-CUP® R dicumyl peroxide, Hercules Inc., Wilmington, Del., had been added) cooled to about 2° C. The mixture was poured into a cavity of an aluminum mold. After hardening at about room temperature, the molded mixture was heated at about 110° C. for about 4 hours. A rigid, solid composition substantially replicating the shape of the cavity of aluminum mold was formed. Mechanical properties testing (measure substantially as described in Example 76) of tensile bars cut from the rigid, solid, molded composition had a tensile modulus of about 1.8 GPa and a tensile strength of about 14 MPa.

EXAMPLE 37

The present Example demonstrates, among other things, the formation of a composition from a mixture comprising a polyureasilazane and a diisocyanate and further comprising ceramic filler. About 120 grams of about 1,000 grit (average particle diameter of about 5 microns) boron carbide ($B_4C$) (Elektroschmelzwerk, Kempton (ESK), Germany) were admixed with about 180 grams of the isocyanate component used in Example 8 and about 42 grams of the Polymer B (in which about 0.5 wt % DI-CUP® R dicumyl peroxide, Hercules Inc., Wilmington, Del., had been added). The mixture was poured into a cavity of an aluminum mold. The mixture was allowed to cure to a rigid, solid composition which substantially replicated the shape of the cavity of the aluminum mold. Mechanical properties testing (measure substantially as described in Example 76) of tensile bars cut from the rigid, solid composition had a tensile modulus of about 6.2 GPa and a tensile strength of about 33 MPa.

EXAMPLE 38

The present Example demonstrates, among other things, the formation of a composition from a mixture comprising a polyureasilazane and a diisocyanate and further comprising a metal filler. About 10 grams of aluminum powder flake (UN1396, Grade 7100, Alcan Powders and Chemicals, Elizabeth, N.J.) were admixed with about 45 grams of Part "A" of a urethane casting resin (Smooth-On™ C-1508 Rigid Urethane Casting Resin; Smooth-On, Inc., 1000 Valley Road, Gillette, N.J.) and about 9 grams of the Polymer B (to which about 0.5 wt % DI-CUP® R dicumyl peroxide, Hercules Inc., Wilmington, Del., had been added) in an open vessel and poured into a cavity of a rubber mold. The molding mixture cured overnight to a rigid, solid composition which substantially replicated the shape of the cavity of the rubber mold.

EXAMPLE 39

The present Example demonstrates, among other things, the formation by solution polymerization of a composition from a mixture comprising a polyureasilazane and a diisocyanate. About 10 grams of Polymer B were stirred with about 40 ml of dry hexane (dried over 13X molecular sieve, Cat. No. 29,325-3, Sigma-Aldrich, Sigma Chemical Co., St. Louis, Mo.) at about room temperature under a nitrogen atmosphere. About 10 grams of hexamethylene diisocyanate (Cat. No. D12, 470-2, Aldrich Chemical Company, Inc., Milwaukee, Wis.) were then added to the reaction mixture. A fine white haze formed within the reaction mixture and became more noticeable with time. The reaction mixture was then heated to reflux. As the solution was heated, the fine haze (suspended precipitate) disappeared. After about 15 minutes at a heavy reflux, white precipitate formed. The reaction was continued for about an additional hour at reflux. On cooling, the solid precipitate was removed from solution by decanting the hexane solvent. The solid, polymeric composition was insoluble in hot toluene.

EXAMPLES 40–53

The present Examples demonstrate, among other things, the formation of liquid compositions from mixtures comprising the diglycidyl ether of Bisphenol "A" (an aromatic diepoxide) (Cat. No. 8760, Dajac Laboratories, Inc., Southhampton, Pa.) and a metal-nitrogen polymer. Table IV sets forth for Example 40–53 the metal-nitrogen polymer (Inorganic Polymer), the time (Time) to cure at various component ratios (Level in wt %) of the diglycidyl ether of Bisphenol "A" (Cat. No. 8760, Dajac Laboratories, Inc., Southhampton, Pa.) at various specified temperatures (Temp.). Table IV also sets forth the form (Form) of the cured reacted composition. The mixtures set forth in Table IV initially reacted to form viscous liquid compositions before curing to the compositions of the described form. The mixtures in Table IV comprising Polymers A, B, and C further comprised about 5 wt % of DI-CUP® R dicumyl peroxide (Hercules Inc., Wilmington, Del.) free radical generator.

TABLE IV

Liquid Compositions Made From Mixtures Comprising Diepoxides and a Metal-Nitrogen Polymer

| Inorganic Polymer | | Diepoxide | Temp. (°C.) | Time | Form | | Diepoxide | Temp. (°C.) | Time | Form |
|---|---|---|---|---|---|---|---|---|---|---|
| Polymer A | Ex 40: | 75 wt % | 120 | 2 hr | Gel | Ex 41: | 50 wt % | 120 | 2 hr | Solid |
| Polymer B | Ex 42: | 75 wt % | 120 | 2 hr | Gel | Ex 43: | 50 wt % | 120 | 2 hr | Solid |
| Polymer C | Ex 44: | 75 wt % | 150 | 12 hr | Rubber | Ex 45: | 50 wt % | 150 | 12 hr | Gel |
| Polymer D | Ex 46: | 75 wt % | 130 | 12 hr | Solid | Ex 47: | 50 wt % | 130 | 12 hr | Solid |
| Polymer E | Ex 48: | 75 wt % | 250 | 1 hr | Solid | Ex 49: | 50 wt % | 250 | 1 hr | Solid |
| Polymer F | Ex 50: | 75 wt % | 100 | 12 hr | Solid | Ex 51: | 50 wt % | 100 | 12 hr | Solid |

EXAMPLE 52

The present Example demonstrates, among other things, the formation of a composition from a mixture comprising diepoxide and a polyureasilazane further comprising an azo compound as free radical initiator. About 1.0 wt % azoisobutyronitrile (AIBN) (Stk. No. 36307, ALFA® AESAR®, Johnson Matthey, Ward Hill, Mass.) based on the combined weight of Polymer A and the diepoxide was added to a mixture made substantially according to the method of Example 43. The liquid mixture cured to a rigid, solid composition in about 20 minutes.

EXAMPLE 53

The present Example demonstrates, among other things, the formation of a composition from a mixture comprising a diepoxide and a polyureasilazane further comprising an epoxy cure catalyst. About 5% by weight of $Ti(O^iPr)_4$ (Cat. No. 20,527-3, titanium (IV) isopropoxide, Aldrich Chemical Company, Inc., Milwaukee, Wis.) was added to a mixture made substantially according to the methods of Example 43. The mixture cured to a rigid, solid composition after at about 120° C. for about 30 minutes.

EXAMPLE 54

The present Example demonstrates, among other things, the formation of a composition from a mixture comprising a polyureasilazane and a diepoxide. A mixture made substantially according to the method of Example 43 was handmixed in an open vessel. The mixture was poured into a cavity of an aluminum mold. The molded mixture was cured substantially as in Example 43. The demolded composition substantially replicated the shape of the cavity of the aluminum mold.

EXAMPLE 55

The present Example demonstrates, among other things, the formation of a composition comprising a polyureasilazane and a diepoxide and further comprising ceramic filler. A mixture made substantially according to the methods of Example 43 and about 50 wt %, 180 grit (average particle diameter of about 86 microns) boron carbide ($B_4C$) (Elektroschmelzwerk, Kempton (ESK), Germany) powder were combined in an open vessel, mixed and poured into a cavity of an aluminum mold. The molded mixture was cured substantially as in Example 43. The demolded composition substantially replicated the shape of the cavity of the aluminum mold.

EXAMPLE 56

The present Example demonstrates, among other things, the formation of a composition from a mixture comprising a polyureasilazane and a diepoxide and further comprising metal filler. A mixture made substantially according to the methods of Example 43 and about 50 wt %, –325 mesh (average particle diameter less than about 45 microns) iron metal powder (Alfa Catalog Chemicals, Morton Thiokol, Inc., Danvers, Mass.) were combined in an open vessel, mixed and poured into a cavity of an aluminum mold. The molded mixture was cured substantially as in Example 43. The demolded composition substantially replicated the shape of the cavity of the aluminum mold.

EXAMPLE 57

The present Example demonstrates, among other things, the formation by solution polymerization of a composition from a mixture comprising a polyureasilazane and a diepoxide. About 10 grams of the diglycidyl ether of Bisphenol "A" (Cat. No. 8760, Dajac Laboratories, Inc., Southhampton, Pa.) were dissolved in about 40 mls of dry toluene (dried over 13X molecular sieve, Cat. No. 17,996-5, Aldrich Chemical Company, Inc., Milwaukee, Wis.). About 10 grams of polyureasilazane (Polymer B) were then added to the toluene solution and the solution was stirred while refluxing for about 18 hours. Gas bubbles formed during heating to the reflux temperature. After about 18 hours at reflux the reaction solution was cooled to about room temperature and the toluene solvent was removed. A viscous, colorless liquid composition was recovered.

EXAMPLES 58–63

The present Example demonstrates, among other things, the formation of composition from mixtures which were prepared by dissolving about 0.5 grams of polybutylmethacrylate polymer (ELVACITE® 2045 acrylic binder, Dupont Chemicals, Wilmington, Del.) in about 1.0 grams of toluene (Cat. No. 17,996-5, Aldrich Chemical Company, Inc., Milwaukee, Wis.) followed by an addition of about 1.25 grams of a metal-nitrogen polymer as shown in Table V. The solutions were cast as a film onto stainless steel plates and heated to effect cure to a rigid, solid, coating composition on the plates. Table V sets forth for Examples 58–63 the metal-nitrogen polymer (Inorganic Polymer), the specified time (Time) to cure at various component ratios (wt %) at the specified temperatures (Temp.) and the resulting form (Form) of the coating composition.

TABLE V

Compositions Made from Mixtures Comprising Butylmethacrylates and a Metal-Nitrogen Polymer

| Inorganic Polymer (60 wt % Ratio) | Polybutyl-methacrylate (40 wt % Ratio) | Temp. | Cure Time | Form |
|---|---|---|---|---|
| Polymer A | Ex 58: | 100° C. | 10 min | Clear Coat |
| Polymer B | Ex 59: | 100° C. | 10 min | Clear Coat |
| Polymer C | Ex 60: | 100° C. | 5 min | Clear Coat |
| Polymer D | Ex 61: | 100° C. | 5 min | Hazy Coat |
| Polymer E | Ex 62: | 150° C. | 30 min | Hazy Coat |
| Polymer F | Ex 63: | 100° C. | 10 min | Hazy Coat |

EXAMPLE 64

The present Example demonstrates, among other things, the formation of a composition from a mixture comprising a polyureasilazane and a polybutylmethacrylate. A liquid mixture was prepared by combining about 75 grams of a polyureasilazane prepared substantially according to the method of Example 2 with about 1.5 grams of DI-CUP® R dicumyl peroxide (Hercules Inc., Wilmington, Del.), about 50 grams of polybutylmethacrylate (ELVACITE® 2045 acrylic binder, DuPont Company, Wilmington, Del.) and about 325 grams of xylene (Cat. No. 24,764-2, Aldrich Chemical Company, Inc., Milwaukee, Wis.). A large aluminum part (which was first surface treated by sandblasting) was coated with the mixture by dipping and draining the dipped part at about 5 minutes. The coating mixture was cured by heating the dip coated part at about 150° C. for about 12 hours. A clear, colorless, coating composition resulted. The coating composition exhibited hardness and abrasion resistant. Coating composition adhesion was also excellent.

EXAMPLE 65

The present Example demonstrates, among other things, the formation of compositions from a mixture comprising a polyuresilazane and a polybutylmethacrylate. The method of Example 64 was substantially repeated, except that instead of dipping, the liquid mixture was pour-coated. The resulting coating composition was quite hard and abrasion resistant. Coating composition adhesion was excellent.

EXAMPLE 66

The present Example demonstrates, among other things, the formation of composition from a mixture comprising a polyureasilazane and a polybutylmethacrylate. A liquid mixture was prepared by combining about 75 grams of the Polymer B (polyureasilazane prepared substantially according to the methods of Example 2) with about 1.5 grams of DI-CUP® R dicumyl peroxide (Hercules Inc., Wilmington, Del.), about 50 grams of polybutylmethacrylate (ELVACITE® 2045 acrylic binder, DuPont Chemicals, Wilmington, Del.) and about 100 grams of xylene (Cat. No. 24,764-2, Aldrich Chemical Company, Inc., Milwaukee, Wis.). Ten steel pipes measuring about 14 inches (356 mm) long×2.5 inches (63.5 mm) outside diameter×1/16 inches (1.6 mm) wall thickness were dip-coated and cured as described in Example 64. The resulting coating compositions were smooth, quite hard and abrasion resistant. Coating compositions adhesion was also excellent.

EXAMPLE 67

The present Example demonstrates, among other things, the formation of a composition from a mixture comprising polybutylmethacrylate and a metal-nitrogen polymer. One part polybutylmethacrylate (ELVACITE® 2045 acrylic binder, DuPont Company, Wilmington, Del.) was dissolved in about two parts of xylene solvent (Cat. No. 24,764-2, Aldrich Chemical Company, Inc., Milwaukee, Wis.). About two parts of this solution were then added to about one part of the polyureasilazane substantially prepared as in Example 2 (to which about 10 wt % of tert-butyl benzoyl peroxide, ATOCHEM North America, Inc., Crosby, Tex., had been added). This mixture was allowed to stand under a laboratory hood to evaporate the xylene solvent and then about 5 grams of the remaining mixture were cast into a cavity of an aluminum mold. The casting mixture was then heated at about 110° C. for about 2 hours, resulting in a rigid composition which substantially replicated the shape of the cavity of the aluminum mold.

EXAMPLE 68

The present Example demonstrates, among other things, the formation of a composition from a mixture comprising polybutylmethacrylate and a metal-nitrogen polymer and further comprising a glass fiber filler (S-2 glass, Owens/Corning, Huntingdon, Pa.). About 20 grams of a solventless mixture made substantially according to the methods of Example 67 were cast into a cavity of an aluminum mold containing 4 plies of 8 harness satin weave woven glass fiber mat. The molded mixture was heated at about 110° C. for about 2 hours, resulting in a rigid, glass fiber reinforced composition which substantially replicated the shape of the cavity of the aluminum mold.

EXAMPLE 69

The present Example demonstrates, among other things, the formation of a composition from a mixture comprising polybutylmethacrylate and a metal-nitrogen polymer and further comprising metal filler. About 9 grams of a solventless mixture made substantially according to the methods of Example 67 further comprising about 4 grams of -325 mesh (particle diameter less than about 45 microns) iron metal powder filler (Alfa Catalog Chemicals, Morton Thiokol, Inc., Danvers, Mass.) were cast into a cavity of an aluminum mold. The molded mixture was heated at about 110° C. for about 2 hours, resulting in a rigid composition which substantially replicated the shape of the cavity of the aluminum mold.

EXAMPLES 70–75

The present Examples demonstrate, among other things, the formation of liquid compositions from mixtures comprising DBE-6 dimethyl adipate (Dupont Chemicals, Wilmington, Del.) and a metal-nitrogen polymer. Table VI summarizes the metal-nitrogen polymer (Inorganic Polymer), the time to cure (Cure Time) at various component ratios of dimethyl adipate at various temperatures (Temp.) and the resulting form (Form) of the resulting composition for Examples 70–75. The mixtures comprising Polymers A, B, and C further comprised about 5 wt % of DI-CUP® R dicumyl peroxide (Hercules Inc., Wilmington, Del.) free radical generator.

TABLE VI

Liquid Compositions Made From Mixtures Comprising Adipates and Metal-Nitrogen Polymer

| Inorganic Polymer (25 wt % Ratio) | Dimethyl Adipate (75 wt % Ratio) | Temp. (°C.) | Cure Time | Form |
|---|---|---|---|---|
| Polymer A | Ex 70: | 120 | 2 hr | Solid |
| Polymer B | Ex 71: | 120 | 2 hr | Solid |
| Polymer C | Ex 72: | 150 | 12 hr | Liquid |
| Polymer D (@ 50 wt %) | Ex 73: (@ 50 wt %) | 120 | 1 hr | Solid |
| Polymer E | Ex 74: | 250 | 12 hr | No Cure |
| Polymer F | Ex 75: | 120 | 1 hr | Solid |

EXAMPLE 76

The present Example demonstrates, among other things, the formation of a composition from a mixture comprising diglycidyl ether of Bisphenol "A" and a metal-nitrogen polymer and further comprising carbon fiber filler.

A liquid solution was prepared by combining by weight about 1 percent phthalic acid (Cat. No. 40,291-5, Aldrich Chemical Company, Inc., Milwaukee, Wis.) and about 99 percent diglycidyl ether of Bisphenol "A" (Cat. No. 8760, Dajac Laboratories, Inc., Southhampton, Pa.). The liquid solution was placed into a ceramic milling jar with about 1 inch (25.4 mm) diameter alumina milling stones. The ratio by weight of the alumina milling stones to the liquid solution was about 2:1. After the milling jar was closed, the jar and its contents were placed on a rolling mill for about 6 hours. The jar and its contents were then removed from the rolling mill and the alumina milling stones were separated from the liquid solution. The liquid solution was then placed under a vacuum bell jar and subjected to a vacuum of about 30 inches (762 mm) of mercury for about 5 minutes.

A molding mixture was prepared by combining by weight about 50 percent of the liquid solution and about 50 percent Polymer B. After handmixing, the molding mixture which was contained within a plastic jar was placed on a rolling mill for about an hour. After removing from the rolling mill, the molding mixture was degassed using a vacuum bell jar at a vacuum of about 30 inches (762 mm) of mercury for about 5 minutes. The molding mixture was then poured into a pan having inner dimensions measuring about 14 inches (356 mm) by about 12 inches (304.8) by about 2 inches (50.8 mm).

A material composition was then prepared by following steps. Twelve plies of uniaxial carbon fiber (Grade AS4-G 3K, Hercules Inc., Wilmington, Del.) measuring about 12 inches (304.8 mm) by about 5 inches (127 mm) were cut. Two steel platens measuring about 12 inch (304.8 mm) square by about 0.25 inch and machined to a flatness of about ±0.001 inch (0.025 mm) thick were spray coated with a polyester-based parfilm (Price-Driscoll Corp., Farmingdale, N.Y.). The 12 inch (304.8 mm) square surface of one of the steel platens was covered with a piece of graphite sheet measuring about 12 inches (304.8 mm) square and about 0.005 inch (0.127 mm) thick (PERMAFOIL, TT America, Portland, Oreg.). Each of the 12 uniaxial plies of the carbon fiber were individually dipped into the molding mixture contained within the baking pan. After each ply was substantially saturated by the molding mixture, the ply was removed from the molding mixture and excess molding mixture allowed to drip from the ply. The first ply was placed in contact with the graphite foil sheet. This process was repeated with the remaining 11 plies and the remaining plys were stacked so that the carbon fibers of all the plies were substantially parallel with the fibers and the edges of the first ply. A second piece of graphite foil, measuring substantially the same as the first, was placed on top of the molding mixture saturated and aligned plies. The second steel platen was then placed on the second piece of graphite foil to compress the stack of plies. An additional weight of about 40 pounds (18.1 kilograms) was then placed on top of the second steel platen to form a curing lay-up.

The curing lay-up was placed in an oven and the molding mixture saturating the 12 carbon fiber plies was cured at about 80° C. for about 1 hour, then at about 120° C. for about 4 hours and then finally at about 180° C. for 12 hours prior to cooling to about room temperature. At about room temperature, a material composition comprising uniaxially aligned carbon fibers was obtained.

The material composition was then prepared for tensile strength testing. Specifically, the tensile strength of the material composition reinforced with the uniaxially carbon fibers was measured using procedures substantially as described in ASTM designation: D638-91 (ASTM, Philadelphia, Pa.). Modified Type I tensile specimens were machined using diamond grinding so that the longitudinal axis of the test specimen was parallel to the uniaxial fibers of the material composition. The tensile test specimens were machined from coupons measuring about 8 inches (203 mm) long, about 0.5 inches (12.7 mm) wide and about 0.12 inches (3 mm) thick. The gauged section of the tensile test specimens measured about 1.25 inches (31.75 mm) long by about 0.35 inches (9 mm) wide. About 3 inches (76 mm) radii were machined to create the reducing transition from the tabbed portion of the tensile specimens into the reduced gauge section.

Tensile strength of the material composition was measured as a function of temperature. An INSTRON® Model 8501 servo hydraulic testing machine (Instron Corp., Canton, Mass.) (operated at a cross head speed of about 0.0047 inch (0.12 mm) per minute in the elastic region of the material composition). Tensile sample strain was monitored with an instron high temperature capacitive extendsometer (Catalog No. 3118-231, Instron Corp. Canton, Mass.). The temperature of the specimens was controlled using an Instron two-zone short furnace (Catalog No. 3118-220, Instron Corp. Canton, Mass.). Table VII sets forth the ultimate elastic modulus, the tensile strength and the strain rate used after the elastic or linear region of the material composition for each tensile test specimen as a function of temperature. The test temperatures included room temperature, 150° C., 250° C., 350° C, 400° C., 450° C. and 600° C.

TABLE VII

Tensile Properties as a Function of Temperature for a Composition Comprising Carbon Fiber Filler

| Test Temperature °C. | Elastic Modulus (GPA) | Ultimate Tensile Strength (MPA) | Sample Strain Rate to Failure and After Elastic Region inch (mm) per min. |
|---|---|---|---|
| Room Temperature | 100 | 750 | 0.0047 (0.12) |
| 150 | 70 | 625 | 0.019 (0.5) |
| 250 | 70 | 400 | 0.019 (0.5) |
| 350 | 70 | 400 | 0.041 (1.0) |
| 400 | 65 | 375 | 0.041 (1.0) |
| 450 | 65 | 300 | 0.079 (2.0) |
| 600 | 65 | 150 | 0.079 (2.0) |

EXAMPLE 77

The present Example demonstrates, among other things, pour molding a composition made from a mixture comprising a polyureasilazane and a diisocyanate. A molding mixture was prepared in an open vessel by handmixing about 350 grams of Part "A" of a urethane casting resin (Smooth-On™ C-1506 Rigid Urethane Casting Resin; Smooth-On, Inc., 1000 Valley Road, Gillette, N.J.) with about 87 grams of Polymer B (in which about 0.5 wt % DI-CUP® R dicumyl peroxide, Hercules Inc., Wilmington, Del., had been added). The liquid polureasilazane and the diisocyanate were cooled to about 2° C. before handmixing. The molding mixture was poured into a cavity of an aluminum mold. After the molding mixture hardened at about room temperature, the molded mixture was heated at about 110° C. for about 4 hours. A rigid, solid molded composition which substantially replicated the shape of the cavity of the aluminum mold was obtained.

EXAMPLE 78

The present Example demonstrates, among other things, pour molding a composition made from a mixture comprising a polyureasilazane and a diisocyanate and further comprising a ceramic filler. A molding mixture was prepared in an open vessel by handmixing about 120 grams of 1,000 grit (average particle diameter of about 5 microns) boron carbide ($B_4C$), about 180 grams of Part "A" of a urethane casting resin (Smooth-On™ C-1506 Rigid Urethane Casting Resin; Smooth-On, Inc., 1000 Valley Road, Gillette, N.J.) and about 42 grams of Polymer B (in which about 0.5 wt % dicumyl peroxide had been added). The molding mixture was poured into a cavity of an aluminum mold. The molding mixture was cured. A rigid, solid composition substantially replicating the shape of the cavity of the aluminum mold was obtained.

EXAMPLE 79

The present Example demonstrates, among other things, pour molding a composition made from a mixture comprising a polyureasilazane and a diisocyanate and further comprising a metal filler. A molding mixture was prepared in an open vessel by handmixing about 10 grams of aluminum powder flake (UN1396, Grade 7100, Alcan Powders & Chemicals, Elizabeth, N.J.), about 45 grams of Part "A" of a urethane casting resin (Smooth-On™ C-1508 Rigid Urethane Casting Resin; Smooth-On, Inc., 1000 Valley Road, Gillette, N.J.) and about 9 grams of Polymer B (to which about 0.5 wt % DI-CUP® R dicumyl peroxide, Hercules Inc., Wilmington, Del., had been added). The molding mixture was poured into a cavity of a rubber mold. The molding mixture was allowed to cure at about room temperature overnight. A rigid, solid composition substantially replicating the shape of the cavity of the rubber mold was obtained.

EXAMPLE 80

The present Example demonstrates, among other things, pour molding a composition made from a mixture comprising a polyureasilazane and a diepoxide. A mixture was prepared by handmixing by weight about 50 parts of the diglycidyl ether of Bisphenol "A" (Cat. No. 8760, Dajac Laboratories, Inc., Southhampton, Pa.) with about 50 parts of Polymer B in an open vessel. The molding mixture was then poured into a cavity of an aluminum mold. The molded mixture was cured by heating at about 120° C. for about 2 hours. A composition substantially replicating the shape of the cavity of the aluminum mold was obtained.

EXAMPLE 81

The present Example demonstrates, among other things, pour molding a composition made from a mixture comprising a polyureasilazane and a diepoxide and further comprising a ceramic filler. A molding mixture was prepared by handmixing by weight about 50 parts of the diglycidyl ether of Bisphenol "A" (Cat. No. 8760, Dajac Laboratories, Inc., Southhampton, Pa.) with about 50 parts of Polymer B in an open vessel. About 50 wt %, 180 grit (average particle diameter of about 86 microns) boron carbide ($B_4C$) (Elektroschmelzwerk, Kempton (ESK), Germany) powder was added to and handmixed into the molding mixture in the open vessel. The molding mixture comprising the filler was then poured into a cavity of an aluminum mold. The molded mixture was cured by heating at about 120° C. for about 2 hours. A composition substantially replicating the shape of the cavity of the aluminum mold was obtained.

EXAMPLE 82

The present Example demonstrates, among other things, pour molding a composition made from a mixture comprising a polyureasilazane and a diepoxide and further comprising a metal filler. A mixture was prepared by handmixing by weight about 50 parts of a diglycidyl ether of Bisphenol "A" (Cat. No. 8760, Dajac Laboratories, Inc., Southhampton, Pa.) with about 50 parts of Polymer B in an open vessel. A molding mixture was then prepared by adding about 50 wt %, -325 mesh (particle diameter less than about 45 microns) iron metal powder (Alfa Catalog Chemicals, Morton Thiokol, Inc., Danvers, Mass.) to the mixture of the open vessel and handmixing. The molding mixture comprising the filler was then poured into a cavity of an aluminum mold. The molded mixture was cured by heating at about 120° C. for about 2 hours. A composition substantially replicating the shape of the cavity of the aluminum mold was obtained.

EXAMPLE 83

The present Example demonstrates, among other things, pour molding a composition made from a mixture comprising polybutylmethacrylate and a polyureasilazane. A solution was prepared by dissolving by weight about one part of polybutylmethacrylate polymer (ELVACITE® 2045 acrylic binder, DuPont Company, Wilmington, Del.) in about two parts of xylene solvent (Cat. No. 24,764-2, Aldrich Chemical Company, Inc., Milwaukee, Wis.). A mixture was then prepared by adding about two parts of the solution to about one part of Polymer B (to which about 10 wt % of tertbutyl benzoyl peroxide, ATOCHEM North America, Inc., Crosby, Tex., had been added). The mixture was then allowed to stand to substantially evaporate the xylene solvent and produce a molding mixture. About 5 grams of the molding mixture were cast into the cavity of an aluminum mold. The molded mixture was then heated to about 110° C. for about 2 hours. A rigid composition substantially replicating the shape of the cavity of the aluminum mold was obtained.

EXAMPLE 84

The present Example demonstrates, among other things, pour molding a composition made from a mixture comprising polybutylmethacrylate and a polyureasilazane polymer and further comprising a glass fiber filler. About 20 grams of a solventless molding mixture made substantially according to the methods of Example 83 were cast into a cavity of an aluminum mold containing four plies of a woven glass fiber mat. The mold mixture embedding the glass fiber mats was heated to about 110° C. for about 2 hours. A rigid composition comprising glass fiber mats and substantially replicating the shape of the cavity of the aluminum mold was obtained.

EXAMPLE 85

The present Example demonstrates, among other things, pour molding a composition made from a mixture comprising polybutylmethacrylate and a polyureasilazane polymer and further comprising metal filler. A molding mixture was prepared by handmixing about 9 grams of a solventless composition made substantially according to the methods of Example 83 and about 4 grams of −325 mesh (particle diameter less than about 45 microns) iron metal powder filler (Alfa Catalog Chemicals, Morton Thiokol, Inc., Danvers, Mass.). The molding mixture was cast into a cavity of an aluminum mold. The molded mixture was heated to about 110° C. for about 2 hours. A rigid composition comprising metal filler and substantially replicating the shape of the cavity of the aluminum mold was obtained.

EXAMPLE 86

The present Example demonstrates, among other things, pour molding a composition comprising a polysilazane and a polyisocyanate and further comprising a ceramic filler. A molding mixture was prepared by handmixing in an open vessel about 6 grams of Part "A" of a urethane casting resin (Smooth-On™ C-1508 Rigid Urethane Casting Resin; Smooth-On, Inc., 1000 Valley Road, Gillette, N.J.), about 2 grams of 500 grit (average particle diameter of about 17 microns) 39 CRYSTOLON® green silicon carbide powder (Norton Co., Worcester, Mass.) and about 3.5 grams of Polymer C. The molding mixture was then poured into a cavity of an aluminum mold. The molded mixture was cured at about room temperature in about 2 minutes. A rigid composition comprising ceramic filler and substantially replicating the shape of the cavity of the aluminum mold was obtained.

EXAMPLE 87

The present Example demonstrates, among other things, injection molding a composition made from a mixture comprising a polysilazane and a polyisocyanate and further comprising a ceramic filler. A mixture was prepared by handmixing in an open vessel about 14 grams of Part "A" of a urethane casting resin (Smooth-On™ C-1508 Rigid Urethane Casting Resin; Smooth-On, Inc., 1000 Valley Road, Gillette, N.J.) and about 5 grams of 500 grit (average particle diameter of about 17 microns) 39 CRYSTOLON® green silicon carbide (Norton Co., Worcester, Mass.). A molding mixture was prepared by handmixing about 6.0 grams of Polymer A to the mixture. The molding mixture was poured into a barrel of an about 10 ml syringe and injected into a cavity of an aluminum mold. The injection molded mixture cured for about 10 minutes at about room temperature. A composition comprising ceramic filler and substantially replicating the shape of the cavity of the aluminum mold was obtained.

EXAMPLE 88

The present Example demonstrates, among other things, pour molding a composition made from a mixture comprising a diepoxide and a polysilazane. A molding mixture was prepared at about room temperature by handmixing in an open vessel about 5 grams of a diglycidyl ether of Bisphenol "A" (Cat. No. 8760, Dajac Laboratories, Inc., Southhampton, Pa.), about 5 grams of Polymer A and about 0.125 grams of phthalic acid (Cat. No. 40,291-5, Aldrich Chemical Company, Inc., Milwaukee, Wis.). The molding mixture was poured into a cavity of an aluminum mold. The molded mixture was heated to about 150° C. for about 12 hours. A rigid, solid composition substantially replicating the shape of the cavity of the aluminum mold was obtained.

EXAMPLE 89

The present Example demonstrates, among other things, reaction injection molding (RIM) a composition made from a mixture comprising a polyisocyanate and a polysilazane and further comprising ceramic filler and carbon fiber filler. A first mixture was prepared by handmixing in an open vessel about 16 grams of Part "A" of a urethane casting resin (Smooth-On™ C-1508 Rigid Urethane Casting Resin; Smooth-On, Inc., 1000 Valley Road, Gillette, N.J.) and about 2 grams of 500 grit, 39 CRYSTOLON® green silicon carbide (Norton Co., Worcester, Mass.). The first mixture was charged into a first barrel of a syringe ("A" side). A second mixture was prepared by handmixing in an open vessel about 6 grams of Polymer A and about 2 grams of the 500 grit (average particle diameter of about 17 micron), 39 CRYSTOLON® green silicon carbide (Norton Co., Worcester, Mass.). The second mixture was charged to a second barrel of the syringe ("B" side). The first and second mixtures were then simultaneously injected through a mixing zone to induce impingement mixing to form a molding mixture and into a cavity of an aluminum mold containing two stacked plies of woven carbon fiber mat. The molded mixture comprising filler was cured at about room temperature for about 15 minutes. A rigid composition comprising fiber and particulate filler and substantially replicating the shape of the cavity of the mold was obtained.

EXAMPLE 90

The present Example demonstrates, among other things, pour molding a composition made from a mixture comprising a polyisocyanate and a polysilazane and further comprising metal filler and carbon fiber filler. A molding mixture was prepared by handmixing in an open vessel about 16 grams of Part "A" of a urethane casting resin (Smooth-On™ C-1508 Rigid Urethane Casting Resin; Smooth-On, Inc., 1000 Valley Road, Gillette, N.J.), about 5 grams of −325 mesh (particle diameter less than about 45 microns) iron metal powder (Alfa Catalog Chemicals, Morton Thiokol, Inc., Danvers, Mass.) and about 6 grams of Polymer A. The molding mixture was then poured into a cavity of an aluminum mold containing two plies of woven carbon fiber mat. The molded mixture comprising the fiber and particulate filler was cured for about 15 minutes at about room temperature. A composition comprising fiber and particulate filler and substantially replicating the shape of the cavity of the aluminum mold was obtained.

EXAMPLE 91

The present Example demonstrates, among other things, pour molding a composition made from a mixture comprising a diepoxide and a polysilazane and further comprising ceramic filler. A molding mixture was prepared by handmixing in an open vessel about 7 grams of the diglycidyl ether of Bisphenol man (Cat. No. 8760, Dajac Laboratories, Inc., Southhampton, Pa.), about 7 grams of Polymer A, about 0.18 grams of phthalic acid (Cat. No. 40,291-5, Aldrich Chemical Company, Inc., Milwaukee, Wis.) and about 4 grams of 500 grit (average particle diameter of about 17 microns), 39 CRYSTOLON® green silicon carbide (Norton Co., Worcester, Mass.). The molding mixture was poured into a cavity of an aluminum mold. The molded mixture was heated to about 150° C. in the mold for about 12 hours. A composition comprising ceramic filler and substantially replicating the shape of the cavity of the aluminum mold was obtained.

EXAMPLE 92

The present Example demonstrates, among other things, pour molding a composition made from a mixture comprising a diepoxide and a polysilazane and further comprising a metal filler. A molding mixture was prepared by handmixing at about room temperature in an open vessel about 5 grams of a diglycidyl ether of Bisphenol "A" (Cat. No. 8760, Dajac Laboratories, Inc., Southhampton, Pa.), about 5 grams of Polymer A, about 0.125 grams of phthalic acid (Cat. No. 40,291-5, Aldrich Chemical Company, Inc., Milwaukee, Wis.), and about 2 grams of aluminum metal powder (UN 1396, Grade 7100, lot #F1621, Alcan Powder & Chemicals, Elizabeth, N.J.). The molding mixture was poured into a cavity of an aluminum mold. The molded mixture was heated to about 150° C. for about 12 hours. A rigid, solid composition comprising metal filler and substantially replicating the shape of the cavity of the aluminum mold was obtained.

EXAMPLE 93

The present Example demonstrates, among other things, pour molding a composition made from a mixture comprising a diepoxide and a polysilazane and further comprising fiberglass filler. A molding mixture was prepared by handmixing in an open vessel about 5 grams of a diglycidyl ether of Bisphenol "A" (Cat. No. 8760, Dajac Laboratories, Inc., Southhampton, Pa.), about 5 grams of Polymer A, and about 0.125 grams of phthalic acid (Cat. No. 40,291-5, Aldrich Chemical Company, Inc., Milwaukee, Wis.). Four plies, measuring about 2"×2" (30.8 mm×50.8 mm), of a 8-harness satin weave S-2 glass fiber (Owens/Corning, Huntingdon, Pa.) were layed-up in a cavity of an aluminum mold. The molding mixture was poured into a cavity of the aluminum mold. The molded mixture comprising the fiber filler was heated to about 150° C. for about 12 hours. A rigid, solid composition comprising the fiber filler and substantially replicating the shape of the cavity of the aluminum mold was obtained.

EXAMPLE 94

The present Example demonstrates, among other things, resin-impregnation with a composition made from a mixture comprising a diepoxide and a polysilazane. A mixture comprising about 49.4 wt % of a diglycidyl ether of Bisphenol "A" (Cat. No. 8760, Dajac Laboratories, Inc., Southhampton, Pa.), about 49.4% of Polymer A, and about 1.2 wt % of phthalic acid (Cat. No. 40,291-5, Aldrich Chemical Company, Inc., Milwaukee, Wis.) was prepared by handmixing in an open vessel. Two about 2"×1" (50.8 mm×25.4 mm) strips of woven carbon fiber (about 1 gram) were prepregged by immersing in about 4 grams of the mixture. After about 15 minutes, the impregnated carbon fiber mats were wound onto a cylindrical mandrel. The molded mixture comprising the carbon fiber mats was then heated to about 150° C. for about 12 hours. A composition comprising wound fiber filler and substantially replicating the cylinder was obtained upon removal from the mandrel.

EXAMPLE 95

The present Example demonstrates, among other things, pour molding a composition made from a mixture comprising a polyisocyanate and a polysilazane. A molding mixture was prepared by handmixing at about room temperature in an open vessel about 7.3 grams of Part "A" of a urethane casting resin (Smooth-On™ C-1508 Rigid Urethane Casting Resin; Smooth-On, Inc., 1000 Valley Road, Gillette, N.J.), about 2 grams of about 180 grit (average particle diameter of about 86 microns) boron carbide (Elektroschmelzwerk, Kempton (ESK), Germany) and about 3 grams of Polymer F. The molding mixture was poured into a cavity of an aluminum mold. The molded mixture cured at room temperature after about 3 hours. A rigid, solid composition substantially replicating the shape of the cavity of the aluminum mold was obtained.

EXAMPLE 96

The present Example demonstrates, among other things, pour molding a composition made from a mixture comprising a diepoxide and a polysilazane. A molding mixture was prepared by handmixing at about room temperature in an open vessel about 5 grams of a diglycidyl ether of Bisphenol "A" (Cat. No. 8760, Dajac Laboratories, Inc., Southhampton, Pa.) and about 5 grams of Polymer F. A first portion of the molding mixture was poured into a cavity of a rubber mold. The first portion of the molded mixture was cured at about room temperature. After about 24 hours a firm, but a tacky composition solid resulted. A second portion of the molding mixture was then cast into a cavity of a second rubber mold. The second portion of the molded mixture was heated to about 80° C. for about 6 hours. A rigid, solid composition substantially replicating the shape of the cavity of the rubber mold was obtained from the second portion of molded mixture.

EXAMPLE 97

The present Example demonstrates, among other things, injection molding a composition made from a mixture comprising polybutylmethacrylate and a polysilazane. A molding mixture was prepared by handmixing in an open vessel about 3 grams of a polybutylmethacrylate polymer (ELVACITE® 2045 acrylic binder, DuPont Chemicals, Wilmington, Del.) and about 5 grams of Polymer F. The molding mixture was loaded into a barrel of a plastic syringe and injected into a cavity of an aluminum mold. The injected molded mixture was cured in the mold at about 100° C. for about 3 hours. A solid composition substantially replicating the shape of the cavity of the aluminum mold was obtained.

EXAMPLE 98

The present Example demonstrates, among other things, pour molding of a composition made from a mixture comprising a diepoxide and a polysilazane and further comprising a ceramic filler. A molding mixture was prepared by handmixing at about room temperature in an open vessel about 5 grams of the diglycidyl ether of Bisphenol "A" (Cat. No. 8760, Dajac Laboratories, Inc., Southhampton, Pa.), about 5 grams of Polymer F and about 4 grams of 500 grit (average particle diameter of about 17 microns) 39 CRYSTOLON® green silicon carbide (Norton Co., Worcester, Mass.). The molding mixture was poured into the cavity of an aluminum mold. The molded mixture was cured at about 80° C. for about 6 hours. A rigid, solid composition comprising a filler reinforced part which substantially replicating the shape of the cavity of the aluminum mold was obtained.

EXAMPLE 99

The present Example demonstrates, among other things, pour molding a composition made from a mixture comprising a diepoxide and a polysilazane and further comprising a metal filler. A molding mixture was prepared by handmixing in an open vessel about 5 grams of the diglycidyl ether of Bisphenol "A" (Cat. No. 8760, Dajac Laboratories, Inc., Southhampton, Pa.), about 5 grams of Polymer F and about 2 grams of −325 mesh (particle diameter less than about 45 microns) iron metal powder (Alfa Catalog Chemicals, Morton Thiokol, Inc., Danvers, Mass.). The molding mixture was poured into a cavity of an aluminum mold. The molded mixture was cured at about 80° C. for about 6 hours. A rigid, solid composition comprising filler and substantially replicating the shape of the cavity of the aluminum mold was obtained.

EXAMPLE 100

The present Example demonstrates, among other things, molding a composition further comprising fiber filler made from a mixture comprising a diepoxide and a polysilazane. A molding mixture was prepared by handmixing in an open vessel about 5 grams of a diglycidyl ether of Bisphenol "A" (Cat. No. 8760, Dajac Laboratories, Inc., Southhampton, Pa.) and about 5 grams of Polymer F. The molding mixture was then poured onto a strip of 8 harness satin weave woven fabric (S-2 Glass, Owens Corning, Huntington, Pa.) measuring about 2"×10" (50.8 mm×254 mm) to make a fiber prepreg. The fiber prepreg was wound onto a cylindrical mandrel. The molded prepreg was cured at about 80° C. for about 6 hours. Upon cooling to about room temperature, the cylindrical mandrel was removed. A rigid, cylindrical composition comprising fiber filler and substantially conforming to the shape of the cylindrical mandrel was obtained.

EXAMPLE 101

The present Example demonstrates, among other things, molding a composition made from a mixture comprising a polyisocyanate and a polyalazane. A molding mixture was prepared by handmixing at about room temperature in an open vessel about 3 grams of Polymer D and about 8.5 grams of Part "A" of a urethane casting resin (Smooth-On™ C-1508 Rigid Urethane Casting Resin; Smooth-On, Inc., 1000 Valley Road, Gillette, N.J.). The molding mixture was cast into a cavity of an aluminum mold. The molded mixture was allowed to cure at about room temperature for about 18 hours. A rubbery, solid composition substantially replicating the shape of the cavity of the aluminum mold was obtained.

EXAMPLE 102

The present Example demonstrates, among other things, molding a composition made from a mixture comprising an epoxy resin and a polyalazane. A molding mixture was prepared by handmixing in an open vessel about 5 grams of Polymer D and about 10 grams of DER 332 Epoxy Resin (The Dow Chemical Co., Midland, Mi.) containing about 0.1 grams of phthalic acid (Cat. No. 40,291-5, Aldrich Chemical Company, Inc., Milwaukee, Wis.). The molding mixture was cast into a cavity of an aluminum mold. The molded mixture was cured to about 100° C. for about 18 hours. A rubbery, solid composition substantially replicating the shape of the cavity of the aluminum mold was obtained.

EXAMPLE 103

The present Example demonstrates, among other things, molding a composition made from a mixture comprising a polyisocyanate and a metal-crosslinked polysilazane. A magnesium-crosslinked poly(methylvinyl)silazane was prepared by handmixing in a vessel about 250 ml of an about 1 molar solution of dibutylmagnesium in n-heptane (Cat. No. 34,511-3, Aldrich Chemical Company, Inc., Milwaukee, Wis.) chilled to about 0° C. and about 25 grams of Polymer A which was diluted with about 25 ml of dry hexane (dried over 13X molecular sieve, Cat. No. 29,325-3, SigmaAldrich, Sigma Chemical Co., St. Louis, Mo.). After complete addition, the mixture was heated to reflux. The mixture was then stirred overnight at reflux. After the mixture was cooled to about room temperature, ammonia gas was then bubbled through the mixture. The mixture was stripped of solvent under vacuum, to yield a solid, white metal-crosslinked polymer.

A molding mixture was prepared by handmixing in an open vessel about 2 grams of the metal-crosslinked polymer and about 6.8 grams of Part "A" of a urethane casting resin (Smooth-On™ C-1508 Rigid Urethane Casting Resin; Smooth-On, Inc., 1000 Valley Road, Gillette, N.J.). The molding mixture was then cast into a cavity of an aluminum mold. The molded mixture was allowed to cure at about room temperature for about 18 hours. A partially cured composition was obtained. The partially cured composition further cured at about 110° C. for about 6 hours. A solid composition substantially replicating the shape of the cavity of the aluminum mold was obtained.

EXAMPLE 104

The present Example demonstrates, among other things, molding a composition made from a mixture comprising a diepoxide and a metal-crosslinked polysilazane. A molding mixture was prepared by handmixing at about room temperature in an open vessel about 2 grams of a magnesium-crosslinked poly(methylvinyl)silazane prepared substantially as described in Example 32 and about 7 grams of DER 332 Epoxy Resin (The Dow Chemical Co, Midland, Mich.) containing about 0.1 grams of phthalic acid (Cat. No. 40,291-5, Aldrich Chemical Company, Inc., Milwaukee, Wis.). The molding mixture was cast into a cavity of an aluminum mold. The molded mixture was cured at about 110° C. for about 18 hours. A weak, solid composition substantially replicating the shape of the cavity of the aluminum mold was obtained.

EXAMPLE 105

The present Example demonstrates, among other things, molding a composition made from a mixture comprising a diepoxide and a polyborazine. A molding mixture was prepared by handmixing in an open vessel about 7.5 grams of a diglycidyl ether of Bisphenol "A" (Cat. No. 8760, Dajac Laboratories, Inc., Southhampton, Pa.) and about 2.5 grams of Polymer E. The molding mixture was poured into a cavity of an aluminum mold. The molded mixture was cured at about 160° C. for about 12 hours. A solid composition substantially replicating the shape of the cavity of the aluminum mold was obtained.

EXAMPLE 106

The present Example demonstrates, among other things, fiber drawing a composition made from a mixture comprising polybutylmethacrylate and a polyuresilazane. A solution was prepared by dissolving in an open vessel about 10 g polybutylmethacrylate polymer (ELVACITE® 2045 acrylic binder, DuPont Chemicals, Wilmington, Del.) in about 50 ml of toluene (Cat. No. 17,996-5, Aldrich Chemical Company, Inc., Milwaukee, Wis.). About 10 g of Polymer B were added to the solution. The solvent was removed under vacuum and gentle heating at about 35° C. to form a rubbery, colorless, solid composition. The rubbery, colorless, solid composition was heated to about 110° C., forming a composition comprising viscous melt from which fine, strong fibers up to about 10 feet (3048 mm) in length were hand drawn.

EXAMPLE 107

The present Example demonstrates, among other things, fiber drawing a composition made from a mixture comprising polybutylmethacrylate and a polysilazane. A solution was prepared by dissolving about 10 g of polybutymethacrylate polymer of (ELVACITE® 2045 acrylic binder, DuPont Chemicals, Wilmington, Del.) in about 50 ml of toluene (Cat. No. 17,996-5, Aldrich Chemical Company, Inc., Milwaukee, Wis.). About 10 g of Polymer C were added to the solution. The solvent was sparged off under a flow of dry nitrogen at room temperature resulting in a composition comprising a viscous syrup. Fibers were hand drawn from this composition comprising the viscous syrup. The drawn fibers were air cured at about room temperature for about 5 minutes yielding a strong, flexible, fibrous composition.

EXAMPLE 108

The present Example demonstrates, among other things, a thick film composition made from a mixture comprising polybutylmethacrylate and a polysilazane. A solution was prepared by dissolving in an open vessel about 10 g of polybutylmethacrylate polymer (ELVACITE® 2045 acrylic binder, DuPont Chemicals, Wilmington, Del.) in about 50 ml of toluene (Cat. No. 17,996-5, Aldrich Chemical Company, Inc., Milwaukee, Wis.). About 10 g of Polymer C were added to the solution. The solvent was sparged off under a flow of dry nitrogen at room temperature resulting in a composition comprising a viscous syrup. The composition comprising the viscous syrup was cast in a thin sheet onto a glass surface. The cast composition was allowed to cure in air for about 8 hours. A clear, transparent, continuous, flexible, colorless film composition easily removable from the glass surface was obtained. The film composition was about 0.15 mm thick and slightly elastic.

EXAMPLE 109

The present Example demonstrates, among other things, pour molding a composition made from a mixture comprising polyureasilazane and commercially available polyisocyanates.

A solution was prepared in a closeable vessel by first handmixing and then rollmixing an isocyanate-terminated polyether and polymeric methylene diphenal diisocyanate. A bottle containing VIBRATHANE® B-601 polyurethane (a reaction product of a polyether with toluene diisocyanate (TDI), Uniroyal Chemical Co., Inc., Middlebury, Conn.) was placed in a water bath at a temperature of about 50° C. The isocyanate-terminated polyether was heated by the water bath, thus reducing its viscosity. About 100 grams of the heated isocyanate-terminated polyether were combined with about 427 grams of RUBINATE® M polymeric methylene diphenyl diisocyanate (MDI) (ICI Polyurethanes Group, West Deptford, N.J.) in a plastic jar. The contents of the plastic jar were handstirred and then the plastic jar was closed and placed on a roll mill for about 0.5 hours, thereby forming the solution.

A mixture was made by combining the solution with about 330 grams of −400, +800 mesh (particle diameter from about 15 microns to about 38 microns) silicon carbide (Elektroschmelzwerk, Kempton (ESK), Germany). The mixture contained with a sealable container was milled for about 0.5 hours using a rolling mill. The mixture was then degassed by opening the container, placing the container in a pressure vessel (W. M. Schmidt & Son, Inc., Chester, Pa.) and allowing the mixture to be subjected to a pressure of about 80 pounds per square inch (psi) (about 552 kilopascals (KPa)) for about 15 minutes.

A molding mixture was then prepared. A container with mixture prepared was then placed in a ice bath to cool the mixture to about 0° C. Additionally, a separate container in which about 133 grams of Polymer B was also placed in the ice bath to cool it to about 0° C. The chilled mixture and the about 133 grams of chilled Polymer B were then combined by handstirring to prepare a molding mixture.

The molding mixture was then cast into a cavity of a rubber mold. During the casting of the molding mixture, the rubber mold was tilted so that the molding mixture flowed along the inner surface of the cavity and did not entrain any of the ambient atmosphere. A second method for casting the molding mixture included providing the molding mixture to the bottom of the cavity of a rubber mold to effect filling the cavity of the rubber mold from its bottom upward (i.e., bottom pouring), thereby preventing the entrainment of any ambient atmosphere. After the molding mixture was cast into the cavity of the rubber mold, the molding mixture was degassed by subjecting the molding mixture to a pressure of about 80 psi (552 KPa) for about 2 hours, thereby forming the molding mixture. The degassed molded mixture contained within the cavity of the rubber mold was then placed in a furnace at about 50° C. overnight. A molded composition comprising the ceramic filler and substantially replicating the shape of the cavity of the rubber mold was obtained. This molded composition was then placed on a bedding of about 90 grit (average particle diameter of about 216 micron) 38 ALUNDUM® alumina (Norton Co., Worcester, Mass.) spread over a ceramic refractory plate to form a curing setup. The curing setup was placed in a furnace initially at about 110° C. and held there for about 6 hours. Then the temperature of the furnace was increase to about 150° C. and held there for about 2 hours. A cured molded composition comprising ceramic filler was thereby obtained.

EXAMPLE 110

The present Example demonstrates, among other things, dip coating an aluminum substrate with a composition made from a mixture comprising polyureasilazane and polybutylmethacrylate. A coating mixture was prepared by handmixing in an open vessel about 75 grams of Polymer B, about 1.5 grams of DI-CUP® R dicumyl peroxide (Hercules Inc., Wilmington, Del.), about 50 grams of polybutylmethacrylate (ELVACITE® 2045 acrylic binder, DuPont Chemicals, Wilmington, Del.) and about 325 grams of xylene (Cat. No.

24,764-2, Aldrich Chemical Company, Inc., Milwaukee, Wis.). A large aluminum substrate with the surface prepared by sandblasting was coated with the coating mixture by dipping the substrate into the coating mixture allowing excess material to drain from the dipped part for about 5 minutes. The coating mixture was cured at about 150° C. for about 12 hours. A clear, colorless coating composition exhibiting hardness and abrasion resistance formed. The coating composition also exhibited excellent adhesion to the aluminum substrate.

EXAMPLE 111

The present Example demonstrates, among other things, pour coating onto an aluminum substrate a composition made from a mixture comprising polyureasilazane and polybutylmethacrylate. The methods of Example 110 were substantially repeated to form a coating mixture. However, instead of dipping the aluminum substrate into the coating mixture, the liquid coating mixture was poured over the aluminum substrate. The coated mixture was cured at about 150° C. for about 12 hours. Again, a clear, colorless coating composition exhibiting hardness and abrasion resistance formed. The coating composition also exhibited excellent adhesion to the aluminum substrate.

EXAMPLE 112

The present Example demonstrates, among other things, dip coating a steel substrate with a composition made from a mixture comprising polyureasilazane and polybutylmethacrylate. A coating mixture was prepared by handmixing in an open vessel about 75 grams of Polymer B, about 1.5 grams of DI-CUP® R dicumyl peroxide (Hercules Inc., Wilmington, Del.), about 50 grams of polybutylmethacrylate (ELVACITE® 2045 acrylic binder, DuPont Chemicals, Wilmington, Del.) and about 100 grams of xylene (Cat. No. 24,764-2, Aldrich Chemical Company, Inc., Milwaukee, Wis.). Ten mild steel pipes measuring about 14 inches (355.6 mm) long×about 2.5 inches (63.5 mm) outside diameter× about $\frac{1}{16}$ inch (1.59 mm) wall thickness were dip-coated into the coating mixture. The coating mixture was then cured to about 110° C. for about 2 hours. A smooth, clear, colorless coating composition exhibiting hardness and abrasion resistance formed. The coating composition also exhibited excellent adhesion to the mild steel substrate.

EXAMPLE 113

The present Example demonstrates, among other things, brush coating a mild steel mold with a composition made from a mixture comprising polyureasilazane and polybutylmethacrylate and further comprising ceramic filler. A syrup was prepared by combining a solution comprising by weight about 1 part of polybutylmethacrylate (ELVACITE® 2045 acrylic binder, DuPont Chemicals, Wilmington, Del.) and about 2 parts of xylene (Cat. No. 24,764-2, Aldrich Chemical Company, Inc., Milwaukee, Wis.). A solution was then prepared by handmixing about 4 parts of the syrup and about 1 part of Polymer B containing about 10 wt % of benzoyl-tert-butyl peroxide (ATOCHEM North America, Inc., Crosby, Tex.). An intermediate solution was prepared by mixing about 1 part of the resultant solution and in addition about 1 part xylene. Then, a coating mixture was prepared by handmixing in an open vessel about 10 grams of 1000 grit (average particle diameter of about 5 microns) boron carbide ($B_4C$) (Elektroschmelzwerk, Kempton (ESK), Germany) and an about 20 gram aliquot of the intermediate solution. This coating mixture was brush-coated onto the surface of a AISI Type 1015 mild steel coupon. The coating mixture was cured by heating the coupon to about 110° C. for about 1 hour. A continuous black, matte-finish coating composition exhibiting hardness and abrasion-resistance formed. The coating composition also exhibited excellent adhesion to the mild steel.

EXAMPLE 114

The present Example demonstrates, among other things, dip coating a mild steel coupon with a composition made from a mixture comprising polyureasilazane and polybutylmethacrylate and further comprising metal filler. A coating mixture was prepared by handmixing in an open vessel about 10 grams of about 1000 grit (average particle diameter of about 5 microns) boron carbide ($B_4C$) (Elektroschmelzwerk, Kempton (ESK), Germany), about 10 grams of aluminum powder flake (UN1369, 7100 aluminum, Alcan Powders and Chemicals, Elizabeth, N.J.) and about 40 grams aliquot of a peroxide-containing, polyureasilazane-polybutylmethacrylate intermediate solution prepared substantially in accordance with the methods of Example 113. An AISI Type 1015 mild steel coupon was then dipped into the coating mixture. The coating mixture was cured at about 110° C. for about 1 hour. A "silvery" coating composition with a metallic sheen exhibiting good adhesion to the mild steel formed.

EXAMPLE 115

The present Example demonstrates, among other things, brush coating a stainless steel with a composition made from a mixture comprising polyureasilazane and polyisocyanate. A coating mixture was prepared by handmixing in an open vessel about 10.0 grams of methylene diphenyldiisocyanate-derived polyisocyanate (Part "A" of a urethane casting resin: Smooth-On™ C-1508 Rigid Urethane Casting Resin; Smooth-On, Inc., 1000 Valley Road, Gillette, N.J.) and about 5.0 grams of Polymer B (to which had been added 0.5 wt % of DI-CUP® R dicumyl peroxide, Hercules Inc., Wilmington, Del.). The composition was then brush-coated onto the surface of an AISI Type 304 stainless steel coupon. The coated mixture was cured at about room temperature for about 1 hour. A transparent, colorless, and glossy coating composition formed. The coating composition exhibited excellent adhesion to the stainless steel coupon.

EXAMPLE 116

The present Example demonstrates, among other things, brush coating an aluminum coupon with a composition made from a mixture comprising polyureasilazane and polyisocyanate and further comprising ceramic filler. A coating mixture was prepared by handmixing in an open vessel about 28.7 grams of an about 30 wt % dispersion of 1000 grit (average particle diameter about 5 microns) boron carbide ($B_4C$) in methylene diphenyldiisocyanate-derived polyisocyanate (Part "A" of a urethane casting resin: Smooth-On™ C-1508 Rigid Urethane Casting Resin; Smooth-On, Inc., 1000 Valley Road, Gillette, N.J.) and about 6 grams of Polymer B (to which had been added about 0.5 wt % of DI-CUP® R dicumyl peroxide, Hercules Inc., Wilmington, Del.). The coating mixture was then brush-coated onto a surface of an aluminum coupon. The coated mixture set at about room temperature for 1 hour, and then cured at about 110° C. for about 1 hour. A very glossy and ebony-colored coating composition exhibiting excellent hardness and abrasion resistance formed. Furthermore, the coating composition adhered tenaciously to the aluminum coupon.

EXAMPLE 117

The present Example demonstrates, among other things, pour coating a stainless steel with a composition made from a mixture comprising polyureasilazane and polyisocyanate and further comprising ceramic filler. A coating mixture was prepared by handmixing in an open vessel about 28.7 grams of an about 30 wt % dispersion of 1000 grit (average particle diameter about 5 microns) boron carbide ($B_4C$) in methylene diphenyldiisocyanate-derived polyisocyanate (Part "A" of a urethane casting resin: Smooth-On™ C-1508 Rigid Urethane Casting Resin; Smooth-On, Inc., 1000 Valley Road, Gillette, N.J.) and about 6 grams of Polymer B (to which had been added about 0.5 wt % of DI-CUP® R dicumyl peroxide, Hercules Inc., Wilmington, Del.). The coating mixture was poured onto a surface of an AISI Type 304 stainless mixture. The coated steel plate, after about 1 hour at about room temperature, was cured to about 110° C. for about hour. A glossy, black coating composition exhibiting excellent adhesion to the stainless steel substrate formed.

EXAMPLE 118

The present Example demonstrates, among other things, brush coating a stainless steel with a composition made from a mixture comprising polyureasilazane and polyisocyanate further comprising metal filler. A coating mixture was prepared by handmixing in an open vessel about 10.0 grams of methylene diphenyldiisocyanate-derived polyisocyanate (Part "A" of a urethane casting resin: Smooth-On™ C-1508 Rigid Urethane Casting Resin; Smooth-On, Inc., 1000 Valley Road, Gillette, N.J.), about 5.0 grams of Polymer B (to which had been added 0.5 wt % of DI-CUP® R dicumyl peroxide, Hercules Inc., Wilmington, Del.) and about 3.0 grams of aluminum flake powder (UN1396, 7100 aluminum, Alcan Powders and Chemicals, Elizabeth, N.J.). The coating mixture was brush-coated onto a surface of an AISI Type 304 stainless steel plate. After about 1 hour at about room temperature, the coating mixture was cured at about 110° C. for about 1 hour. A "silvery" metallic, glossy, composition coating exhibiting, high hardness, abrasion resistance, and excellent adhesion to the stainless steel plate formed.

EXAMPLE 119

The present Example demonstrates, among other things, brush coating a block of aluminum with a composition made from a mixture comprising polyureasilazane and diepoxide. A coating mixture was prepared by handmixing in an open vessel about 20 grams of diglycidyl ether of Bisphenol "A" (Cat. No. 8760, Dajac Laboratories, Inc., Southhampton, Pa.), about 20 grams of Polymer B (to which about 0.5 wt % of DI-CUP® R dicumyl peroxide, Hercules Inc., Wilmington, Del., had been added), about 10 ml of acetone (histological grade, Fisher Chemical, Fairlawn, N.J.) and about 0.5 grams of phthalic acid (Cat. No. 40,291-5, Aldrich Chemical Company, Inc., Milwaukee, Wis.). The coating mixture was brush-coated onto a surface of an aluminum block. The coated mixture was cured at about 150° C. for about 2 hours. A clear, colorless coating composition exhibiting good abrasion resistance, as well as adhesion to the aluminum block formed.

EXAMPLE 120

The present Example demonstrates, among other things, brush coating a block of aluminum with a composition made from a mixture comprising polyureasilazane and diepoxide and further comprising metal filler. A coating mixture was prepared by handmixing in an open vessel about 20 grams of diglycidyl ether of Bisphenol "A" (Cat. No. 8760, Dajac Laboratories, Inc., Southhampton, Pa.), about 20 grams of Polymer B (to which about 0.5 wt % of DI-CUP® R dicumyl peroxide, Hercules Inc., Wilmington, Del., had been added), about 10 ml of acetone (histological grade, Fisher Chemical, Fairlawn, N.J.), about 0.5 grams of phthallic acid (Cat. No. 40,291-5, Aldrich Chemical Company, Inc., Milwaukee, Wis.) and about 10 grams of aluminum metal powder flake (ALCAN UN1396, 7100 aluminum, Alcan Powders and Chemicals, Elizabeth, N.J.). The coating mixture was brush-coated onto a surface of a block of aluminum. The coated mixture was cured at about 150° C. for about 2 hours. A "silvery" metallic, glossy coating composition exhibiting abrasion resistance formed. The coating composition also exhibited excellent adhesion to the block of aluminum.

EXAMPLE 121

The present Example demonstrates, among other things, brush coating an stainless steel with a composition made from a mixture comprising polyureasilazane and diepoxide and further comprising ceramic filler. A coating mixture was prepared by handmixing in an open vessel about 20 grams of diglycidyl ether of Bisphenol "A" (Cat. No. 8760, Dajac Laboratories, Inc., Southhampton, Pa.), about 20 grams of Polymer B (to which about 0.5 wt % of DI-CUP® R dicumyl peroxide, Hercules Inc., Wilmington, Del., had been added), about 10 ml of acetone (histological grade, Fisher Chemical, Fairlawn, N.J.), about 0.5 grams of phthallic acid (Cat. No. 40,291-5, Aldrich Chemical Company, Inc., Milwaukee, Wis.) and about 5 grams of 1000 grit (average particle diameter of about 5 microns) 39 CRYSTOLON® green silicon carbide powder (Norton Co., Worcester, Mass.). The coating mixture was brush coated onto a surface of an AISI Type 304 stainless steel plate. The coated mixture was cured at about 150° C. for about 2 hours. A "silvery" metallic coating composition exhibiting excellent gloss and abrasion resistance formed. The coating composition also exhibited excellent adhesion to the stainless steel plate.

EXAMPLE 122

The present Example demonstrates, among other things, brush coating an AISI Type 304 stainless steel with a composition made from a mixture comprising polysilazane and polyisocyanate. A coating mixture was prepared at about room temperature by handmixing in an open vessel about 2.5 grams of Polymer A (containing about 0.5 wt % DI-CUP® R dicumyl peroxide, Hercules Inc., Wilmington, Del.) and about 10.0 grams of methylene diphenyldiisocyanate polyisocyanate (Part "A" of a urethane casting resin: Smooth-On™ C-1508 Rigid Urethane Casting Resin; Smooth-On, Inc., 1000 Valley Road, Gillette, N.J.). The coating composition was brush-coated onto a surface of an AISI Type 304 stainless steel plate. The coated mixture cured on the plate after standing at about room temperature for about 1 hour. A clear, colorless and glossy coating composition exhibiting good adherence to the stainless steel plate formed.

EXAMPLE 123

The present Example demonstrates, among other things, brush coating a block of aluminum with a composition made from a mixture comprising polysilazane and diepoxide. A coating mixture was prepared by handmixing in an open vessel about 20 grams of the diglycidyl ether of Bisphenol "A" (Cat. No. 8760, Dajac Laboratories, Inc., Southhampton, Pa.), about 20 grams of Polymer A (to which about 0.5 wt % of DI-CUP® R dicumyl peroxide, Hercules Inc., Wilmington, Del., had been added), about 10 ml of acetone (histological grade, Fisher Chemical, Fairlawn, N.J.) and about 0.5 grams of phthallic acid (Cat. No. 40,291-5, Aldrich Chemical Company, Inc., Milwaukee, Wis.). The coating mixture was brush-coated onto a surface of the block of aluminum. The coated mixture was cured at about 150° C. for about 2 hours. A clear, colorless and glossy coating composition exhibiting good adherence to the block of aluminum formed.

EXAMPLE 124

The present Example demonstrates, among other things, brush coating a graphite cylinder with a composition made from a mixture comprising polysilazane and polybutylmethacrylate. A coating mixture was prepared by handmixing in an open vessel about 20 grams of polybutylmethacrylate (ELVACITE® 2045 acrylic binder, DuPont Chemicals, Wilmington, Del.), about 40 ml of xylene (Cat. No. 24,764-2, Aldrich Chemical Company, Inc., Milwaukee, Wis.) and about 20 grams of Polymer A (to which about 0.5 wt % DI-CUP® R dicumyl peroxide, Hercules Inc., Wilmington, Del., had been added). The coating mixture was brush-coated onto a surface of a graphite cylinder. The coated mixture was cured at about 150° C. for about 1 hour. A clear, glossy coating composition exhibiting hardness and abrasion resistance formed. The coating composition also exhibited excellent adhesion to the graphite cylinder.

EXAMPLE 125

The present Example demonstrates, among other things, brush coating a mild steel with a composition made from a mixture comprising poly(silazane/alazane) and polyisocyanate. A coating mixture was prepared at about room temperature by handmixing in an open vessel about 1.25 grams of Polymer F and about 5.00 grams of methylene diphenyldiisocyanate polyisocyanate (Part "A" of a urethane casting resin: Smooth-On™ C-1508 Rigid Urethane Casting Resin; Smooth-On, Inc., 1000 Valley Road, Gillette, N.J.). The coating composition was brush-coated onto a surface of an AISI Type 1015 mild steel coupon. The coated mixture cured after about 1 hour at about room temperature. A yellow coating composition exhibiting good adhesion to the mild steel coupon formed.

EXAMPLE 126

The present Example demonstrates, among other things, brush coating a mild steel with a composition made from a mixture comprising poly(silazane/alazane) and polyisocyanate and further comprising metal filler. A coating mixture was prepared by handmixing in an open vessel about 1.25 grams of Polymer F, about 5.00 grams of methylene diphenyldiisocyanate polyisocyanate (Part "A" of a urethane casting resin: Smooth-On™C-1508 Rigid Urethane Casting Resin; Smooth-On, Inc., 1000 Valley Road, Gillette, N.J.) and about 3.0 grams of aluminum metal flake (ALCAN UN1396, 7100 aluminum, Alcan Powders and Chemicals, Elizabeth, N.J.). The coating mixture was brush-coated onto a surface of an AISI Type 1015 mild steel coupon. The coated mixture cured after about 1 hour at about room temperature. A "silvery", metallic coating composition exhibiting excellent abrasion resistance and very good adhesion to the mild steel coupon formed.

EXAMPLE 127

The present Example demonstrates, among other things, brush coating a mild steel with a composition made from a mixture comprising a poly(silazane/alazane) and polyisocyanate and further comprising ceramic filler. A coating mixture was prepared by handmixing in an open vessel about 1.25 grams of Polymer F, about 5.00 grams of methylene diphenyldiisocyanate polyisocyanate (Part "A" of a urethane casting resin: Smooth-On™C-1508 Rigid Urethane Casting Resin; Smooth-On, Inc., 1000 Valley Road, Gillette, N.J.) and about 3.0 grams of 1000 grit (average particle diameter of about 5 microns) boron carbide ($B_4C$) (Elektroschmelzwerk, Kempton (ESK), Germany) powder. The coating mixture was brush-coated onto a surface of an AISI Type 1015 mild steel coupon. The coated mixture cured after about 1 hour at about room temperature. A glossy, black coating composition exhibiting superior abrasion resistance and excellent adhesion to the mild steel substrate formed.

EXAMPLE 128

The present Example demonstrates, among other things, brush coating a mild steel with a composition made from a mixture comprising poly(silazane/alazane) and diepoxide. A coating mixture was prepared by handmixing in an open vessel equal parts of Polymer F and diglycidyl ether of Bisphenol "A" (Cat. No. 8760, Dajac Laboratories, Inc., Southhampton, Pa.) and about 5 grams of acetone (histological grade, Fisher Chemical, Fairlawn, N.J.) to make about 10 grams of a composition. The coating mixture was brush-coated onto a surface of an AISI Type 1015 mild steel coupon. The coated mixture was cured at about 150° C. for about 3 hours. An adherent, yellow coating composition exhibiting some porosity was formed.

EXAMPLE 129

The present Example demonstrates, among other things, brush coating a mild steel with a composition made from a mixture comprising poly(silazane/alazane) and polybutylmethacrylate. A coating mixture was prepared by handmixing in an open vessel equal parts of Polymer F and polybutylmethacrylate (ELVACITE® 2045 acrylic binder, DuPont Chemicals, Wilmington, Del.) and about 5 grams of xylene (Cat. No. 24,764-2, Aldrich Chemical Company, Inc., Milwaukee, Wis.) to make about 10 grams of coating mixture. The coating mixture was brush-coated onto a surface of an AISI Type 1015 mild steel coupon. The coated coupon was heated to about 150° C. for about 1 hour. A clear, colorless, glossy coating composition exhibiting good abrasion resistance and excellent adhesion to the mild steel substrate formed.

EXAMPLE 130

The present Example demonstrates, among other things, brush coating a mild steel with a composition made from a mixture comprising polyalazane and polyisocyanate. A coating mixture was prepared at about room temperature by handmixing in an open vessel about 1.25 grams of Polymer D and about 5.00 grams of methylene diphenyldiisocyanate polyisocyanate (Part "A" of a urethane casting resin: Smooth-On™ C-1508 Rigid Urethane Casting Resin; Smooth-On, Inc., 1000 Valley Road, Gillette, N.J.). The coating mixture was brush-coated onto a surface of an AISI Type 1015 mild steel coupon. The coated mixture was cured at about 150° C for about 1 hour. A hard, yellow coating composition exhibiting good adherence to the mild steel formed.

EXAMPLE 131

The present Example demonstrates, among other things, brush coating a mild steel with a composition made from a mixture comprising polyborazine and polyisocyanate. A coating mixture was prepared at about room temperature by handmixing in an open vessel about 1.25 grams of Polymer E and about 5.00 grams of methylene diphenyldiisocyanate polyisocyanate (Part "A" of a urethane casting resin: Smooth-On™ C-1508 Rigid Urethane Casting Resin; Smooth-On, Inc., 1000 Valley Road, Gillette, N.J.). The coating mixture was brush-coated onto a surface of an AISI Type 1015 mild steel coupon. The coated mixture was cured at about 150° C for about 1 hour. A yellow coating composition exhibiting good adherence to the mild steel formed.

EXAMPLE 132

The present Example demonstrates, among other things, brush coating a mild steel with a composition made from a mixture comprising polyborazine and polybutylmethacrylate. A coating mixture was prepared by handmixing in an open vessel by weight equal parts of Polymer E and a syrup prepared by dissolving about 1 part of polybutylmethacrylate polymer (ELVACITE® 2045 acrylic binder, DuPont Chemicals, Wilmington, Del.) in about 1 part of xylenes (Cat. No. 24,764-2, Aldrich Chemical Company, Inc., Milwaukee, Wis.). The coating mixture was brush-coated to a surface of an AISI Type 1015 mild steel coupon. The coated mixture was cured at about 150° C. for about 1 hour. A yellow coating composition exhibiting good adherence to the mild steel formed.

EXAMPLES 133–139

The present Examples demonstrate, among other things, spray coating compositions made from mixtures comprising metal-nitrogen polymers. Table VIII sets forth for Examples 133–139 the coating mixture formed from a coating mixture base and a coating mixture dilutant, the coated substrate and the application method the curing temperature and the curing time for these Examples 133–139. The following is a description of the methods for preparing the coating mixtures and the substrates.

Two coating mixture bases were prepared to make the coating mixtures for the present Examples. These coating mixture bases are designated Base A and Base B.

Preparation of Coating Mixture Base A: The coating mixture Base A comprised a mixture comprising a polyureasilazane and a polybutylmethacrylate. A solution was prepared by combining in a container equal parts by weight polybutylmethacrylate polymer (ELVACITE™ 2045 acrylic binder, DuPont Co., Wilmington, Del.) and about 1 part xylene. After the container was sealed, it was placed on a rolling mill for about 24 hours to substantially completely dissolved the polybutylmethylmethacrylate into the SUNNYSIDE XY101 xylene (Sunny Corporation, Wheeling, Ill.) and form the solution.

A coating mixture base was then prepared by combining in a container by weight about 2 parts of the solution with about 1 part of Polymer B (to which had been added about 3 weight percent of DI-CUP® R dicumyl peroxide (Hercules Inc., Wilmington, Del.), and in some instances, the DI-CUP® R dicumyl peroxide (Hercules Inc., Wilmington, Del.) was dissolved in a small gravity of xylene by roll milling prior to addition). The container was then sealed and placed on a rolling mill for about 24 hours until dicumyl peroxide had substantially completely dissolved thereby forming the coating mixture Base A. The composition of the coating mixture Base A comprised by weight about 44.1 percent xylene, about 22 percent polymethacrylate, about 32.9 percent Polymer B and about 1 percent dicumyl peroxide.

Preparation of Coating Mixture Base B: The coating mixture of Base B was made from a mixture comprising polyureasilazane, dimethyl adipate and polymethyacrylate. A solution was prepared by combining in a container by weight about 4 parts DPE-6 dimethyl adipate (DuPont Chemicals, Wilmington, Del.) and about 1 part polybutylmethacrylate (ELVACITE™ 2045 acrylic binder, DuPont Chemicals, Wilmington, Del.). After the container was sealed, it was placed on a rolling mill for about 24 hours to substantially dissolve the polybutylmethacrylate into the dimethyl adipate, thereby forming the solution.

A coating mixture base was then prepared by combining in a container by weight about 3 parts of the liquid solution

TABLE VIII

Coating Composition Made from Mixtures Comprising Metal-Nitrogen Polymers

| Example | Coating Mixture Base (Wt %) | Coating Mixture Diluent (Wt %) | Coated Substrate | Application Method | Curing Temp | Curing Time |
|---------|------------------------------|-------------------------------|------------------|---------------------|-------------|-------------|
| 133 | Base A (50%) | Xylene (50%) | Aluminum | Spray | 225° C. | 20 minutes |
| 134 | Base A (66.7%) | Xylene (33.3%) | ASTM Specification A615 and A616, Grade 60 Steel | Spray | 100° C. | 45 minutes |
| 135 | Base A (50%) | Xylene (50%) | Floor grade commercial marble | Spray | 100° C. | 45 minutes |
| 136 | Base A (66.7%) | Xylene (33.3%) | Mild Steel | Spray | 100° C. | 45 minutes |
| 137 | Base A (100%) | N/A | Wood | Brush | 100° C. | 15 minutes |
| 138 | Base A (100%) | N/A | Electrical Grade Copper | Dip | 100° C. | 10 minutes |
| 139 | Base B (66.7%) | Xylene (33.3%) | Cast iron | Spray | 100° C. | 60 minutes | to about 1 part Polymer B (to which had been added about 3 weight percent of DI-CUP® R dicumyl peroxide (Hercules Inc., Wilmington, Del.), and in some instances, the DICUP® R dicumyl peroxide (Hercules Inc., Wilmington, Del.) was dissolved in a small gravity of SUNNYSIDE XY101 xylene (Sunny Corporation, Wheeling, Ill.) by roll milling prior to addition). After the container was sealed, it was placed on a rolling mill for about 24 hours until the DI-CUP® R dicumyl peroxide (Hercules Inc., Wilmington, Del.) had substantially completely dissolved in the mixture, thereby forming the coating mixture Base B. Coating mixture Base B comprised by weight about 59.5 percent dimethyl adipate, about 14.9 percent polybutylmethacrylate, about 24.8 percent Polymer B and about 0.8 percent DI-CUP® dicumyl peroxide (Hercules Inc., Wilmington, Del.).

Coating mixture Base A and Base B were applied to the substrates set forth in Table VIII either in their full concentration or by dilution with additional xylene to form a coating mixture. The substrates were first cleaned with a lint-free cloth and in some instances with alcohol. When additional SUNNYSIDE XY101 xylene (Sunny Corporation, Wheeling, Ill.) was used, the coating mixture base and the SUNNYSIDE XY101 xylene (Sunny Corporation, Wheeling, Ill.) were placed in a container and then onto a rolling mill for about 4 hours to make a uniform blend. When the coating mixtures were applied by spray coating, the coating mixtures were poured into the cup of a commercially available syphon-type spray gun (IWATA, Model No. TUG15, obtained from SMART SHOPPERS, Louisville, Ky.) and applied using clean, dry compressed air to obtain a substantially uniform spray pattern using a pressure between about 25 psi (173.4 kPa) and about 60 psi (413.7 kPa). In some instances, the coating mixtures were cured by heating to the temperatures as set forth in Table VIII for the corresponding times. After the coatings had cured, it was noted that coating compositions exhibiting good adherence to the various substrates were obtained.

EXAMPLES 140–148

The present Examples demonstrate, among other things, the formation of pigmented molded compositions from mixtures comprising a diisocyanate and a metal-nitrogen polymer and further comprising a silica filler. Table IX summarizes for Examples 140–148 the composition in weight percent of the materials used to formulate the molding mixtures to form the pigmented molded compositions. The specific materials used to make the molding mixtures included RUBINATE® M polymer methylene diphenyl diisocyanate (MDI) (ICI Polyurethanes Group, West Deptford, N.J.), VIBRATHANE® B-601 polyurethane (Uniroyal Chemical Co., Inc., Middlebury, Conn.), Grade D, FJ-70 silica sand (Foundry Services Supply Co., Baltimore, Md.), Polymer B (CERASET® SN preceramic polymer, Lanxide Corporation, Newark, Del.) and pigments. The pigments used to make the molding mixtures are summarized in Table IX and included 1000 grit (average particle diameter of about 5 microns) boron carbide (Elektroschmelzwerk, Kempton (ESK), Germany), No. 558, bright yellow, Engobe/slip stain (Standard Ceramic Supply Co., Pittsburgh, Pa.), UN1369, 7100 aluminum powder flake (Alcan Powders and Chemicals, Elizabeth, N.J.), No. 569, turquoise, Engobe/slip stain (Standard Ceramic Supply Co., Pittsburgh, Pa.), No. K-38 cobalt blue glaze stain (Standard Ceramic Supply Co., Pittsburgh, Pa.), No. 556 dark green Engobe/slip stain (Standard Ceramic Supply Co., Pittsburgh, Pa.), and BEN® DW0132 yellow (CIBA-GEIBY Corp., East Lansing, Mi.). The pigment molded compositions of Examples 140–148 were made by substantially the same procedure. Thus, the method for making the pigmented molded composition of Example 140 is described in detail below. An artisan of ordinary skill in the art possesses the skill and understanding to make the minor modifications to the procedure of Example 140 to form the pigmented molded compositions of Examples 141–148.

TABLE IX

Pigmented Molded Compositions Made From Mixtures Comprising Isocyanates and a Silicon-Nitrogen Polymer

| Example | RUBINATE ® M[1] Polymeric MDI | VIBRATHANE ®[2] B-601 Polyurethane | Grade D, FJ-70[3] Silica Sand | Polymer B | Pigment | Molded Composition Color |
|---|---|---|---|---|---|---|
| 140 | 23.4 wt % | 5.0 wt % | 63.8 wt % | 7.1 wt % | 0.7 wt % $B_4C$[4] | Black |
| 141 | 21.3 wt % | 7.1 wt % | 63.8 wt % | 7.1 wt % | 0.7 wt % $B_4C$[4] | Black |
| 142 | 22.9 wt % | 7.6 wt % | 61.1 wt % | 7.6 wt % | 0.8 wt % $B_4C$[4] | Black |
| 143 | 22.0 wt % | 7.4 wt % | 58.8 wt % | 7.4 wt % | 4.4 wt % #558 Yellow[5] | Yellow |
| 144 | 22.0 wt % | 7.4 wt % | 58.8 wt % | 7.4 wt % | 4.4 wt % Al powder[6] | Silver |
| 145 | 22.0 wt % | 7.4 wt % | 58.8 wt % | 7.4 wt % | 4.4 wt % #569 Turquoise[7] | Turquoise |
| 146 | 22.0 wt % | 7.4 wt % | 58.8 wt % | 7.4 wt % | 4.4 wt % K-38 Blue[8] | Blue |
| 147 | 22.0 wt % | 7.4 wt % | 58.8 wt % | 7.4 wt % | 4.4 wt % #556 Green[9] | Green |
| 148 | 21.0 wt % | 7.1 wt % | 56.3 wt % | 7.4 wt % | 8.5 wt % DW0132 Yellow | Yellow |

[1]RUBINATE ® M polymeric methylene diphenyl diisocyanate (MDI) (ICI Polyurethanes Group, West Deptford, NJ)
[2]VIBRATHANE ® B-601 polyurethane (Uniroyal Chemical Co., Inc., Middlebury, CT)
[3]Grade D, FJ-70 silica sand (Foundry Services Supply Company, Baltimore, MD)
[4]1000 grit boron carbide (Elektroschmelzwerk, Kempton (ESK), Germany)
[5]No. 558 bright yellow Engobe/slip stain (Standard Ceramic Supply Co., Pittsburgh, PA)
[6]UN1369, 7100 aluminum powder flake (Alcan Powders and Chemicals, Elizabeth, NJ)
[7]No. 569 turquoise Engobe/slip stain (Standard Ceramic Supply Co., Pittsburgh, PA)
[8]No. K-38 cobalt blue glaze stain (Standard Ceramic Supply Co., Pittsburgh, PA)

TABLE IX-continued

Pigmented Molded Compositions Made From Mixtures Comprising Isocyanates and a Silicon-Nitrogen Polymer

| | Composition | | | | | Molded |
|---|---|---|---|---|---|---|
| Example | RUBINATE ® M[1] Polymeric MDI | VIBRATHANE ®[2] B-601 Polyurethane | Grade D, FJ-70[3] Silica Sand | Polymer B | Pigment | Composition Color |

[9] No. 556 dark green Engobe/slip stain (Standard Ceramic Supply Co., Pittsburgh, PA)
[10] BEN ® DW-132 yellow (CIBA-GEIBY Corp, East Lansing, MI)

EXAMPLE 140

A liquid solution was prepared by combining in a first about 1000 ml HDPE NALGENE® plastic carboy (Nalge Company, Rochester, N.Y.), about 660 grams of RUBINATE® M polymeric methylene diphenyl diisocyanate (ICI Polyurethanes Group, West Deptford, N.J.) and about 140 grams VIBRATHANE® B-601 polyurethane (Uniroyal Chemical Co., Inc., Middlebury, Conn.). After closing, the first plastic carboy was placed on a rolling mill for about 0.5 hours to homogenize the liquid solution.

A precursor molding mixture was prepared by adding to the liquid solution in the first plastic carboy about 1600 grams of Grade D, FJ-70 silica sand (Foundry Services Supply Co., Baltimore, Md.) and about 20 grams 1000 grit (average particle diameter of about 5 microns) boron carbide (Elektroschmelzwerk, Kempton (ESK), Germany). After again closing, the first plastic carboy and its contents were placed on a rolling mill for about 2.5 hours to substantially completely mix the components of the precursor molding mixture. During this time, about 200 grams of Polymer B (Lanxide Corporation, Newark, Del.) and about 200 grams Grade D, FJ-70 silica sand (Foundry Services Supply Co., Baltimore, Md.) were combined in a second about 1000 ml HDPE NALGENE® plastic carboy (Nalge Company, Rochester, N.Y.). After closing, the second plastic carboy was placed on a rolling mill until Polymer B substantially wet the sand.

In the meantime, the first plastic carboy and its contents were removed from the rolling mill. After opening, the first plastic carboy was placed under a vacuum bell jar and the precursor molding mixture was degassed by exposing the precursor molding mixture to a vacuum of about 30 inches (762 mm) of mercury for about 15 minutes.

A molding mixture was then prepared by combining the degassed precursor molding mixture of the first plastic carboy and the Polymer B sand mixture of the second plastic carboy. The molding mixture was vigorously handmixed. When substantially homogeneously mixed, the molding mixture was cast into a cavity of an aluminum mold (spray coated with a polyester-based paraffin, Price-Driscoll Corp., Farmingdale, N.Y.) which had been machined produced a molded object measuring about 12 inches (304.8 mm) square, about 0.25 inch (6.4 mm) high and consisting of raised truncated domes with a diameter of about 0.9 inch (23 mm), a height of about 0.2 inch (5 mm) and a center-to-center spacing of about 2.3 inches (60 mm) extending for one 12 inch (304.8 mm) square face of the molded object.

After about 4 hours at about room temperature, the mold containing the molded mixture was placed into an oven set at about 135° C. for about 12 hours. After the mold and its contents were then removed from the oven, a black pigmented molded object substantially replicating the cavity of the mold was recovered.

EXAMPLES 141–148

The pigmented molded compositions of Examples 141–148 were made by substantially the procedure of Example 140, except that in Examples 142–148 no sand was added to Polymer B and in Examples 145–148 the mold comprised a plastic mold rather than the aluminum mold. In each of Examples 141–148, a pigmented molded composition substantially replicating the shape of the cavity of the mold was recovered. The colors of the pigmented molded compositions are summarized in Table IX.

We claim:

1. A reaction mixture comprising (1) at least one organic electrophile, comprising at least one organic polymer comprising a multiplicity of organic, electrophilic substituents wherein said electrophilic substituents comprise at least one electrophilic reactive group selected from the group consisting of epoxides, carbonyl-containing groups, and isocyanates, and (2) at least one metal-containing polymer comprising at least one of (i) a polymer selected from the group consisting of silicon-nitrogen polymers, aluminum-nitrogen polymers, and boron-nitrogen polymers comprising the repeat units (a), (b), and (c),

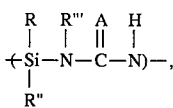 (a)

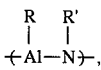 (b)

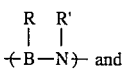 and (c)

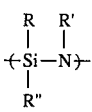 (d)

respectively, where R, R', R" and R'''=hydrogen, alkyl, alkenyl, alkynyl or aryl and A=O or S; (ii) at least one mixture of polymers comprising two or more of the structural units (a), (b), (c), and (d); (iii) at least one metal-crosslinked polymer comprising one or more of the structural units (a), (b), (c), and (d); and (iv) at least one copolymer comprising two or more of the structural units (a), (b), (c), and (d).

2. The reaction mixture of claim 1, wherein said at least one metal-containing polymer comprises at least one metal-nitrogen polymer comprising the repeat unit

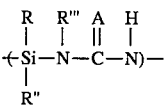

wherein R=alkenyl.

3. The reaction mixture of claim 2, wherein said at least one metal-containing polymer further comprises the repeat unit

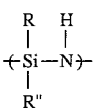

wherein R=alkenyl.

4. The reaction mixture of claim 1, wherein said at least one organic polymer comprises at least one electrophilic substituent comprising at least one diester or at least one polyester or at least one polyacrylate or at least one polymethacrylate or at least one diepoxide or at least one multi-functional epoxide or at least one diisocyanate or at least one multi-functional isocyanate or at least one polyimide or at least one polyamide.

5. The reaction mixture of claim 1, wherein said at least one organic polymer comprises at least two electrophilic substituents selected from the group consisting of at least one ester, at least one acrylate, at least one methacrylate, at least one epoxide, at least one isocyanate, at least one imide, and at least one amide.

6. The reaction mixture of claim 1, wherein said at least one organic polymer comprises at least one electrophilic substituent selected from the group consisting of at least one diester, at least one polyester, at least one polyacrylate, at least one polymethacrylate, at least one diepoxide, at least one multi-functional epoxide, at least one diisocyanate, at least one polyimide, at least one polyamide, and at least one multi-functional isocyanate.

7. The reaction mixture of claim 1, further comprising at least one filler.

8. The reaction mixture of claim 1, further comprising at least one free radical generator.

9. A composition comprising the reaction product of (1) at least one organic electrophile comprising at least one organic polymer comprising a multiplicity of organic, electrophilic substituents wherein said electrophilic substituents comprise at least one electrophilic reactive group selected from the group consisting of epoxides, carbonyl-containing groups, and isocyanates, and (2) at least one metal-containing polymer comprising at least one of (i) a polymer selected from the group consisting of silicon-nitrogen polymers, aluminum-nitrogen polymers, and boron-nitrogen polymers comprising the repeat units (a), (b) and (c),

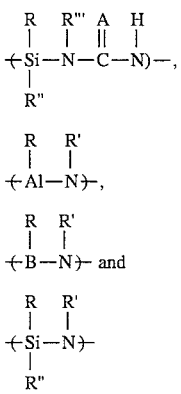

respectively, where R, R', R" and R'"=hydrogen, alkyl, alkenyl, alkynyl or aryl and A=O or S; (ii) at least one mixture of at least two or more polymers comprising two or more of the structural units of the form (a), (b), (c), and (d); (iii) at least one metal-crosslinked polymer comprising one or more of the structural units of the form (a), (b), (c), and (d); or (iv) at least one copolymer comprising two or more of the structural units of the form (a), (b), (c), and (d).

10. The composition of claim 9, wherein said at least one organic polymer comprises at least one electrophilic substituent comprising at least one diester or at least one polyester or at least one polyacrylate or at least one polymethacrylate or at least one diepoxide or at least one multi-functional epoxide or at least one diisocyanate or at least one multi-functional isocyanate or at least one polyimide or at least one polyamide.

11. The composition of claim 9, wherein said at least one organic polymer comprises at least two electrophilic substituents selected from the group consisting of at least one ester, at least one acrylate, at least one methacrylate, at least one epoxide, at least one isocyanate, at least one imide, and at least one amide.

12. The composition of claim 9, wherein said at least one organic polymer comprises at least one electrophilic substituent selected from the group consisting of at least one diester, at least one polyester, at least one polyacrylate, at least one polymethacrylate, at least one diepoxide, at least one multi-functional epoxide, at least one diisocyanate, at least one polyimide, at least one polyamide, and at least one multi-functional isocyanate.

13. The composition of claim 9, wherein said at least one metal-containing polymer comprises at least one metal-nitrogen polymer comprising the repeat unit

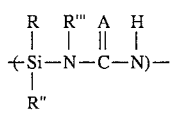

wherein R=alkenyl.

14. The composition of claim 13, wherein said at least one metal-containing polymer further comprises the repeat unit

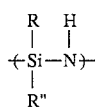

wherein R=alkenyl.

15. The composition of claim 9, wherein said composition comprises a fusible, uncrosslinked reaction product which can be crosslinked through at least one radical-based, or at least one ionic-based crosslinking mechanism.

16. The crosslinked reaction product of claim 9.

17. The composition of claim 9, further comprising at least one filler.

18. The crosslinked reaction product of claim 16, further comprising at least one filler.

19. The composition of claim 9, further comprising at least one free radical generator.

20. The crosslinked reaction product of claim 16, which has been crosslinked by providing at least one energy input in the form of at least one of thermal energy or radiation energy.

21. A method for making a composition comprising:
(1) providing at least one organic electrophile comprising at least one organic polymer comprising a multiplicity of organic, electrophilic substituents, wherein said electrophilic substituents comprise at least one electrophilic reactive group selected from the group consisting of epoxides, carbonyl-containing groups, and isocyanates,
(2) providing at least one metal-containing polymer comprising at least one metal-nitrogen polymer wherein said at least one metal-containing polymer comprises at least one of (i) at least one metal-nitrogen polymer selected from the group consisting of silicon-nitrogen polymers, aluminum-nitrogen polymers, and boron-nitrogen polymers comprising the repeat units (a), (b) and (c),

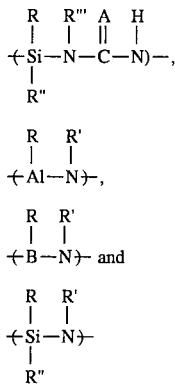

respectively, where R, R', R" and R'"=hydrogen, alkyl, alkenyl, alkynyl or aryl and A=O or S; (ii) at least one mixture of polymers comprising two or more of the structural units (a), (b), (c), and (d); (iii) at least one metal-crosslinked polymer comprising one or more of the structural units (a), (b), (c), and (d); and (iv) at least one copolymer comprising two or more of the structural units (a), (b), (c), and (d); and (3) combining said at least one organic electrophile and said at least one metal-containing polymer.

22. The method of claim 21, wherein said at least one organic polymer comprises at least one electrophilic substituent comprising at least one diester or at least one polyester or at least one polyacrylate or at least one polymethacrylate or at least one diepoxide or at least one multi-functional epoxide or at least one diisocyanate or at least one multi-functional isocyanate or at least one polyamide or at least one polyimide.

23. The method of claim 21, wherein said at least one organic polymer comprises at least two electrophilic substituents selected from the group consisting of at least one ester, at least one acrylate, at least one methacrylate, at least one epoxide, at least one isocyanate, at least one imide, and at least one amide.

24. The method of claim 21, wherein said at least one organic polymer comprises at least one electrophilic substituent selected from the group consisting of at least one diester at least one polyester, at least one polyacrylate, at least one polymethacrylate, at least one diepoxide, at least one multi-functional epoxide, at least one diisocyanate, at least one polyamide, at least one polyimide and at least one multi-functional isocyanate.

25. The method of claim 21, further comprising providing at least one filler or reinforcement.

26. The method of claim 25, wherein said at least one filler or reinforcement comprises at least one of polymers, metals, ceramics or mixtures thereof.

27. The reaction mixture of claim 1, wherein said at least one metal-containing polymer comprising at least one of (i) a polymer selected from the group consisting of silicon-nitrogen polymers, aluminum-nitrogen polymers, and boron-nitrogen polymers comprising the repeat units (a), (b), and (c), and (ii) at least one mixture of polymers comprising two or more of the structural units (a), (b), (c), and (d), comprises an inorganic silicon-nitrogen polymer.

28. The composition of claim 9, wherein said at least one metal-containing polymer comprising at least one of (i) a polymer selected from the group consisting of silicon-nitrogen polymers, aluminum-nitrogen polymers, and boron-nitrogen polymers comprising the repeat units (a), (b), and (c), and (ii) at least one mixture of polymers comprising two or more of the structural units (a), (b), (c), and (d) , comprises an inorganic silicon-nitrogen polymer.

29. The method of claim 21, wherein said at least one metal-containing polymer comprising at least one of (i) a polymer selected from the group consisting of silicon-nitrogen polymers, aluminum-nitrogen polymers, and boron-nitrogen polymers comprising the repeat units (a), (b) , and (c), and (ii) at least one mixture of polymers comprising two or more of the structural units (a) , (b), (c), and (d), comprises an inorganic silicon-nitrogen polymer.

30. The reaction mixture of claim 1, further comprising at least one organic monomer or oligomer comprising a multiplicity of organic, electrophilic substituents wherein said electrophilic substituents comprise at least one electrophilic reactive group selected from the group consisting of epoxides, carbonyl-containing groups, and isocyanates.

31. The reaction mixture of claim 30, wherein said at least one organic monomer or oligomer comprises at least two electrophilic substituents selected from the group consisting of at least one ester, at least one acrylate, at least one methacrylate, at least one epoxide, at least one isocyanate, at least one imide, and at least one amide.

32. The composition comprising the reaction product of claim 9, further comprising at least one organic monomer or oligomer comprising a multiplicity of organic, electrophilic substituents wherein said electrophilic substituents comprise at least one electrophilic reactive group selected from the group consisting of epoxides, carbonyl-containing groups, and isocyanates.

33. The composition of claim 32, wherein said at least one organic monomeror oligomer comprises at least two electrophilic substituents selected from the group consisting of at least one ester, at least one acrylate, at least one methacrylate, at least one epoxide, at least one isocyanate, at least one imide, and at least one amide.

34. The method of claim 21, further comprising providing at least one organic monomer or oligomer comprising a multiplicity Of organic, electrophilic substituents wherein said electrophilic substituents comprise at least one electrophilic reactive group selected from the group consisting of epoxides, carbonyl-containing groups, and isocyanates.

35. The method of claim 34, wherein said at least one organic monomer or oligomer comprises at least two electrophilic substituents selected from the group consisting of at least one ester, at least one acrylate, at least one methacrylate, at least one epoxide, at least one isocyanate, at least one imide, and at least one amide.

* * * * *